United States Patent
Epstein

(10) Patent No.: US 12,082,093 B2
(45) Date of Patent: Sep. 3, 2024

(54) SOFTWARE OPTIMIZATION OF FLEXIBLE WIRELESS NETWORKING SYSTEM

(71) Applicant: Omnifi Inc., Pleasanton, CA (US)

(72) Inventor: Joseph Alan Epstein, Pleasanton, CA (US)

(73) Assignee: Omnifi Inc., Pleasanton, CA (US)

( * ) Notice: Subject to any disclaimer, the term of this patent is extended or adjusted under 35 U.S.C. 154(b) by 334 days.

(21) Appl. No.: 17/733,706

(22) Filed: Apr. 29, 2022

(65) Prior Publication Data

US 2022/0264425 A1 Aug. 18, 2022

Related U.S. Application Data

(63) Continuation of application No. PCT/US2020/058890, filed on Nov. 4, 2020.

(51) Int. Cl.
*H04W 16/18* (2009.01)
*H04B 3/54* (2006.01)
*H04W 40/24* (2009.01)

(52) U.S. Cl.
CPC ............ *H04W 40/248* (2013.01); *H04B 3/54* (2013.01); *H04W 16/18* (2013.01)

(58) Field of Classification Search
CPC ... H04W 40/248; H04W 16/18; H04W 84/12; H04W 24/02; H04B 3/54; H04B 7/024;
(Continued)

(56) References Cited

U.S. PATENT DOCUMENTS

| | | | |
|---|---|---|---|
| 8,443,063 | B1 | 5/2013 | Nelson et al. |
| 8,705,967 | B2 | 4/2014 | Beach |

(Continued)

FOREIGN PATENT DOCUMENTS

| | | |
|---|---|---|
| EP | 2052465 | 12/2015 |
| TW | 201824894 A | 7/2018 |
| WO | 2018081271 A1 | 5/2018 |

OTHER PUBLICATIONS

International Searching Authority, International Search Report and Written Opinion for International application No. PCT/US2020/058890, mailing date Feb. 4, 2021, 12 pages.

(Continued)

*Primary Examiner* — Julio R Perez
(74) *Attorney, Agent, or Firm* — Baker Botts L.L.P.

(57) ABSTRACT

A method for configuring a flexible wireless networking system is disclosed. The system may include multiple Wi-Fi transceivers coupled to each other in parallel and selectively couplable to one or more antennas by respective switches. The method may include obtaining topology information indicating whether and how each antenna is in reach of other antennas, determining, dependent on the topology information, a configuration change including a change in which and how many of the antennas are coupled to the Wi-Fi transceivers, and initiating an activation of a switch to couple one of the antennas to one of the Wi-Fi transceivers or a deactivation of a switch to decouple one of the antennas from one of the Wi-Fi transceivers. The configuration change may be determined using a machine learning model. The configuration change may include deactivating a currently active antenna and activating at least one alternate antenna having a different coverage area.

29 Claims, 43 Drawing Sheets

(58) Field of Classification Search
CPC ... H04B 7/0617; H04B 7/0691; H04B 7/0874
See application file for complete search history.

(56) References Cited

U.S. PATENT DOCUMENTS

| | | | | |
|---|---|---|---|---|
| 9,270,428 | B2* | 2/2016 | Moulsley | H04B 7/0617 |
| 11,943,705 | B2* | 3/2024 | Beyene | H04W 48/18 |
| 2007/0197262 | A1* | 8/2007 | Smith | H04L 12/2803 |
| | | | | 455/562.1 |
| 2013/0094440 | A1 | 4/2013 | Moshfeghi | |
| 2016/0165462 | A1 | 6/2016 | Tan et al. | |
| 2016/0282445 | A1* | 9/2016 | Kawamoto | G01S 5/02523 |
| 2018/0076515 | A1* | 3/2018 | Perlman | H01Q 1/46 |
| 2019/0174475 | A1* | 6/2019 | Pabla | H01Q 1/246 |
| 2019/0239100 | A1 | 8/2019 | Pandey et al. | |
| 2019/0253107 | A1 | 8/2019 | Ahmadi | |
| 2022/0264425 | A1* | 8/2022 | Epstein | H04B 7/0617 |
| 2023/0387985 | A1* | 11/2023 | Mattheijssen | H04B 7/0617 |
| 2023/0387998 | A1* | 11/2023 | Li | H04B 7/0413 |
| 2024/0080891 | A1* | 3/2024 | Xin | H04W 74/0816 |
| 2024/0146368 | A1* | 5/2024 | Ang | H04B 7/0874 |

OTHER PUBLICATIONS

International Preliminary Report on Patentability for International application No. PCT/US2020/058890, completed Oct. 25, 2021, 4 pages.

Anonymous, Supplemental Extended European Search Report for EP20884875.4, dated Mar. 25, 2024, 10 pages; pub. by European Patent Office, Munich, Germany.

Communication and Office Action for Taiwan Patent Application No. 109138677, dated Dec. 19, 2023, 11 pages, originated from the Intellectual Property Office of MOEA.

Michael Beard, Canadian Intellectual Property Office, Examiner's Report for Canadian Application No. 3,157,102, dated Oct. 11, 2023, 4 pages.

Li Bingchang, Republic of China, Notice of Allowance for CN Application No. 109138677 2., dated Jul. 16, 2024, 4 pages, Taipei, China.

* cited by examiner

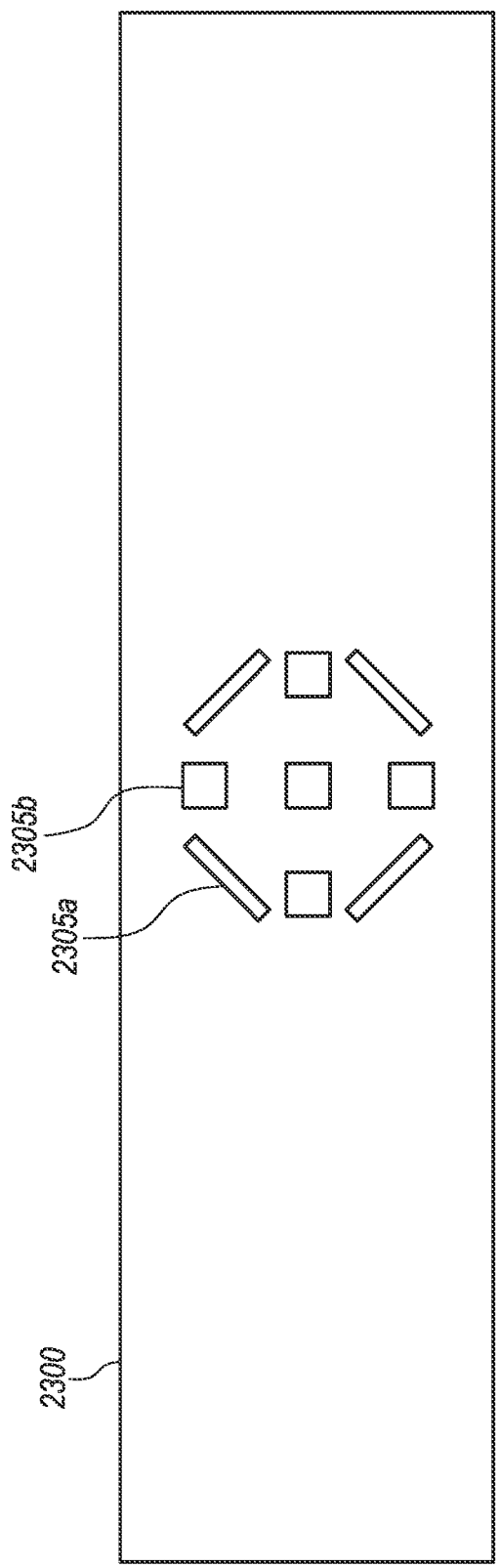
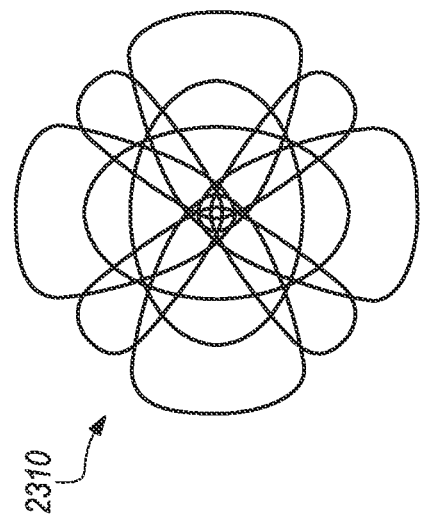
FIG. 23A
FIG. 23B

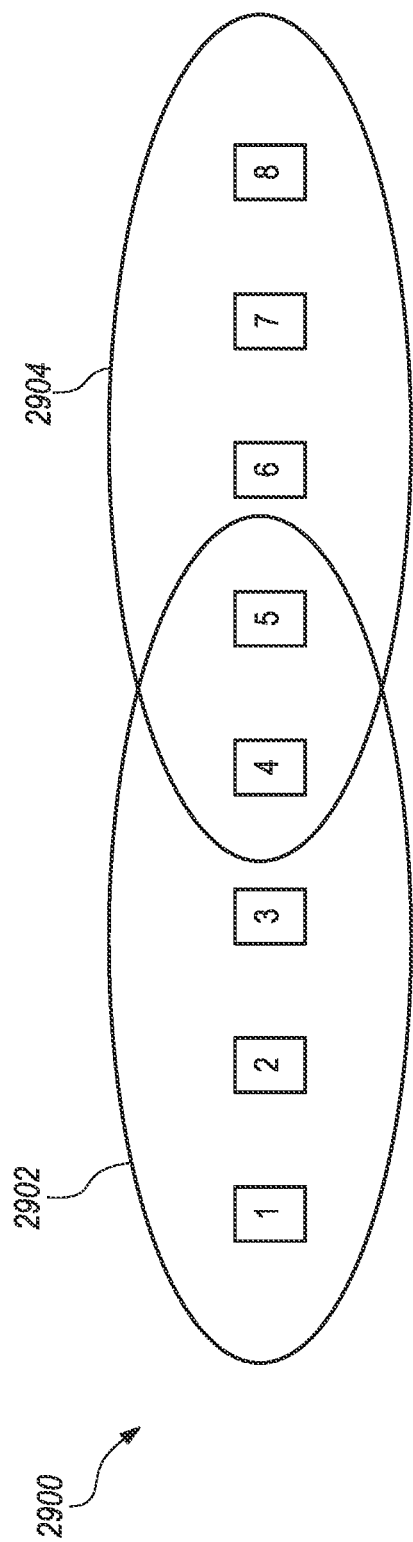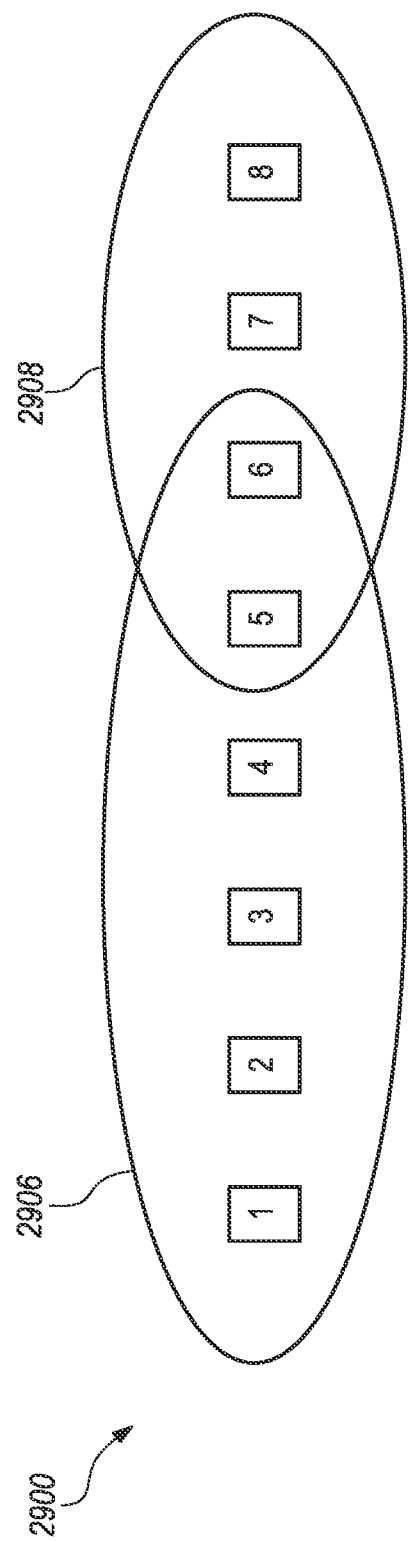

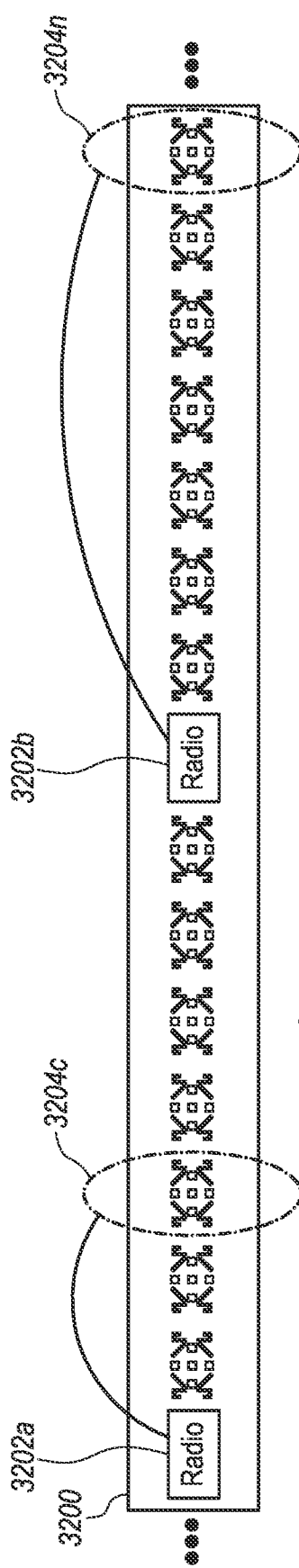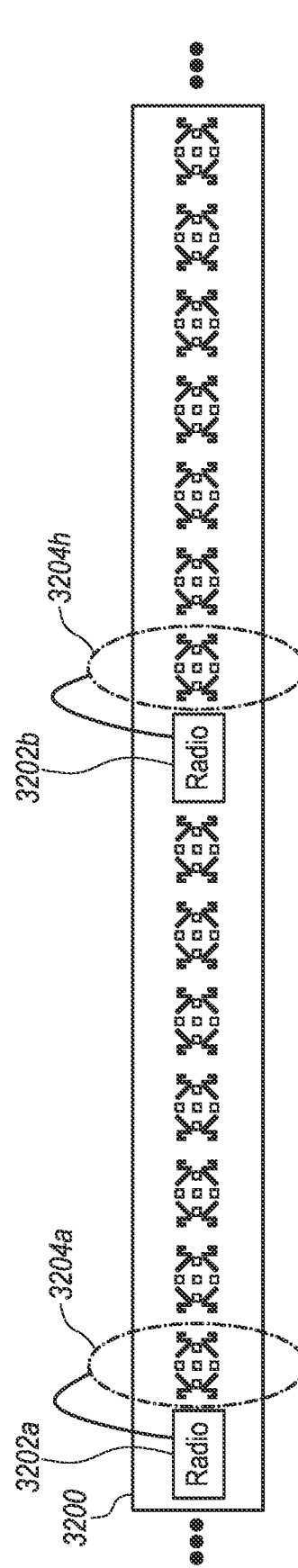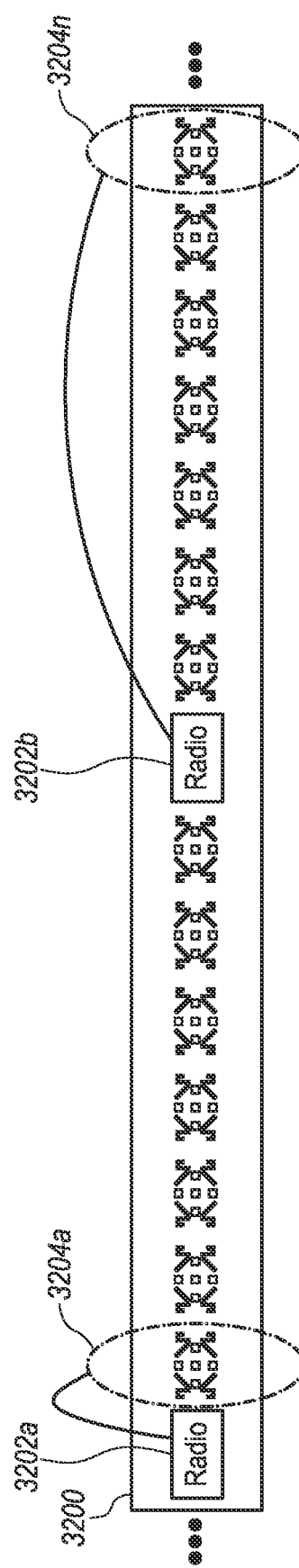

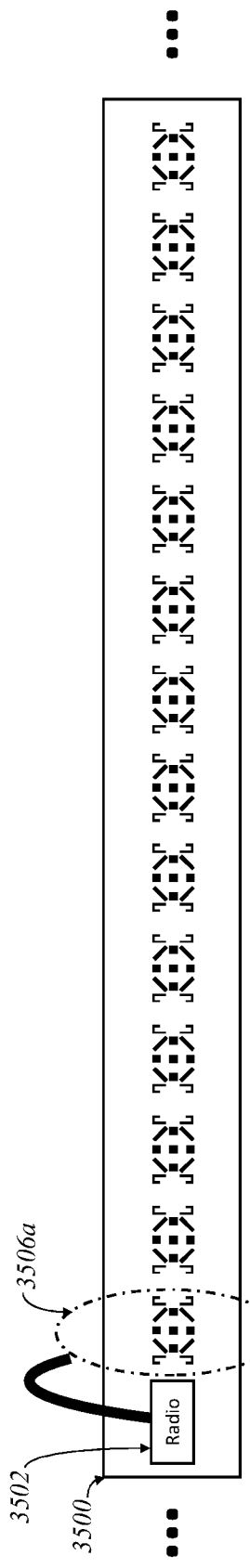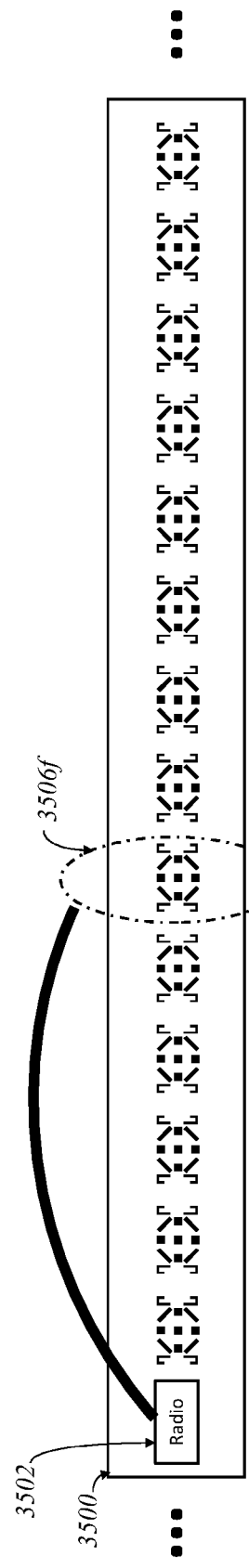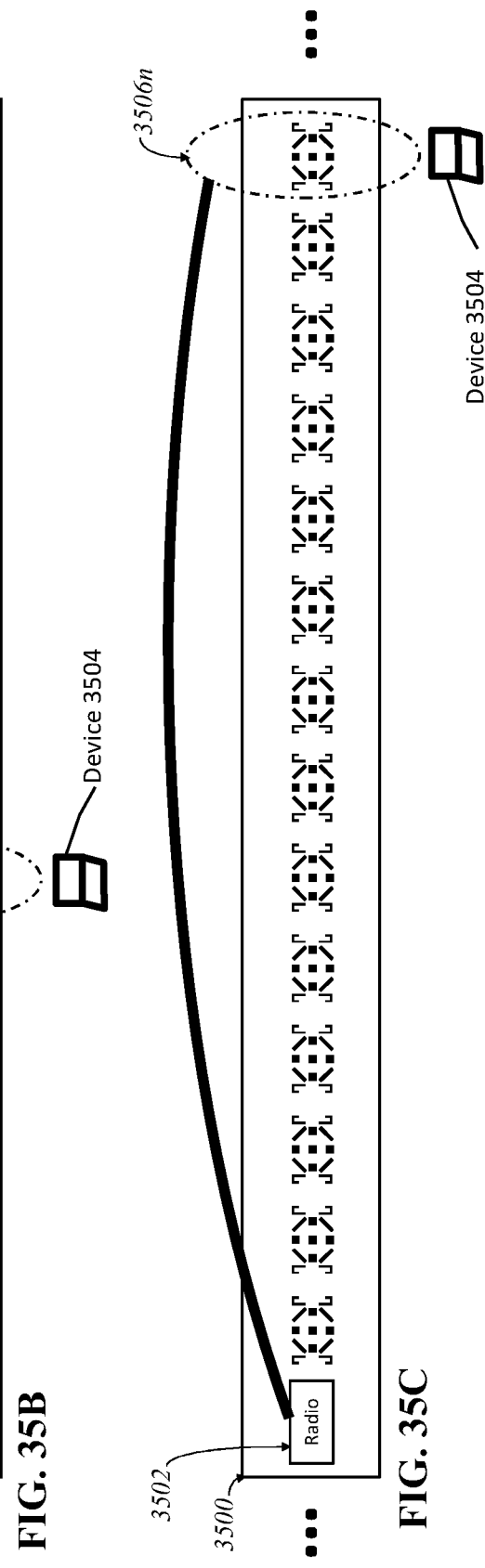
FIG. 35A
FIG. 35B
FIG. 35C

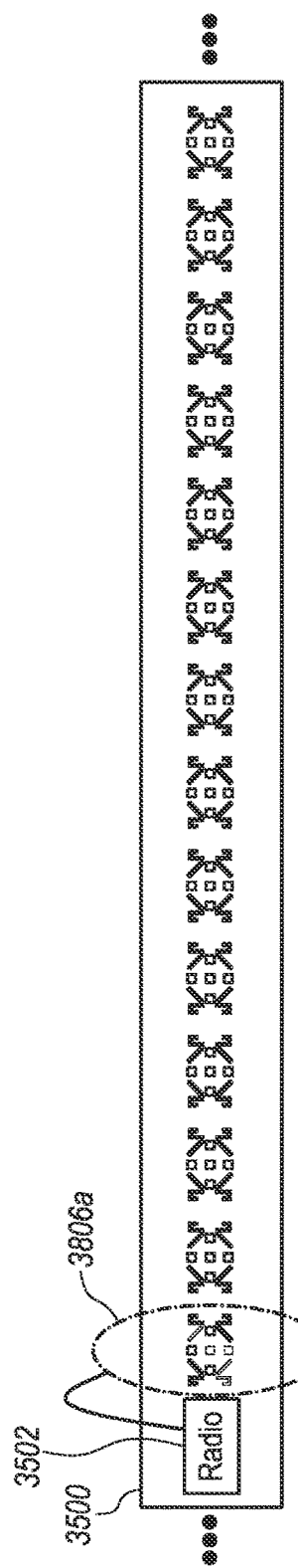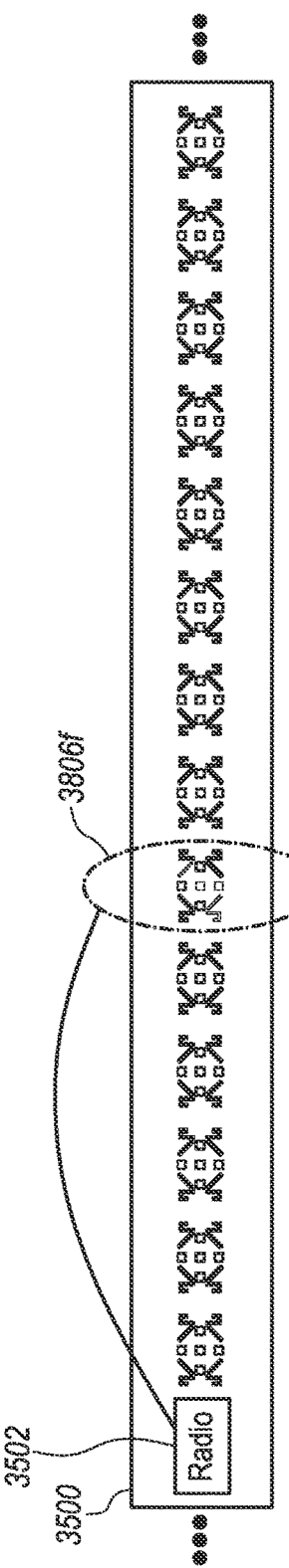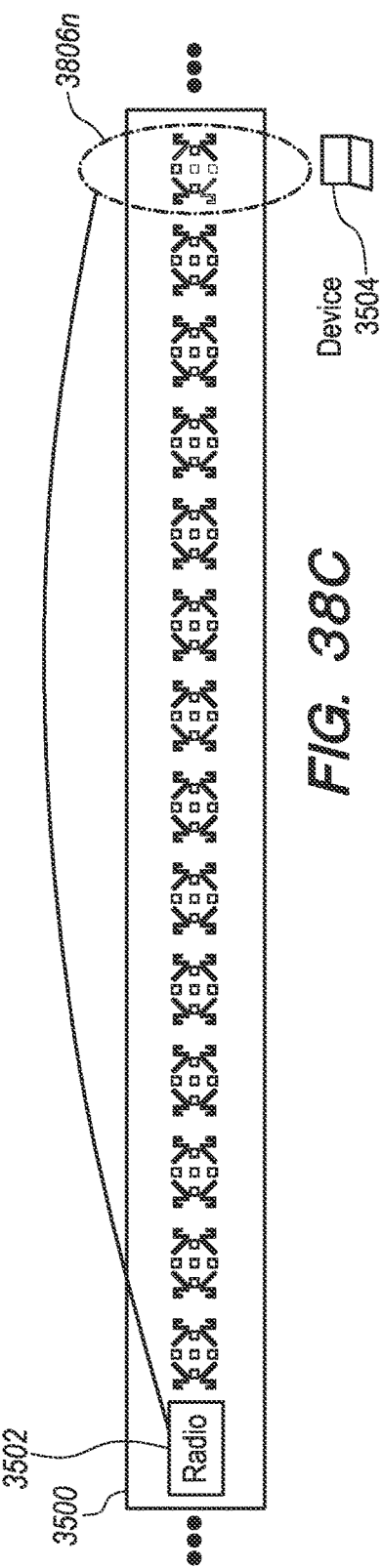

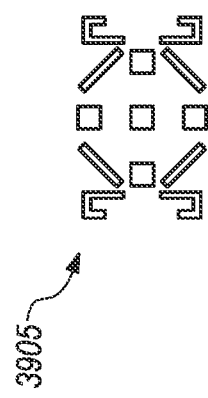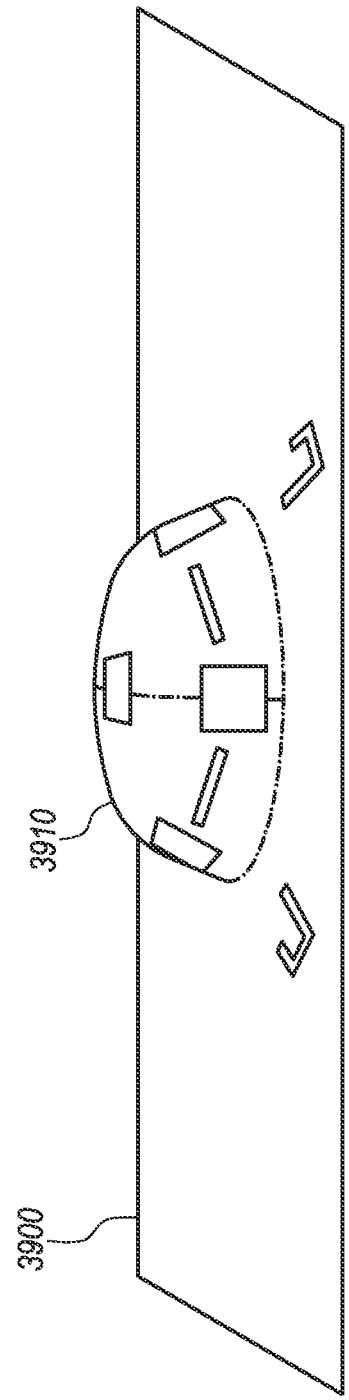

SOFTWARE OPTIMIZATION OF FLEXIBLE WIRELESS NETWORKING SYSTEM

BENEFIT CLAIM

This application claims the benefit under 35 U.S.C. § 120 as a continuation of international application PCT/US2020/058890, filed Nov. 4, 2020, which claims the benefit under 35 U.S.C. § 119 of provisional patent application 62/931,112, filed Nov. 5, 2019, titled "Software Optimization for Flexible Wireless," the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2019-2021 Omnifi Inc.

TECHNICAL FIELD

This disclosure generally relates to the field of configuring, optimizing, and operating flexible wireless networking systems.

BACKGROUND

Existing techniques for creating and deploying Wi-Fi networks today involve installing a number of individual wireless access points, connected back to a switch by individual wired networking and power connections, usually Ethernet with power over Ethernet providing the power for the access points. The access points contain a small number of radios, and are distributed and spaced throughout the area to be covered, usually an office building or similar, in such a way as to ideally ensure adequate radio coverage to all the commonly occupied areas of the deployment while otherwise minimizing the number of access points. These two goals, i.e., adequate coverage and minimizing the number of access points, are inherently in conflict, and so the installer tries to find an adequate compromise for the installation, often having to go back and update the locations or numbers of access points to fill holes or provide for density.

Every step of that process is expensive. Enterprise-grade access points are pricy, and even if they are given at a discount from the often $1,000 or more list price, e.g., even if they are sold at $100 each, the cost is certainly not such that an installer can, say, double or triple the number deployed to ensure that coverage holes are simply impossible. The labor required to pull cable from the wiring closet directly to where each access point is installed is expensive. Climbing a ladder and mounting the access point to a wall or ceiling, usually on a special mounting bracket, is expensive. The power over Ethernet switch port in the wiring closet that serves the wire running from the access point is expensive. The wiring of the wiring closet is expensive. The licenses needed to operate the access point is expensive. Any controller appliances that manage the access points are expensive.

In short, the labor and material costs required to place one access point ensures that a customer must keep track of and know about each access point, and thus forces the customer to rationalize or keep reduced the number of access points deployed. Moreover, even if a customer so desires to flood the area with an excess number of access points, this would go against manufacturer recommendations (stated or implied), as radio-to-radio contention and interference prevents the network from operating efficiently or the algorithms in place today to tune the network from doing their job.

One problem with traditional wireless installations is that each access point is a discrete, tracked, named, and valuable asset. Some attempts have been made to reduce some of the pain. For example, some access points have multiple ports, and can even pass through a degree of power from one port to the other. Thus, an installer could daisy-chain the access points together, and thus avoid a home run to the wiring closet for each access point. However, access points are not designed to handle more than one or two daisy-chained, because the access point itself would lose bandwidth and supplied power on the wired network.

Another problem with traditional wireless installations is that the radios are in discrete, self-contained, and expensive devices. This creates a necessary tension between placing enough devices for adequate service, and not overbuying. Moreover, each discrete box is a highly imperfect wireless device, given that it must hope to rely on the antennas in its small enclosure having a sufficiently adequate pattern to go through whatever obstacles lie between it and the device it is speaking to, which can be far away. Therefore, careful planning is required upon installation to ensure a clear enough field of view in every important direction.

SUMMARY

The appended claims may serve as a summary of the invention.

In accordance with some embodiments, a method and system for constructing and delivering wireless networking systems is disclosed. Some embodiments use a potentially long strip or plane of material embedded with wireless transceivers, power, and networking. Some embodiments use a potentially long strip or plane of material embedded with antennas, often switchable, thus providing far more opportunities for a transceiver to choose physical points of transmission and reception. Also disclosed are methods for using intelligent software processes to dynamically configure and reconfigure this highly flexible antenna architecture to provide optimized coverage patterns for a variety of deployments and under a variety of circumstances.

BRIEF DESCRIPTION OF THE DRAWINGS

FIG. 23A, FIG. 23B illustrate an example embodiment of an antenna patch.

FIG. 29A, FIG. 29B illustrate two similar transmissions that are picked up sequentially by antennas in respective configurations having two different overlapping antenna sets, in accordance with some embodiments.

FIG. 33A, FIG. 33B, FIG. 33C illustrate different possibilities of antenna selection at distance for an example strip, in accordance with some embodiments.

FIG. 35A, FIG. 35B, FIG. 35C illustrate an example handoff scenario using limited radiator sets.

FIG. 38A, FIG. 38B, FIG. 38C illustrate an example embodiment in which a strict mapping of antenna elements is maintained following a handoff.

FIG. 39A, FIG. 39B illustrate the use of a three-dimensional antenna shape on a strip for producing directionality, in accordance with some embodiments.

DETAILED DESCRIPTION

One theme connecting many of the embodiments of the disclosed invention is leveraging methods for increasing the density of available wireless transmission locations, thus potentially allowing electronic reconfiguration of the physical layout of the wireless network without requiring human intervention or physical relocation of actual discrete assets. A possible advantage of the form factors discloses is that they may be easily integrated into an architectural or wiring plan and can be installed by electricians rather than skilled networking labor.

Figure 1:
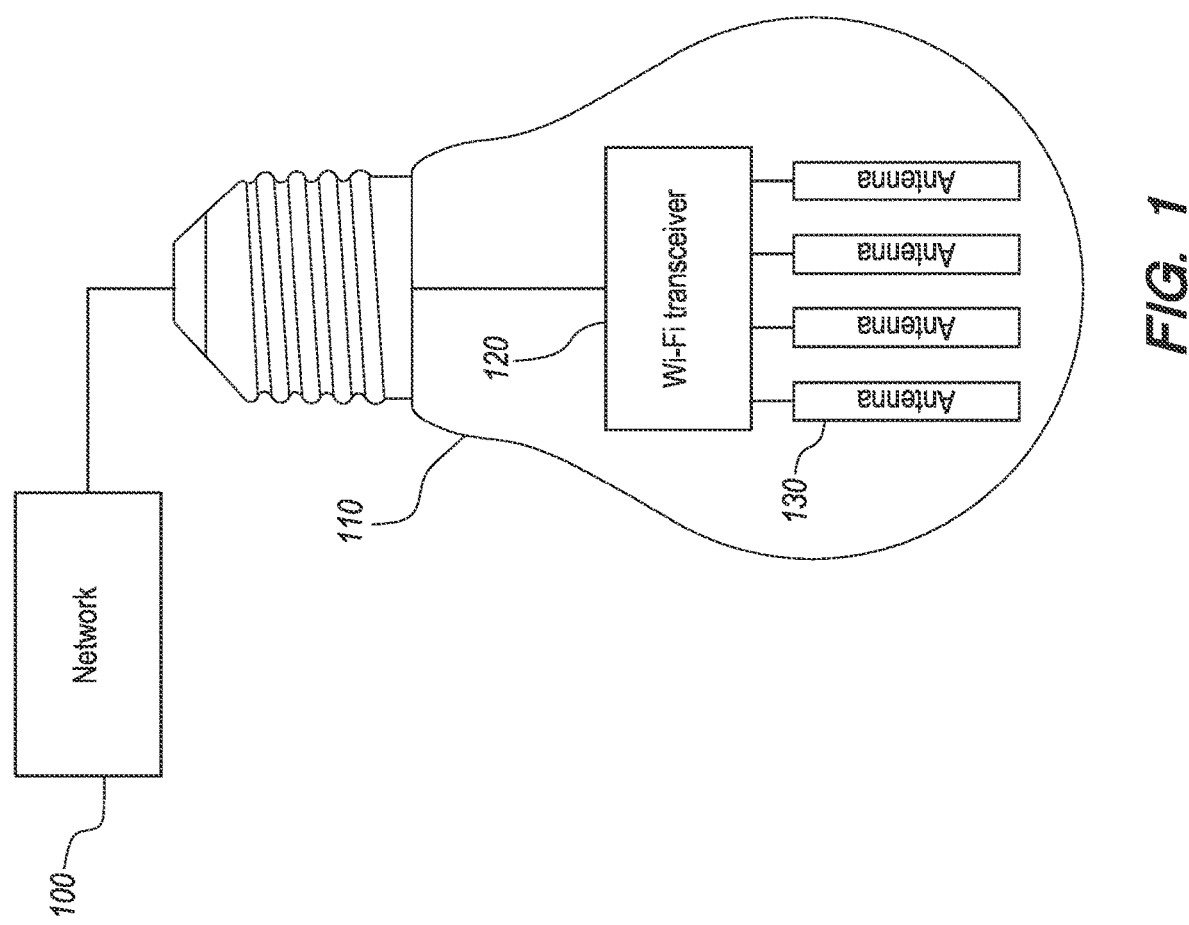
FIG. 1 is a diagram of an embodiment of the invention, showing a wireless transceiver and embedded antennas in a light bulb.

FIG. 1 shows the generic architecture of a wireless lightbulb 110. A Wi-Fi transceiver 120 is presented. Usually, it is available as a complete system on a chip, meaning that it contains a CPU, memory, and an operating system, along with its radio and medium access control (MAC) layers. To be a lightbulb, it also has LEDs and a sufficient LED controller attached to the system-on-a-chip (SoC) so that the SoC can dim (usually by pulse width modulation) the LEDs based on network requests. Because the embodiment is not about merely a lightbulb, the lighting components are not illustrated in the figure. The Wi-Fi transceiver 120 operates as an access point (AP), relaying information from network 100.

Figure 2:
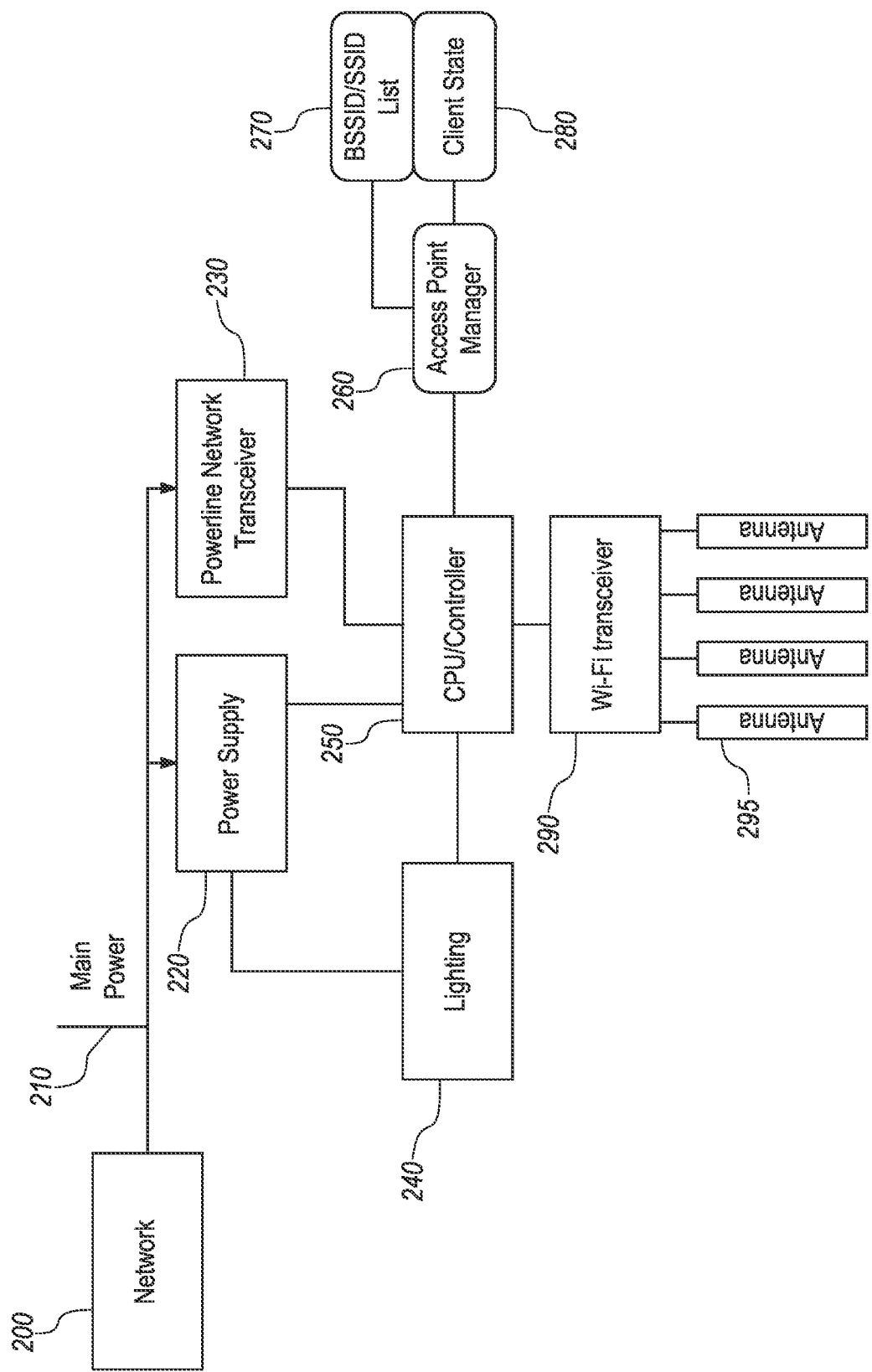
FIG. 2 is a diagram of an embodiment of the invention, showing a block diagram of a lighting-embedded wireless access point.

FIG. 2 shows an elaboration of the embodiment in FIG. 1. A network 200 is introduced using (usually but not necessarily high capacity) networking over powerline technology routed on main power 210. The bulb has a power supply 220, with enough capacity to drive its lighting and wireless needs. A powerline network transceiver 230 connects a CPU/Controller 250 to the wireline network 200. A Wi-Fi transceiver 290 provides generic Wi-Fi capability. Such transceivers are typically structured such that the CPU 250 handles the higher layer networking configuration and the transceiver itself is programmed by the CPU into adopting the correct wireless modes, such as how many base service set identifiers (BSSIDs) to offer, what their addresses is (often through a base address and a mask), what radio settings are needed, and so on. Typically, in software on the CPU is an access point manager 260, which handles the association and state machines for each client, as well as a list of clients 280, and BSSIDs and service set identifier (SSID) services offered 270. One or more antennas 295 are offered.

The illustration in FIG. 1 of a lightbulb as screw in is merely one embodiment, as lightbulbs come in many form factors, including plugin, snap on, and fluorescent tube bulbs (even if the replacement lighting technology is LED). Power and powerline networking technology in some embodiments works through a fluorescent ballast. Other embodiments are fitted with a standard two or three prong outlet plug, and thus plug into a power outlet: a further embodiment takes a nightlight configuration. Others wire directly in the power supply, such as through wingnuts in a junction box.

In other embodiments, the powerline networking element is not used, or not even present, and the Wi-Fi transceiver is used for mesh networking.

Lightbulbs as a literal form factor are not the only form factor possible. There are other places one can introduce access points. Merely by removing the lighting component from the lightbulb embodiments, one can have a "nightlight" without a light, that is merely a radio. Another embodiment is integrated into an outlet directly, wired in place of a standard outlet, a controllable smart outlet, or a GFCI outlet: each are different embodiments and carry the necessary features of a simple plug, being controllable, and having GFCI protection.

Inbuilt wireless such as with the above embodiments can be installed such that the antennas are not configured by the installer. Antenna patterns are often important, especially when devices are placed against ceilings or walls or fixtures. Having just one fixed antenna set would then become a problem if the resulting antenna pattern against the environment creates grossly misshapen cells that fail to adequately cover.

Figure 3:
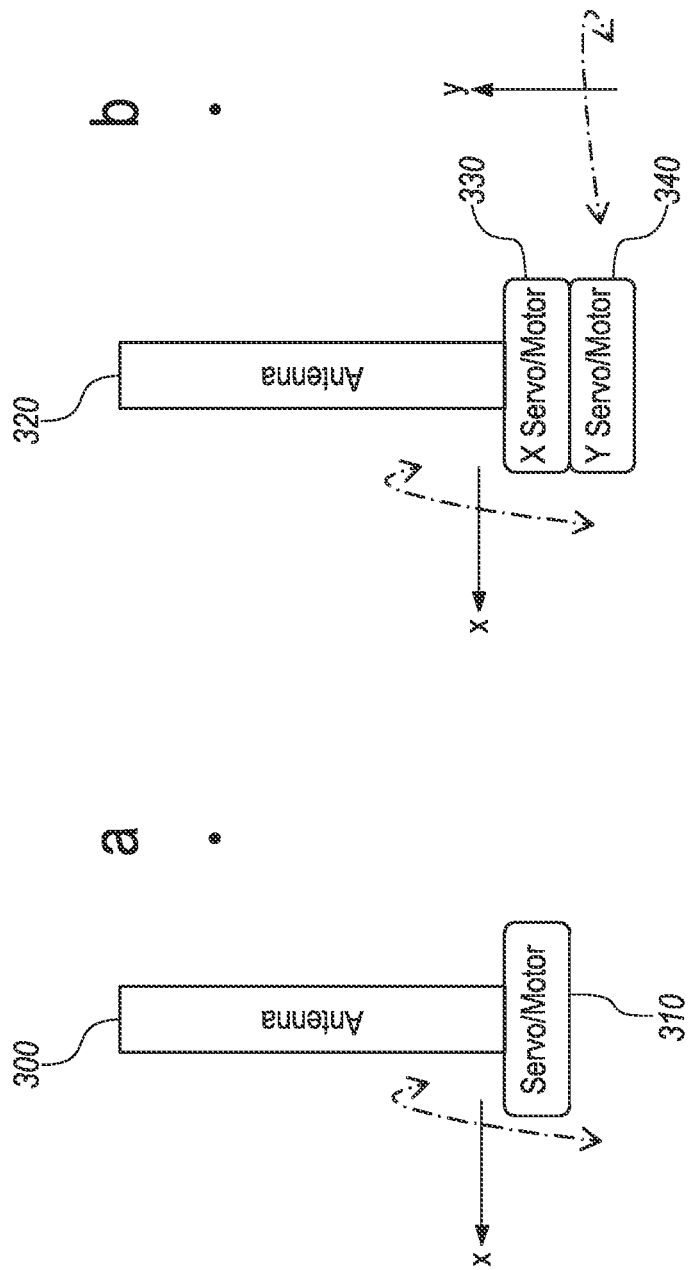
FIG. 3 is a diagram of an embodiment of the invention, showing an antenna which can be electronically reoriented.

One set of embodiments solves this problem by using automatically movable antennas. FIG. 3 shows a couple of embodiments. FIG. 3a shows an antenna 300 mounted on an electrically movable apparatus 310, such as servo, motor, or electrically deformable material, with one axis of freedom. FIG. 3b shows two axes of freedom, by mounting one movable apparatus 330 on another 340 at a differing direction, such as cross. Omnidirectional antennas for Wi-Fi need only be a centimeter or two long, and the mechanical servos or motors needed are now able to be manufactured at extremely low cost and size. Thus, multiple movable antenna packages can be installed easily into a small form factor, such as within a lightbulb. Other embodiments use, instead of a servo or motor, a spring and variable-length strut to position the antenna: the variable-length strut can be a memory wire, a rack-and-pinion system, a solenoid, voltage sensitive material, or other similar mechanism. The choice of material is a manufacturing decision, and tradeoffs exist between power required to operate, cost, and complexity: such choices are obvious and require no experimentation or further invention. In some embodiments, multiple antennas are attached together to one moving mechanism.

Figure 4:
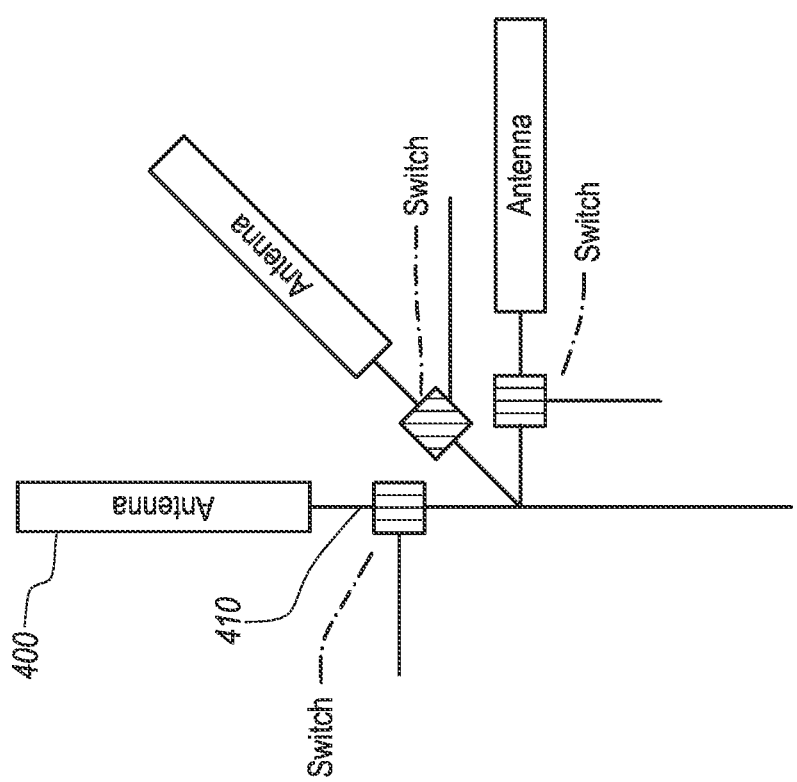
FIG. 4 is a diagram of an embodiment of the invention, showing an electronically selectable set of antenna options.

When mechanical motion is not desired, multiple antenna patterns can be switched between. FIG. 4 shows an embodiment of antenna switching. Multiple antennas are provided, at different orientations, locations, or in different shapes and patterns. In this figure, each antenna 400 is provided its own one-way switch 410: a reduced number of multiway switches can be provided instead. The antennas may be arranged in different directions, in two-dimensional or three-dimensional space. They may be independent wires, or they may be printed on plastic or solid circuit boards such as microstrip antennas. This is often very cheap to do. Some embodiments use the selections to provide enough antenna possibilities for each antenna that the system can search through the various antenna patterns and find an optimal one to use. A long time ago, in the earliest days of Wi-Fi, per-packet antenna switching was used, where the transceiver had enough time to compare the signal strength (usually the circuitry was not sufficiently sophisticated to measure much else) on multiple antennas during the throwaway training preamble, and the system could then choose which antenna it wanted to receive the main signal from. This was all done away with when the speeds were increased with OFDM, because there simply wasn't enough time to detect. And with MIMO, and multiple antennas running different signals, it wouldn't even make sense. However, that did not mean that antenna location is irrelevant. Instead, access points have their antennas prominently affixed today to their cases in places that provide reasonable orthogonality. (External antennas are somewhat rarer, because they tend to fall over time and thus change the pattern of the access point.) However, when access points are placed in physically constrained positions that prevent a priori placement, such as in lightbulb sockets or junction boxes, the need for remotely and automatically adjustable antennas returns, not for each packet, but for each placement, and then over time based on moving traffic patterns and similar.

Access points traditionally are placed with a high degree of care and precision, by planners and installers both. Ideally, one would rather place them in any convenient spot, and then run the antennas remotely to the optimal location. However, with MIMO, this is difficult to do with cabling: each antenna needs to be placed at a certain distance and with enough independence between the antennas to allow for capturing the independent spatial channels at the same frequency. Rarely would anyone want to pay enough to run two to four coaxial cables merely to dangle external antennas at the end of the coax: coax crimping tools are not common in an installer's toolbelt, and usually if you can run coax and place an antenna, you can put the access point at the same location instead and save the cost and effort. In fact, for this reason, most access points sold today contain internal antennas only.

Figure 5:
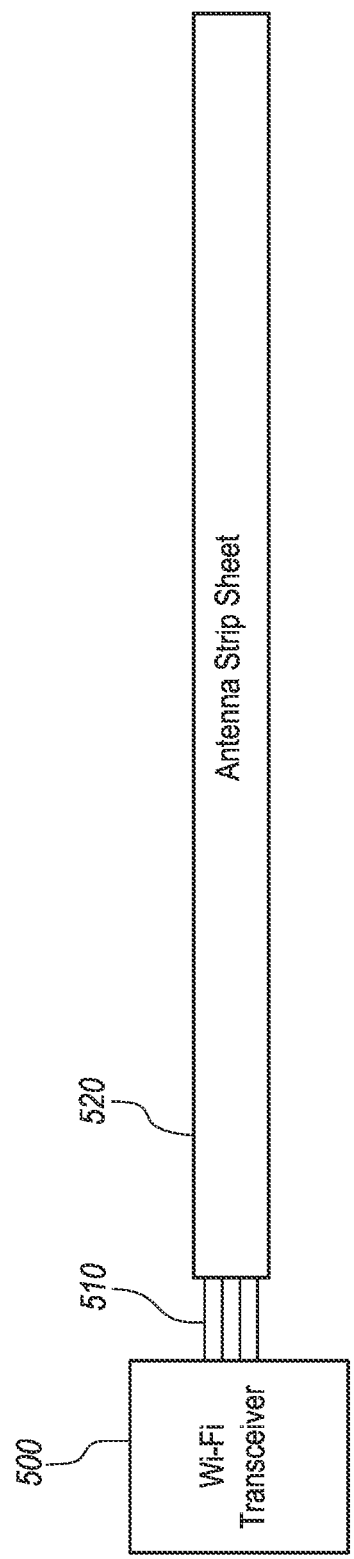
FIG. 5 is a diagram of an embodiment of the invention, showing an antenna strip sheet attached to a wireless transceiver.

However, this installation problem may be reduced by using sheets of cheap, possibly flexible, easy to install material with antennas embedded on it. FIG. 5 shows conceptually an antenna strip sheet. A Wi-Fi Transceiver 500 connects to a strip 520, through one or more lines 510 for one or more antennas. The strip sheet is then placed across the space to thus provide the multiple antenna location possibilities.

In some embodiments, the strip sheet is printed very much like an inexpensive LED lighting strip: a flexible circuit board, usually of plastic. In some embodiments, the strips are made of repeating units of addressable antenna sets, with supporting infrastructure. The antenna sheets mount to a head end unit in some embodiments, which depending on the embodiment drives various components from passive antennas to active transceivers in an addressable manner. The goal is to have these sheets come in long spools, which can be cheaply thrown about and cut as needed with little economic pain, thus allowing for unskilled installation and minimal cost for waste.

Figure 6:
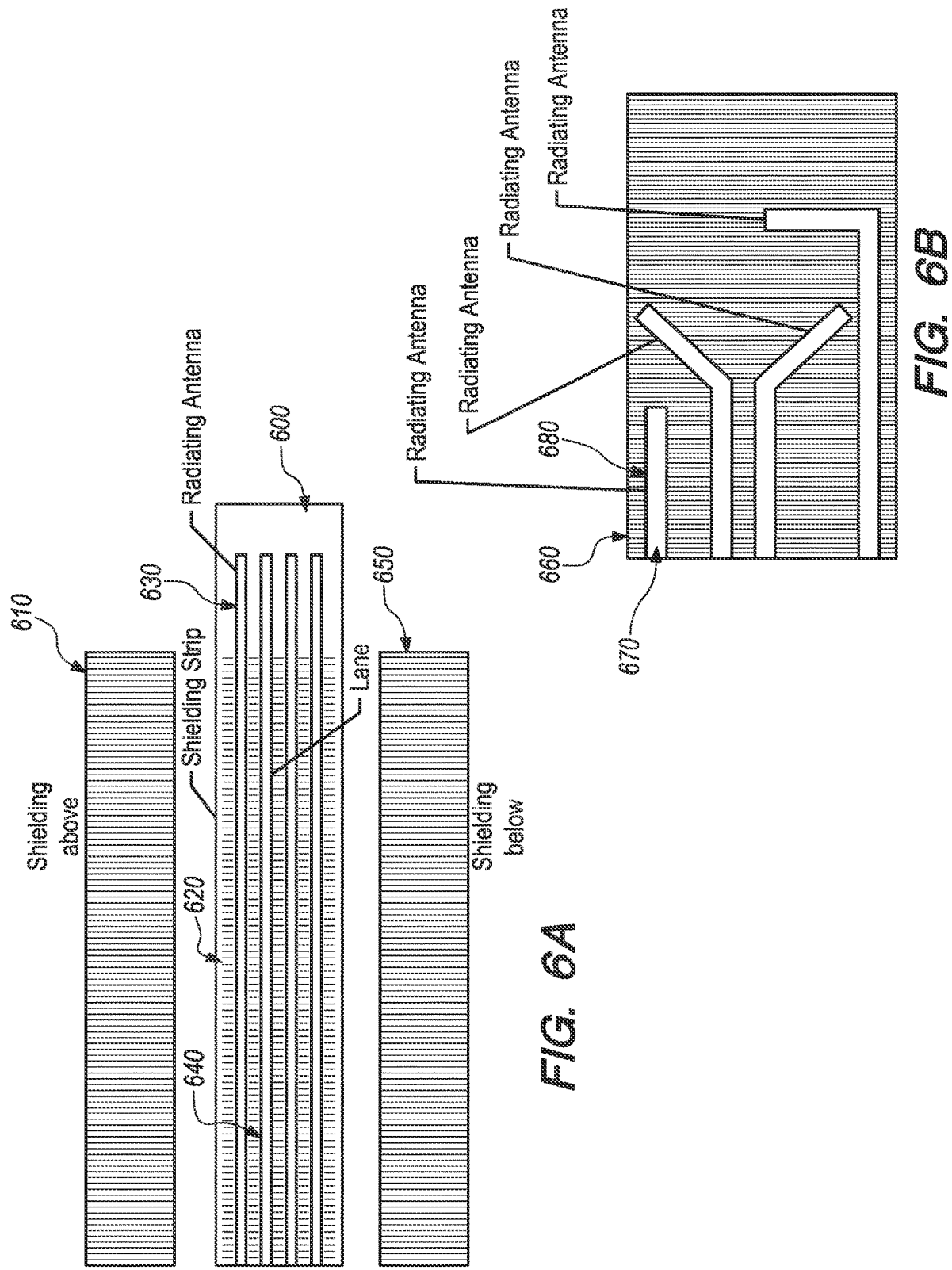
FIG. 6A and FIG. 6B are diagrams of an embodiment of the invention, showing multiple transmission lines terminating in radiating antennas, in both endspan and midspan positioning on the strip.

In some simple embodiments, as shown in FIG. 6A, the strip sheets have one antenna set. In some embodiments, the lanes 640 carry the signal for each antenna 630, surrounded by sufficient printed shielding lanes on the same plane 620, as well as stacked shielding on planes printed above 610 and/or below 650, to prevent radiation or absorption from the lanes themselves; in some embodiments, these are grounded and separated from the lanes by insulating space in the same plane or an insulating layer in another. In other embodiments, other shielding mechanisms are used. With shielding as shown in the figure, the bulk of the non-radiating part of the strip acts like an inexpensively made coaxial cable, but without the coaxial elements, or the cable, and thus can be manufactured using the same methods as LED strips. One possible advantage is that, like coaxial, the attenuation of the signal can be kept to near linear in the length of the antenna strip. The choice of width of shielding strips is easily made with no undue experimentation by those skilled in the art of microstrip transmission lines and can be chosen based on desired quality at a desired price. At the radiating locations, the shielding is omitted and an appropriate radiating and impedance matched structure is used. In FIG. 6A, the four antennas are shown in parallel at an unshielded end of the strip: although illustrative, such adjacent aligned antenna options can be done, such as providing parallel PIFA antennas with principal radiating structures in the direction of the figure. However, in some embodiments, the antennas are placed with different orientations, patterns, and with different shielding and ground plane configurations. For example, FIG. 6B shows two sets of two orthogonal radiating antennas, surrounded by shielding material on the lane plane. (Again, although not illustrated in detail, PIFA antennas may be printed with such principal orientations.) Other embodiments use different lane plane shielding or omit the lane plane shielding at the radiating elements as in part a of the figure. Other embodiments remove one (say the top) layer of shielding above the radiating plane but leave the lower, to thus make the antennas radiate in a preferred direction orthogonal to the plane of the strip, as is typically done in patch antennas. The length of the radiating element that can be accommodated is potentially as large as the strip has room for in its longest dimension, although practical considerations, including a desire to create reasonable beam patterns, may constrain the length, array patterns, and the potential gain to be no more than a few dBi. The shape of the antenna is also a choice based on need. In some embodiments, there are more than one radiating element attached to the lane: some embodiments do this to allow for different pattern expressions; others do this to allow for different frequency responses, such as having multiple lengths for multiple optimal resonances based on the frequency bands used.

Figure 7:
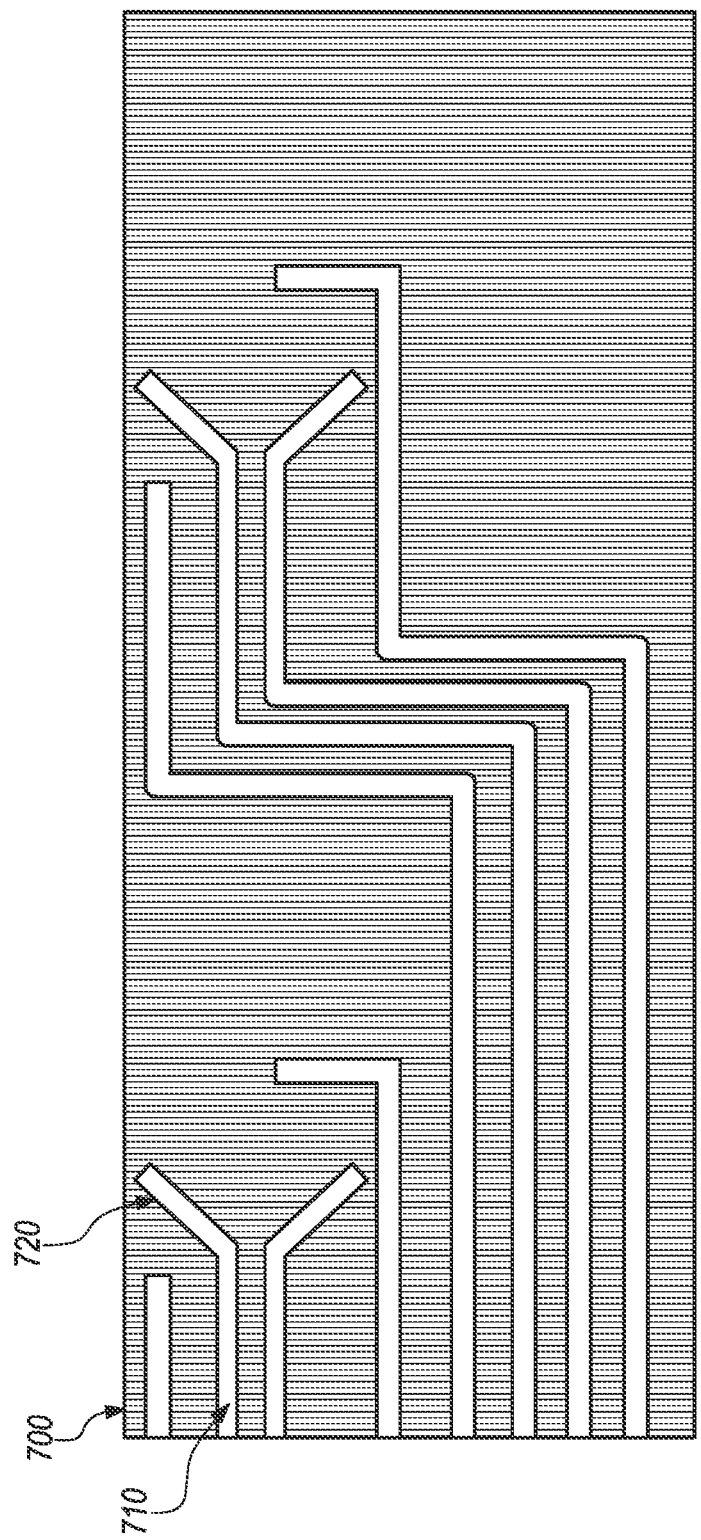
FIG. 7 is a diagram of an embodiment of the invention, showing repeating patterns of antennas on the antenna strip, with multiple transmission lines.

In further embodiments, multiple antenna sets are placed on the same strip, in different locations. A simple embodiment is shown in FIG. 7. In this particular embodiment, the radiating pattern is repeated at least once down the strip. Each antenna 720 maintains its own lane 710 back to the head of the strip amidst surrounding shielding 700. Not shown in this and the following diagrams are the holes in the other shielding layers, but it is clear from the previous description that there will be holes in many embodiments over at least the radiating part of the antennas so that signal can escape in one or both normal directions to the plane, and as before, the shielding around the radiating antennas on the same layer can differ. In this particular figure, the lanes for the second antenna set are shown on the same layer as the first. In other embodiments, the antenna lanes are distributed among different layers, all with appropriate shielding between them (one specific embodiment is to zigzag the lanes vertically between each layer so that a lane on one layer is surrounded by the shielding between lanes in the layers above and below): layers then can connect to a higher radiating layer with antennas exposed to the outside world by vias.

Figure 8:
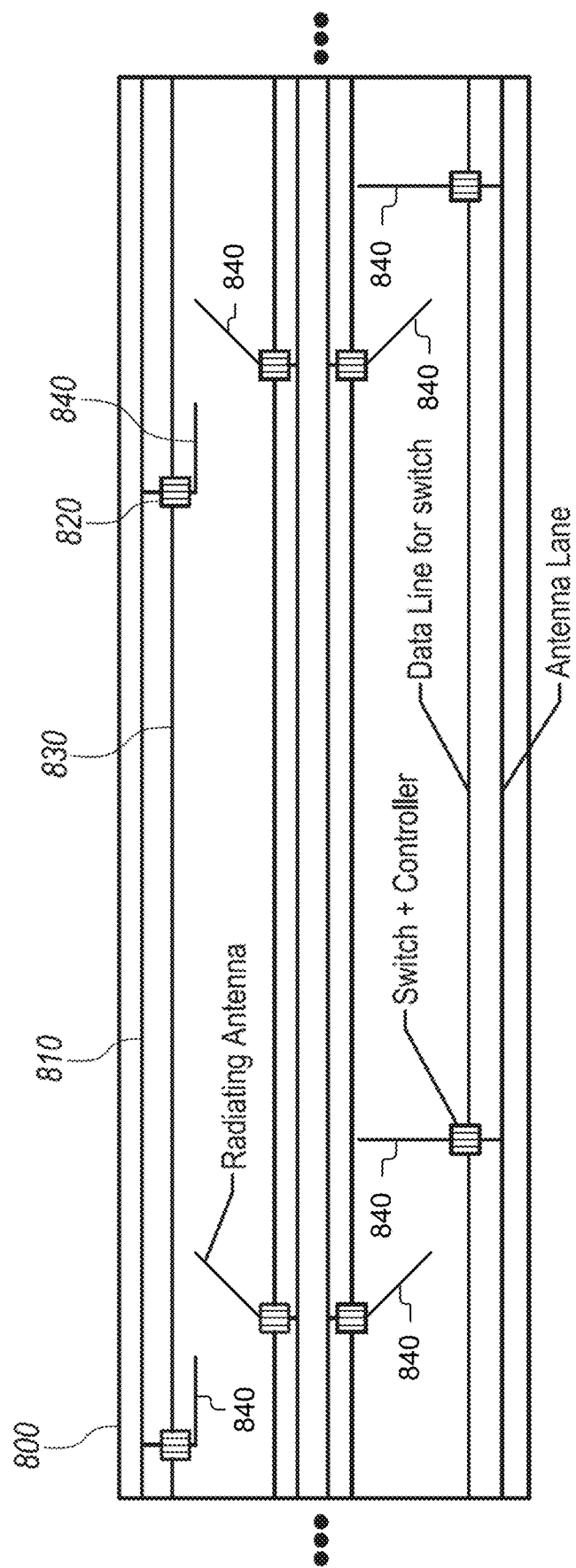
FIG. 8 is a diagram of an embodiment of the invention, showing common antenna transmission lanes and data lines for selectable antenna switches that select among those antennas.

FIG. 8 shows further embodiments that use switched antennas. In these embodiments, the antennas 840 produce sets that repeat along the strip, as many as needed, with one lane 810 dedicated to each antenna. Mounted to the strip are active switches 820. Not shown in this figure is the power lane and ground return for the active switches, as those are obviously routable to anyone skilled in the art. Shown, however, is a data line 830 for the switches. In some embodiments this is a serial line which communicates to an antenna switch/controller 820 that it is that switch that is to be activated. One embodiment has a dedicated switch control line to each switch. Another embodiment uses a simple pulse code to chain the switch/controllers: near the Wi-Fi transceiver is the master controller for the data line, which emits a series of square pulses of a specific address length, followed by a trailer pulse of different length. Each switch/controller electrically terminates the line in that embodiment, and counts the pulses coming in, not emitting the first pulse but emitting the second and further pulses downstream to the next switch, including the trailer pulse. Should only one pulse come in before the trailer, the switch closes and connects its antenna to the antenna lane; otherwise, the switch opens, and the antenna is disconnected. In this way, the master controller emits the number of pulses equal to the count of the switch it wants to activate, starting from one, followed by a trailer. Sending six count pulses and one trailer, for example, will open all the switches on the strip besides the sixth switch as counted from the head end. Clearly, other codes can be used, including binary addressable codes using a variety of different encodings, including variable pulse width, Manchester, and others known to the art. The specific embodiment just described is merely a simple code that can be implemented with minimal circuitry. Note that the shielding is not shown in the figure, for clarity of the figure, as how to place the shielding has been described already. For interplane shielding, since now there are mounted components, some embodiments leave holes in the shielding layer for the solder pads of the active components on the layers below. Others remove the antenna lanes to different layers below the top mounting layer and bring the lanes up through vias to the surface layer: one specific embodiment places the vias at the solder pad of the switches, thus preventing accidental leakage by allowing the switch to directly block radiation with its own body. A further embodiment uses the top shielding layer, directly underneath the top mounting and radiating layer, as the ground layer for the active components, and either connects ground occasionally through vias to its own ground line printed on the top layer or always grounds to the second layer through vias.

Figure 9:
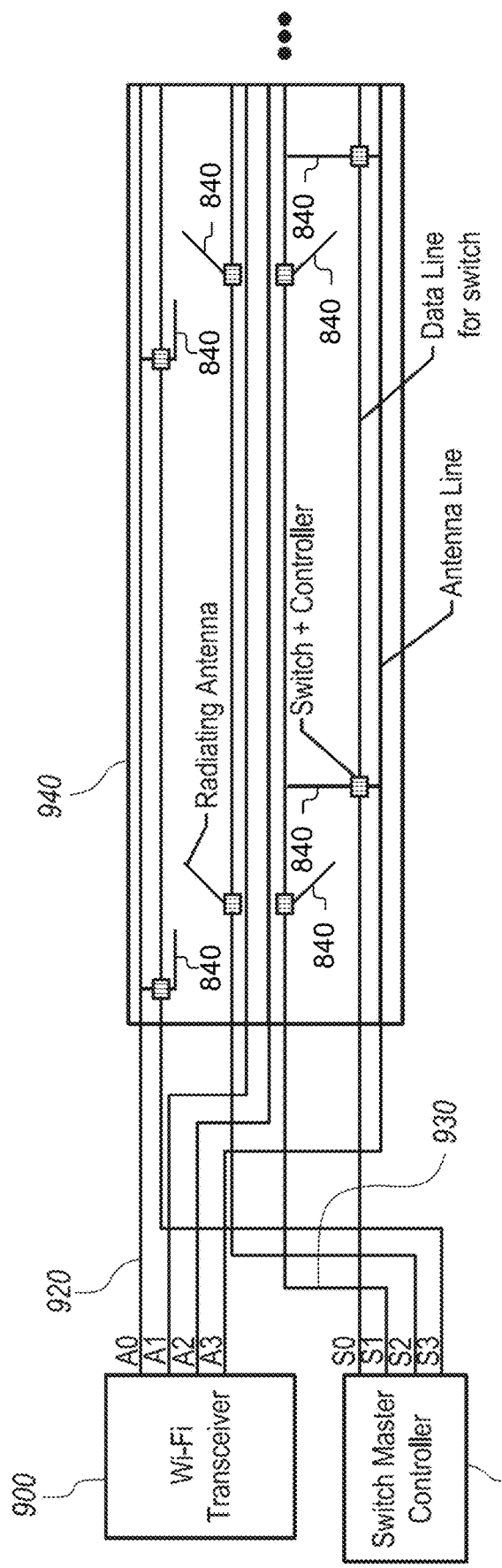
FIG. 9 is a diagram of an embodiment of the invention, showing a wireless transceiver and switch controller driving selectable antenna switches on an antenna strip.

FIG. 9 further illustrates a master controller 910 with switch lines 930 such as those designated S0-4 (or however many are desired) and a Wi-Fi Transceiver 900 with antenna lines 920 such as those designated A0-4 (or similarly desired), connected to a strip or similar structure 940. Other embodiments may use different antenna counts, and the patterns and distance of antenna repeat are manufacturing options. The grounding/shielding and power connections are not shown as they are obvious. Note, again, that other embodiments use multiantenna switches, which switch multiple antenna lanes off the same control line. Some embodiments use one switch controller per antenna set but driving multiple single-antenna switches from the one switch line coming from the controller.

Antenna strips do have power losses from the beginning to the end and, as they are analog processes, they require the transceiver to do some work. In some embodiments, a bidirectional amplifier attached between the transceiver and the strip, or placed at one or more points along the strip, counters that. In one embodiment, the amplifiers are at the head end of the strip. In another, they are at one or more places along the lanes, thus splitting lanes at their points of insertion. In another, they are mounted between the lane and the switches, one per switch, thus not splitting the lane. Other locations are possible as well.

Figure 10:
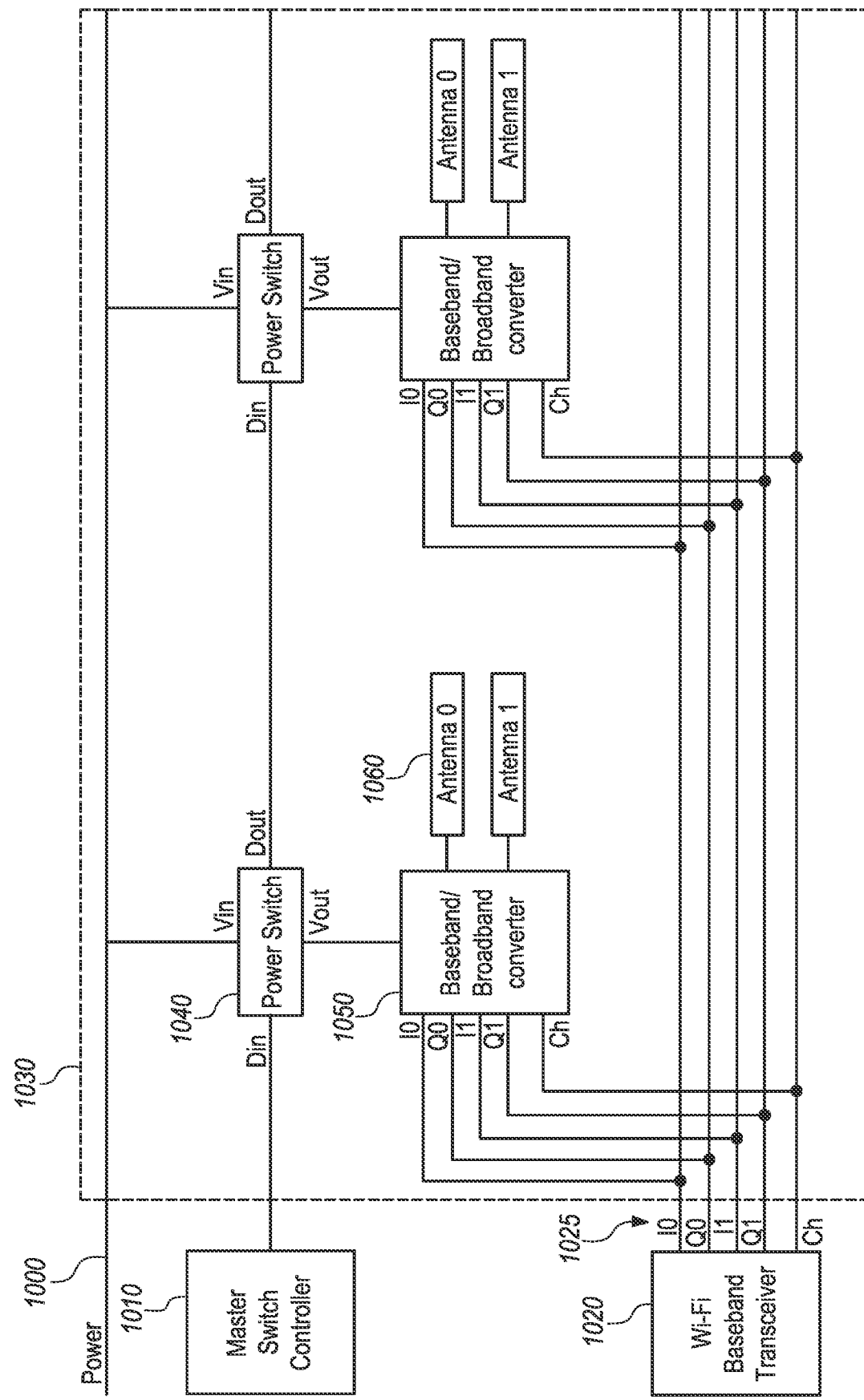
FIG. 10 is a diagram of an embodiment of the invention, showing a wireless baseband transceiver and switch controller driving multiple selectable baseband-to-broadband modulators with multiple antennas, such as on a strip.

However, for exceedingly long runs, or where radiative concerns become paramount, or for cost or installation ease reasons, there are other options. FIG. 10 shows the embodiments using a baseband antenna strip 1030, illustrated in schematic form for clarity, as how to construct strips has already been disclosed. A Wi-Fi Transceiver from previously, which is RF, has now been reduced to a baseband transceiver 1020. Instead of an RF antenna line, there is at least one pair 1025 of baseband analog lines, I and Q, for the real and complex parts of the ultimate broadband signal. At least one bidirectional Baseband/Broadband Converter 1050 (two repeating units are shown in the figure) modulates and upconverts the baseband to broadband on transmission, and down-converts the broadband to baseband on reception. The Ch line or lines specifies the channel and transmission characteristics. In some embodiments, the Ch line is one line only, carrying the channel carrier signal, and the converters detect transmission and reception according to the state of the IQ lines. In other embodiments, the Ch line carries a signal describing the channel to be used, and the converters have the resonators inside them and produce the necessary frequency: the channel describing signal in a specific embodiment consists of a lower frequency signal such as that driven by a crystal, as well as a multiplier signal specifying the relative frequency to generate from the crystal line. In other embodiments, the Ch line also carries the Tx/Rx line, and the converters do not sense the IQ lines to determine whether to transmit or receive but instead use the Tx/Rx line (driven usually by the MAC through the transceiver). As shown in the figure, some embodiments choose which antenna set to use by choosing which converter to drive. In some embodiments, the converter is not powered up unless switched on, using a controlled switch such as the previously described antenna switches using a serial line, but instead using a power switch on the power line. In other embodiments, the converters have an Enable line, driven by controllers such as the serial controllers as previously used for switches. One possible advantage of these embodiments is that the baseband signal carries further with less error, and the converters, being sufficiently small and inexpensive, can be mounted in a nearly disposable manner on the antenna strip.

Further embodiments may be described, using instead of using a full baseband converter, a lower-frequency real signal carried on a channel and an additional stage of conversion. This two-stage converter requires that the IQ lines be replaced with lower passband lines, usually one rather than two per antenna, but set at a low, non-radiating frequency sufficiently high enough to allow the signal to be entirely expressed as real voltages. The setup looks very similar to the previous figure. One possible advantage of using an intermediate passband is that the number of lines and the complexity of the converters can be reduced.

Figure 11:
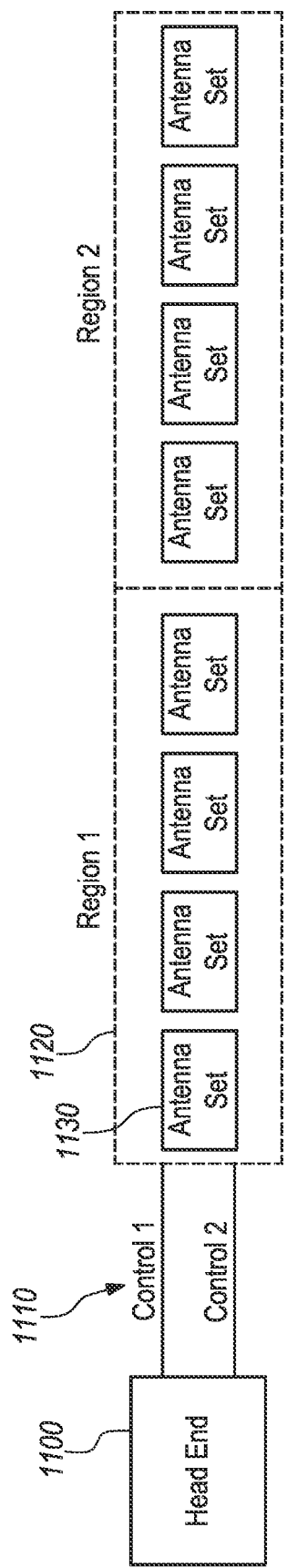
FIG. 11 is a diagram of an embodiment of the invention, showing a head end controlling multiple regions of multiple antenna sets on a strip.

In all cases, it is possible to mount multiple control lines and antenna lanes within a strip (be it antenna strips as disclosed above or transceiver strips below), and thus produce embodiments with strips that can transmit or receive on two or more antenna sets simultaneously. FIG. 11 shows a multi-region strip 1120. In some embodiments, the regions are contiguous, and the strip repeats new regions at intervals. In some embodiments, one antenna set 130 per region is available to be used by counting, so that if there are five regions, and five command lines, the first command line picks and controls which one antenna set in the first region is used, etc. In other embodiments, the regions are one-of-n, meaning that within a certain repeating region interval the first antenna set belongs to the first choice set, the second to the second, and so on, such that the first control line chooses which region's first antenna set will be used, etc. (Notice that some of these embodiments are an interleaved form of contiguous previous embodiments.)

In many cases, the antenna strips will be sufficient. However, in some cases, the analog loss will remain unacceptable, and a purely digital transmission mechanism is required to extend the length further. The good news is that full Wi-Fi SoCs themselves are cheap enough that multiple of them can be mounted on a strip.

Figure 12:
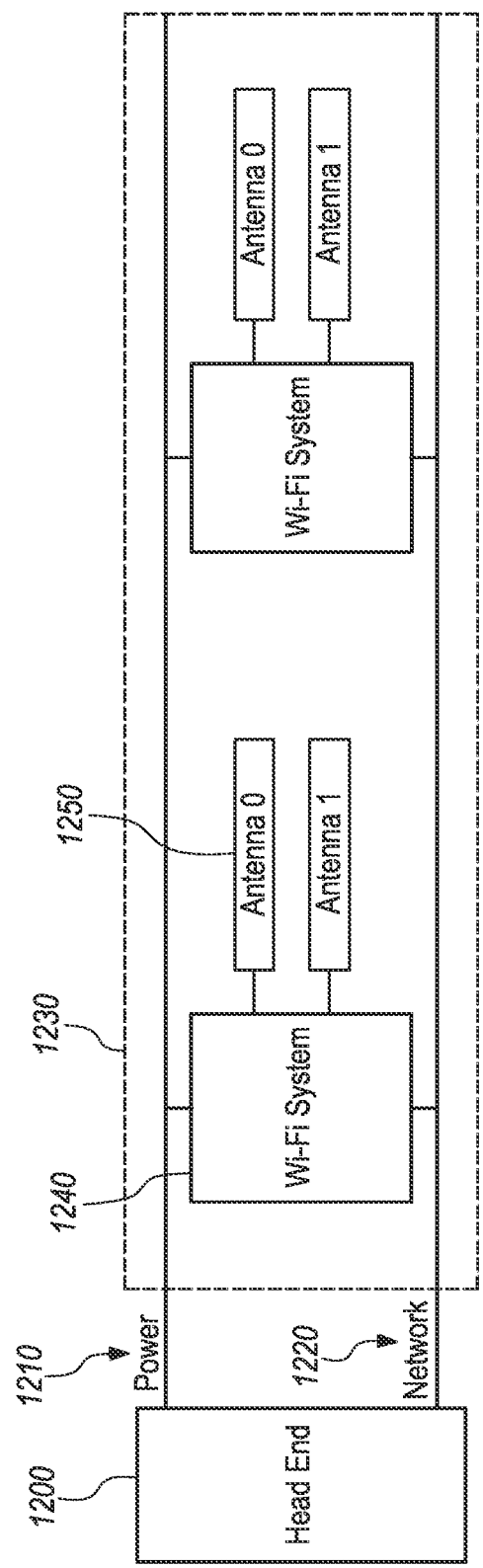
FIG. 12 is a diagram of an embodiment of the invention, showing a head end providing power and networking to a strip with repeated wireless systems.

FIG. 12 shows a transceiver strip 1230. At minimum, a Wi-Fi System 1240 contains a digital to analog transceiver. In some embodiments, however, the Wi-Fi System contains an entire system-on-a-chip. In these embodiments, the network lines connect the systems together. In some embodiments, the network line is a high-speed bus. In some embodiments, the network line is a tappable network, such as a hubbable or modified point-to-point Ethernet. In some embodiments, the network line functions as an addressable backplane. In others, it is a broadcast medium. In some embodiments, the head end 1200 provides networking 1220 and power 1210 for this strip. One possible advantage of these transceiver embodiments is that, limited by power and bandwidth, multiple systems can communicate simultaneously, on the same or different channels. In this way, these strips may be allowed to act very much to the installer the way inexpensive LED strips do: measure out as much as you need, route it where you want, and cut it if desirable. The system is then able to determine how much of the strip to use and when and where to use it, as disclosed below.

Figure 13:
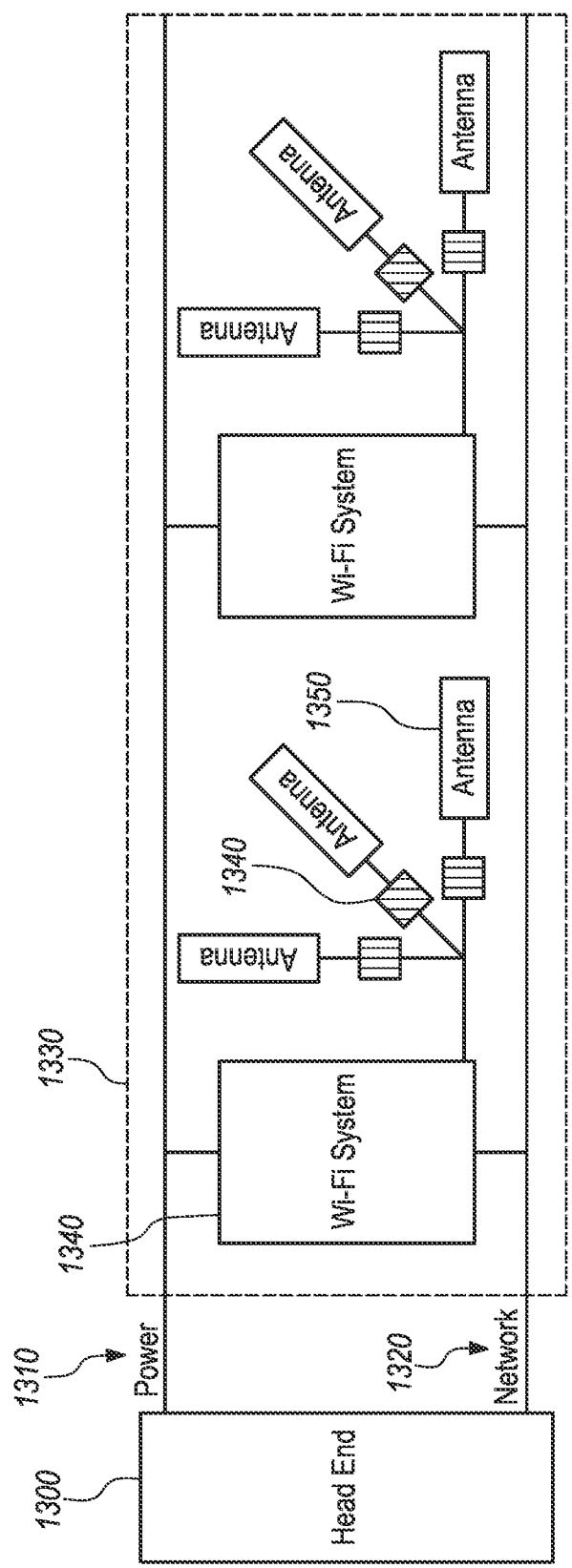
FIG. 13 is a diagram of an embodiment of the invention, showing a head end providing power and networking to a strip with repeated wireless systems, which each drive repeated selectable antennas.
Figure 14:
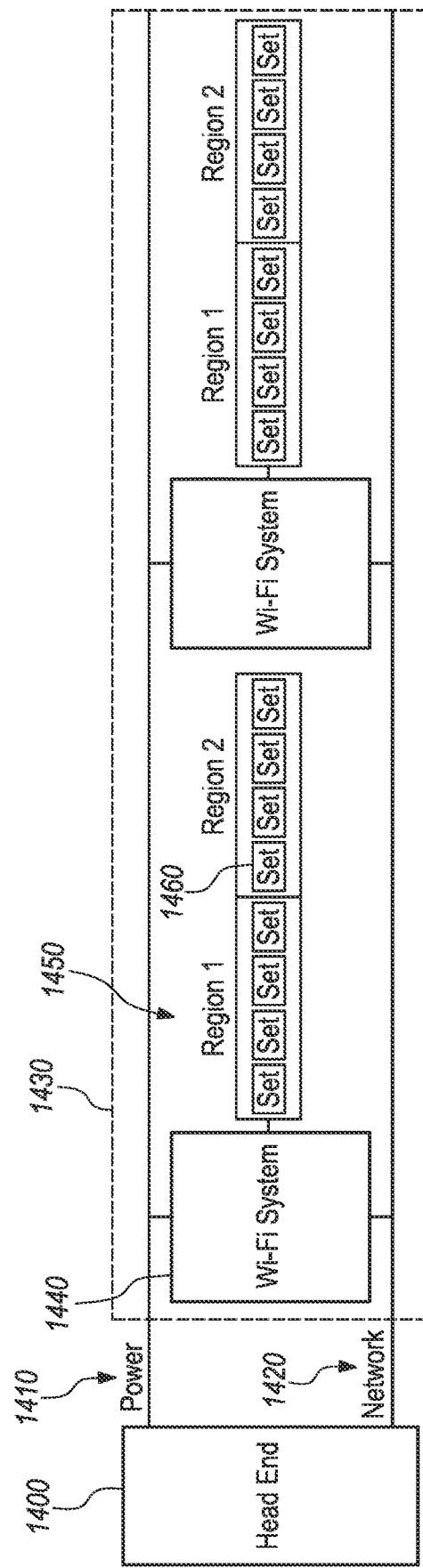
FIG. 14 is a diagram of an embodiment of the invention, showing the composition of multiple selectable antenna sets of an antenna strip embedded with repeating wireless systems on said strip and driven by a head end.

Because the strips provide multiple possibilities, the previous embodiments of having multiple antenna patterns per the lightbulb form factor can be used directly on the strip, such as shown in FIG. 13. For clarity, only one antenna lane and its switchable choices are shown, but the combination is generic and can extend to multiple lanes and choices. The switches 1340 and antennas 1350 may be operated in the same manner as those of FIG. 4. FIG. 14 shows an embodiment with a generic combination, where the strip 1430 is divided into repeating meta-regions, containing a Wi-Fi System 1440 acting as its own controller and head end of subregions 1450 (two are shown, any number are possible), each containing antenna sets 1460 (four are shown, any number are possible), where the antenna sets may comprise any of the disclosed embodiments including passive multiple antenna lanes, actively switched lanes, converted lanes, and so on.

The strips so far have been described as flat, two-dimensional objects. However, because the antennas may need to be in three dimensions, some embodiments also are three dimensional. In some embodiments, the antenna sets are mounted on daughter strips. In some embodiments, the antennas are stiff wire soldered or connected in the correct place. In some embodiments, the strip itself is crimped, folded, or turned at intervals to allow it to cover different orientations before returning to its original orientation. In some embodiments, the strip has at repeating intervals a mechanical connector, such as a rotatable connector (among which are those that rotate freely with brush rings, or those constrained by a cable) or a foldable or flexible bridge, to allow for altering the orientation at installation time. In some embodiments, the antennas are motorized, as previously disclosed. Some embodiments mix and match, having some parts be flat and other parts have these options, per manufacturing specifications.

Strips may have an efficient form factor. However, the techniques of interconnection that have been disclosed on a strip can be done outside of a strip. Therefore, other embodiments use the above disclosed structures, but separate the circuits using wires or cables. For example, some such embodiments are to have the antenna sets each mounted on its own circuit board (flexible or not), connected by cables containing the same structure. Other embodiments merely separate the repeating units into separate strips or circuits, connected by cables. This may be created on the field, the same way that LCD strips may be cut and cabled on the field (including using solderless contact closure cables), or they may be produced this way in manufacturing. The cables may have plugs in them to allow field reassembly of a string as long as desired, or they may not.

Because cabled strings have a useful form factor, a further set of embodiments are directed towards driving a string off of a limited power budget, such as off of one or more Power-over-Ethernet (PoE) drops.

The lightbulb and strip embodiments converge for a specific set of embodiments. Long tube bulbs may require more than one antenna set, and thus in some embodiments the tubes include two or more antenna sets, as installed as strips or by wires. Further embodiments allow for the strips to, not surprisingly, also have lighting integrated and operate as LED strips as well.

Note that the number of antennas, the length of the strips, and the layout and spacing of antenna sets and repeating units or regions on the strips are manufacturing options and are not limited per the figures or descriptions.

Existing buildings, and new ones by default, are often populated with PoE cables for the rooms. These PoE cables are drawn today for traditional Wi-Fi deployments, where it is expected that one access point will be connected to the PoE port, and thus will receive its networking and power. PoE, unlike traditional AC power, is severely wattage limited, and thus it is highly unlikely that a strip containing, say, 20 active Wi-Fi transmitters at full power can be powered off of one PoE port. Besides power, other resources, including over the air interference, network bandwidth, and even radiated power human exposure concerns, can lead to a need to dynamically budget.

Figure 15:
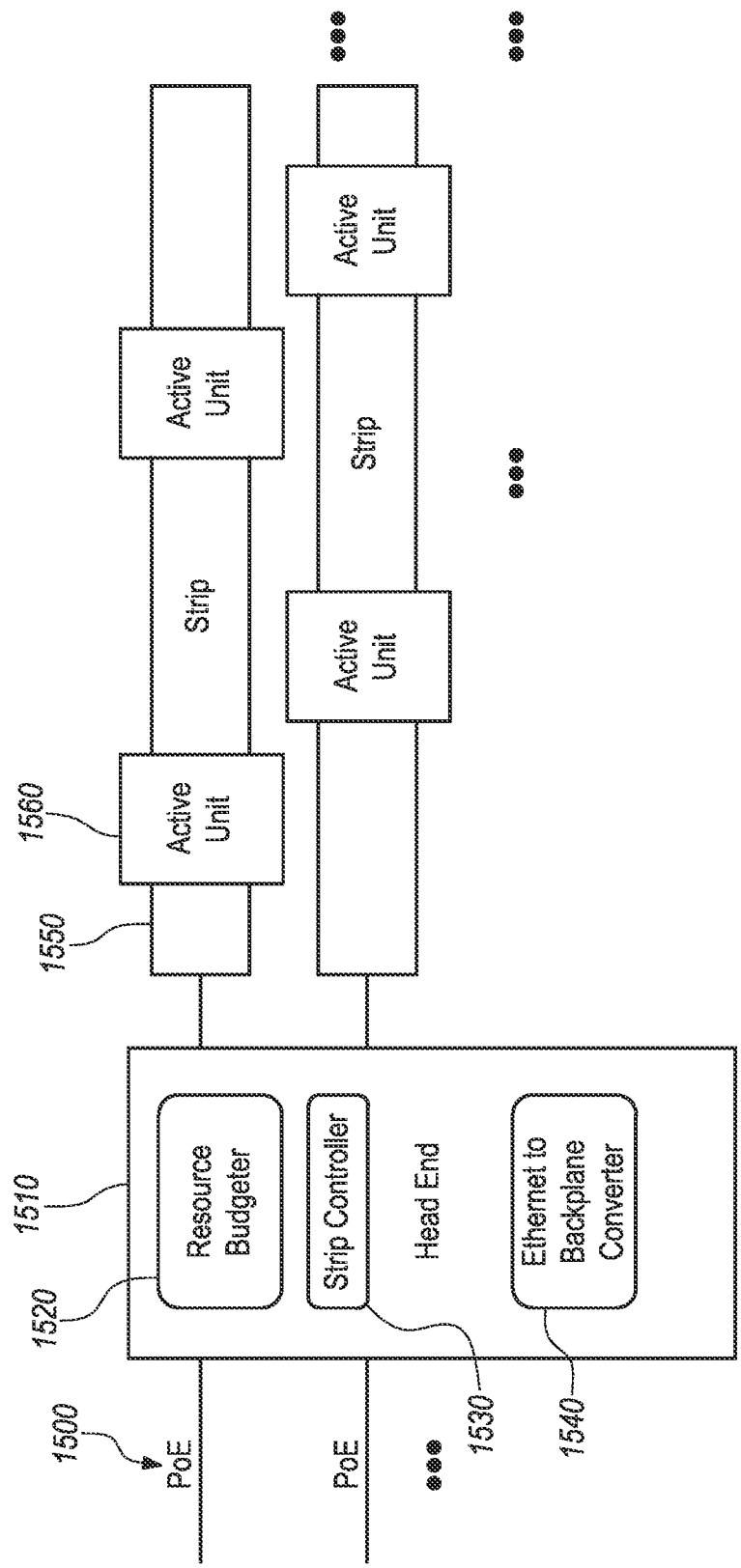
FIG. 15 is a diagram of an embodiment of the invention, showing resource allocation driven by the headend into selecting active units from the totality of units on one or more strips.

Some embodiments address the need to fit within a power budget by limiting the number of activated circuit components. (Without loss of generality for other resource constraints, the term "power" may be used below to stand in for the generic resource.) FIG. 15 illustrates some embodiments that perform resource budgeting. For one or more strips 1530 (or strings if cabled) with multiple Wi-Fi Systems containing complete systems on a chip, a resource budgeter 1520 can request for the SoC to power down into a power saving state. Some embodiments allow for the SoC to wake back up using Wake-on-LAN on its wired network. Some embodiments use specific addressable power controller switches to control the SoC power directly. The resource budgeter can request for multiple transceiver sets to turn down or off individual transceivers, as well.

In some embodiments, the resource budgeter is able to measure the available power dynamically; in others, it is manual. In some embodiments, the resource budgeter can measure the length and contents of the string or strip, such as using a discovery protocol (digital, broadcast, or using keyed passive components such as resisters or capacitors at different values corresponding to different cut points on the string's length. (Picture a 100 kiloohm resister bridging in each cuttable region across two lanes of the strip, so that cutting the strip so that it contains five regions would have five 100 kΩ resisters in parallel for 20 kΩ total.) The resource budgeter in some embodiments is located in the head end 1510. In others, it is located in the repeating units of the strip or string.

Note that one or more PoE ports may be bonded to increase the power available. Below is shown some embodiments of a resource managed PoE strip set.

Figure 16:
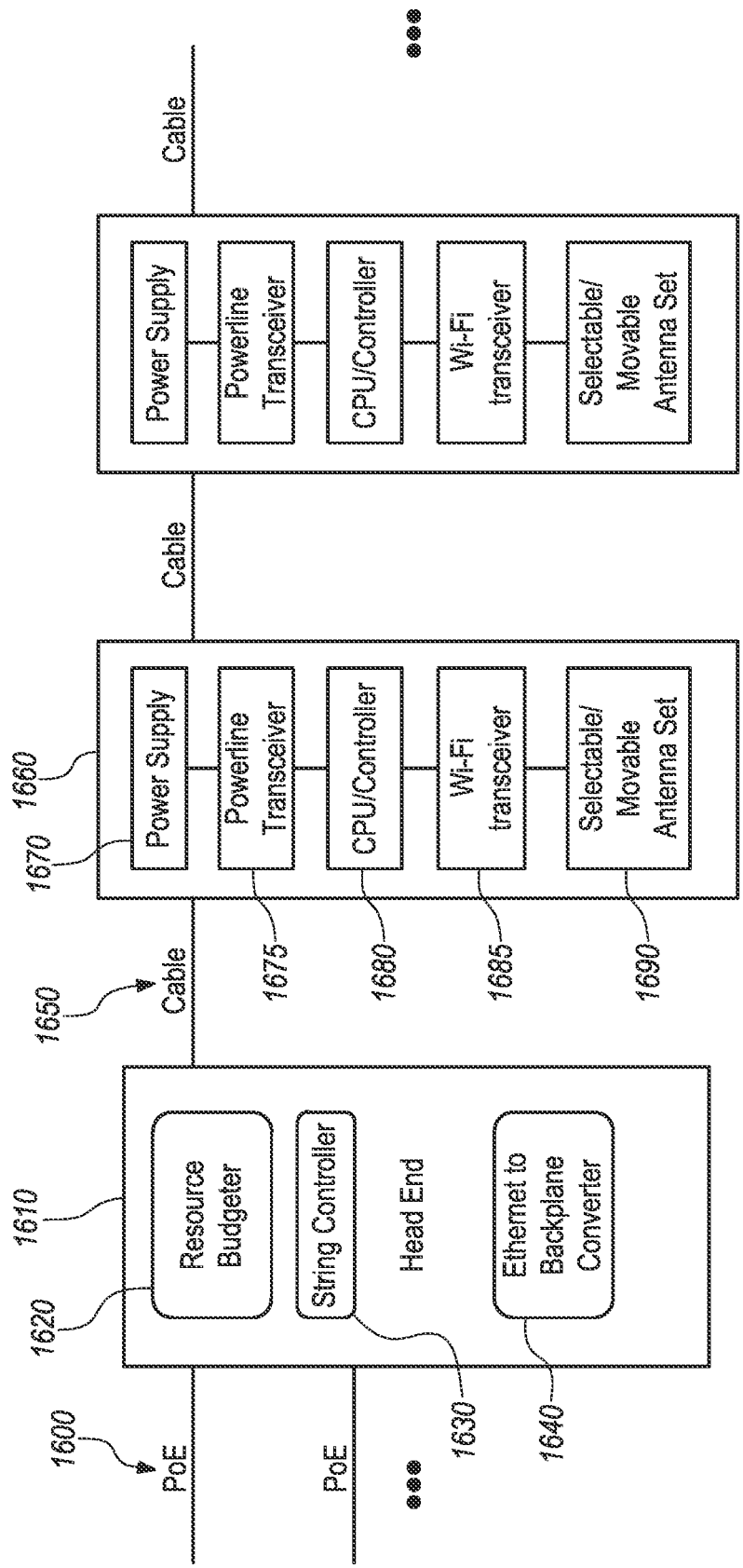
FIG. 16 is a diagram of an embodiment of the invention, showing a head end driving over cable, as opposed to a strip, multiple wireless systems.

FIG. 16 shows a similar embodiment to the prior figure, but as a string, with wires or cables 1650 connecting individual units 1660 together, back to a head end 1610 driven by one or more PoE lines 1600. In this embodiment, one may think of the entire unit as being similar to an inexpensive Christmas light string, except that the service being provided is wireless. And, as before, other embodiments replace the PoE with other networking and power options. Some embodiments use AC power to power the head end, as an option or as the only option, and connect to the network through other means, such as Ethernet ports. This is a small modification of using PoE to power, by allowing local power sources. Because the string may be long, providing power locally may be more convenient than in traditional PoE applications for wireless. As before, the cables may be wired permanently or pluggable. Some embodiments use only powerline and replace the PoE with powerline and a powerline transceiver for the head end. Some further embodiments then deliver low power and a separate network line to each of the units on the string. Other further embodiments retain AC power down the line but have a separate wired network in the cable. Other further units use powerline networking and power technology throughout the string.

Figure 17:
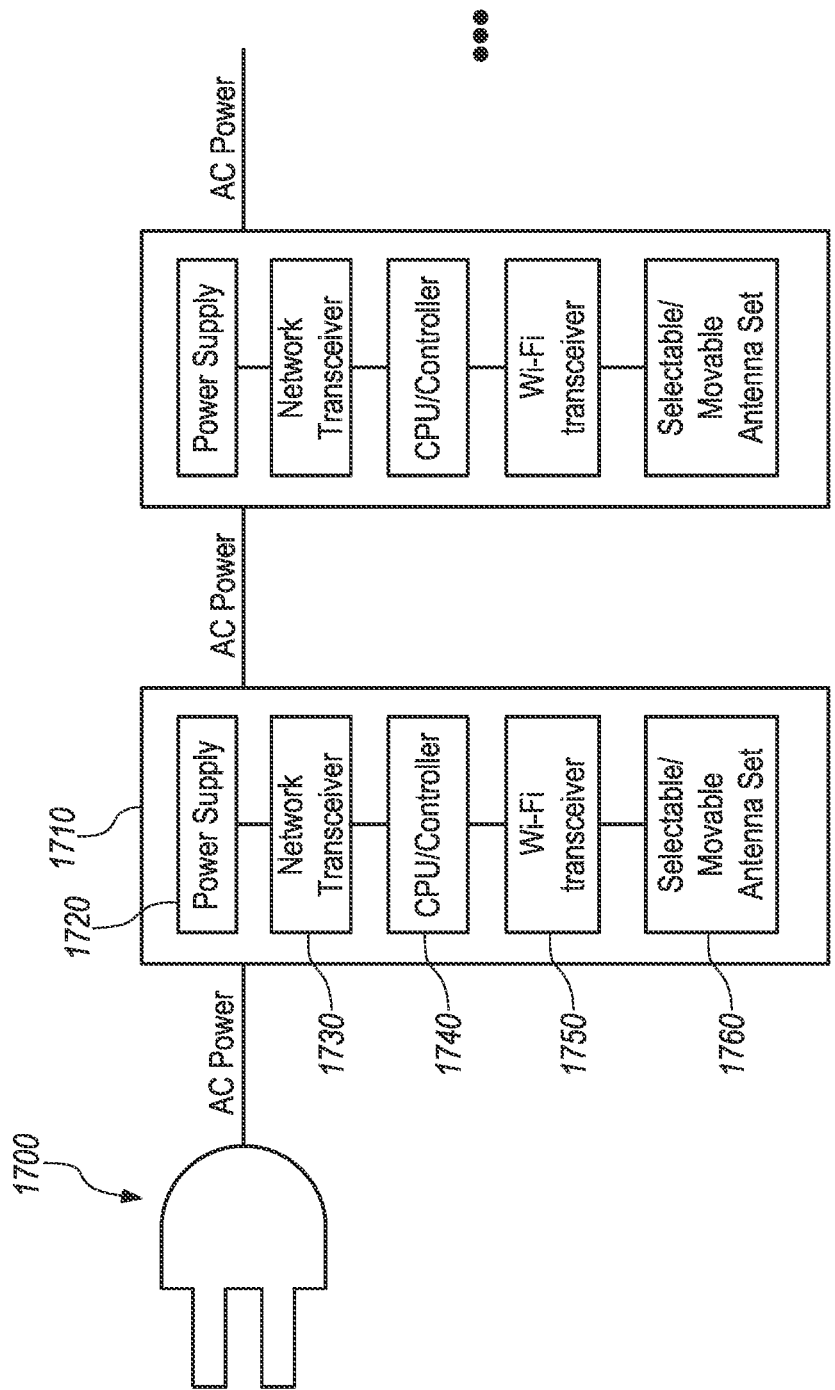
FIG. 17 is a diagram of an embodiment of the invention, showing repeated wireless systems driven in a string using AC power.

FIG. 17 shows embodiments which dispense with the head end completely and use powerline to drive the individual units on the string or strip, by introducing local power supplies 1720 into the individual units 1710. Some embodiments further use powerline transceivers 1730 to access wireline networking using the same power. Some embodiments relocate resource budgeting to one or more individual units of the string, such as the first unit; others relocate resource budgeting off string, such as to a different unit or different head end, or to a server, appliance, or cloud; others dispense with it completely. In these embodiments, each unit has a powerline transceiver to communicate over the AC power. Some embodiments use junction box wiring instead of a plug.

Once a building is full of lightbulbs or strips of possibly densely overprovisioned Wi-Fi (or other protocol, such as Bluetooth or 4G/5G), the issue of control arises. It makes no sense to power up each radio fully into transmitting: doing so would make the problem of interference much worse. However, having the flexibility to choose which radios among the entire set allows the embodiments to approximate the ever-shifting optimal location using the rich array of deployed options for locations. This approximation can arbitrarily approach the total optimality of having radios that can be driven to the correct locations on some sort of mobile platform (a robot, say).

Figure 18B:
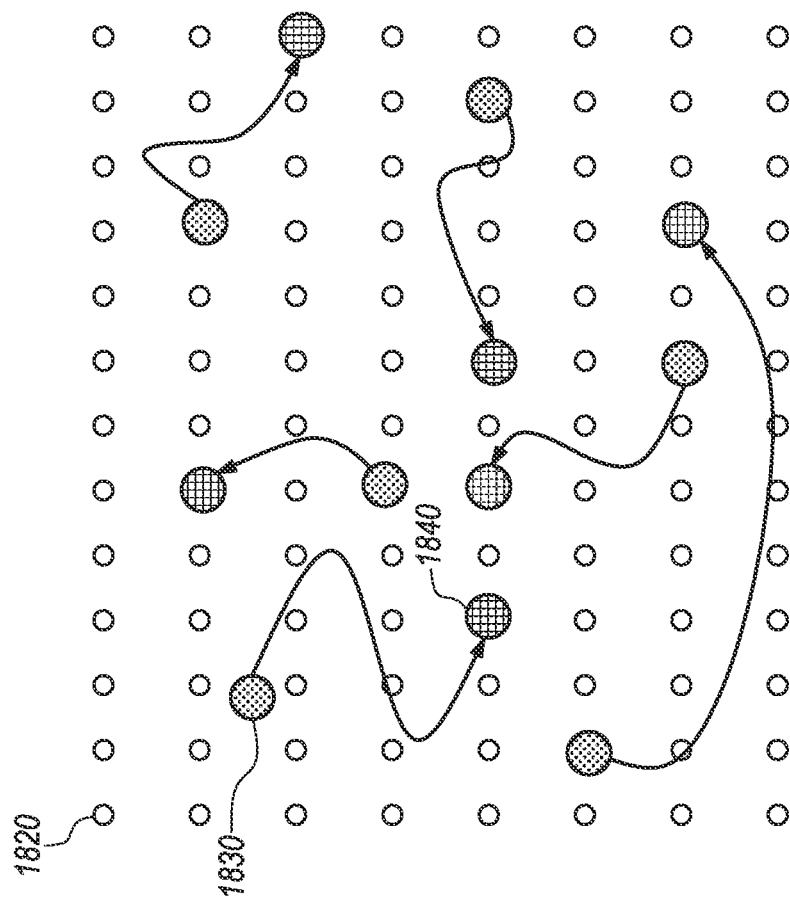
FIG. 18A, FIG. 18B illustrate a possible benefit of an embodiment of the invention, wherein access point transmission locations are set electronically to points amidst a higher density of selectable locations, thus possibly more closely emulating the situation of if the access points could be physically relocated to their optimal locations from their current ones.
Figure 18A:
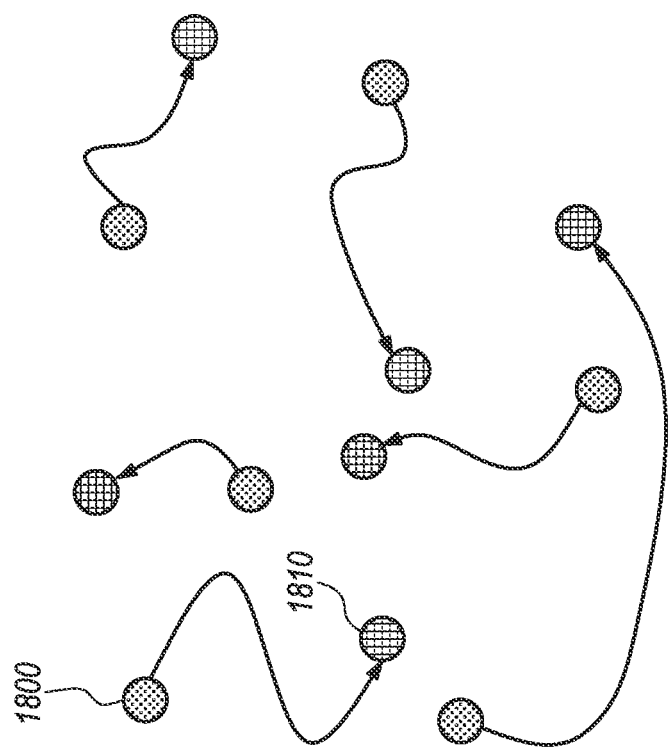

FIGS. 18a and 18b compare the ideal circumstance of base stations 1800 and 1830 being physically moved to the optimal locations 1810 and 1840 in reaction to the changing network needs in part a, versus in part b the approximation to that gained by the densely deployed resources, most of which are disabled (small empty circles 1820), but some of which are powered on and operated as needed. Without the ability to control this and create reasonable approximations to optimal or rationally deployed resources, dense deployment of any form will lead to failure, which is one reason why existing Wi-Fi lightbulb manufacturers haven't bothered to turn their bulbs into access points and enter the Wi-Fi infrastructure business. (Another reason, as mentioned before, is that until this invention doing so was extraordinarily cost prohibitive and not installable.)

Figure 19:
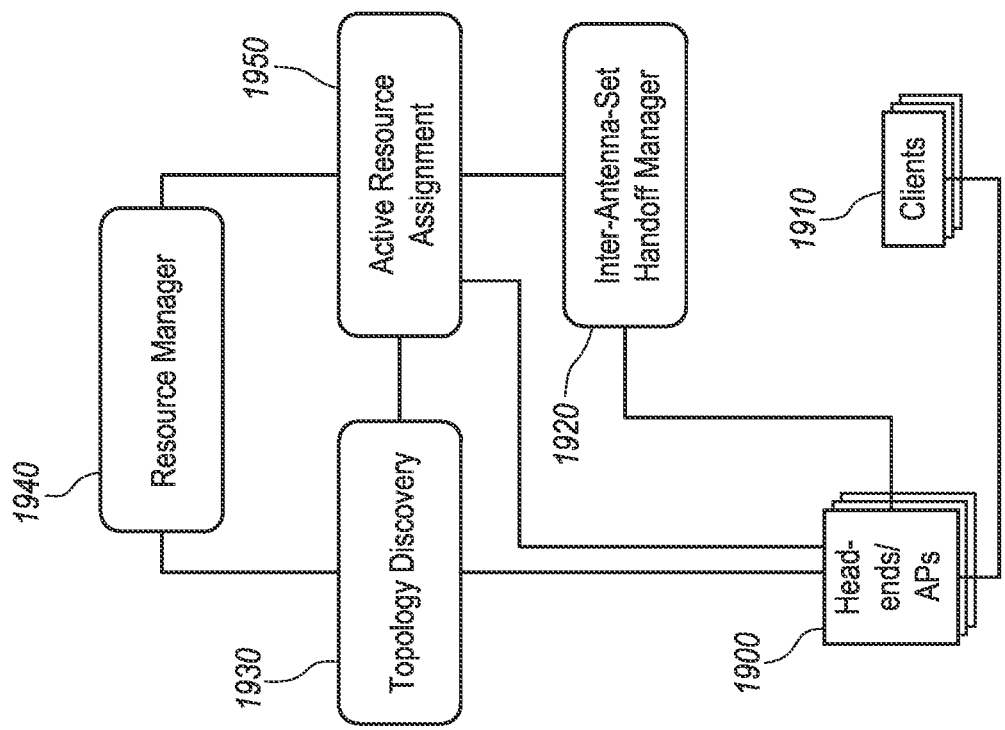
FIG. 19 illustrates a diagram of an embodiment of the invention, showing resource management and topology discovery across multiple head ends or discrete access points.

FIG. 19 lays out the basics of dense or over-deployment resource management. Radio resource management today is limited to mostly standard deployments. In a minor case of over-deployment, it can power down some APs, and in some cases suggest or automatically turn a few egregious ones off. But these are designed for deployments where the excess resources that need to be cut off are far less than the number that are active, whereas what is disclosed here is for the case where the excess resources, like in FIG. 18b, far outnumber the active resources. That scale is key. When properly deployed, a densely deployed network on a typical enterprise campus will have radio resources at numbers greater than 10,000, and in some cases approaching densities of one antenna set per square yard or more in the areas of physical deployment. Existing radio resource management techniques have not been built, at any point, for that sort of density or scale, which is why they are limited to operating on expensive, lovingly installed access points.

The location of the resource manager is flexible. In some embodiments, the manager is software located in a controller appliance. In other embodiments, it exists in one or more locations as software, such as on servers, desktops, or in head ends or CPUs located elsewhere within the invention. In some embodiments, it runs in the cloud. The resource manager in some embodiments exists as only one entity; in others, multiple such resource managers, or elements thereof, may exist and coordinate with each other.

A topology discoverer 1930 is in charge of understanding just where all the resources ended up. This can be measured in radio space (measured by the signal attenuation between two measurable objects), physical space (measured by location, such as using GPS or BLE), or combinations of the two. Since, unlike with a traditional Wi-Fi network the resources may so greatly over deployed, topology discovery becomes quite simple, as a high number of other resources are in range of any one given resource in many cases. Some care is needed, however, in measuring the topology. In power or resource constrained systems, it may not be possible to power up each antenna set at once. However, a bootstrapping mechanism is available. One such mechanism is to turn on a subset (such as a maximum subset available based on resource constraints) of the resources and record the topology, then turn off some smaller subset of resources and turn on another subset that was not yet turned on, and integrate the two subsets together. If the topology is maintained in graph form, this is trivially done. If the topology is also laid out in some metric space, then a best fitting will usually need to be done as there is statistical noise in the measurements usually and some conformation will usually have to be found. The nature of the topology measurements often allows for them to be done on an operating environment: usually, the enabled resources will be less than the maximum resource budgeted, but even if not, existing resources can use protocol methods (such as requesting a silent period to go "off channel" as in 802.11k) to power down and allow another resource to turn on. Note that a resource is as granular as an antenna: this allows for the system to cycle through or search through antenna patterns as well as transmitters, full radios, and full access points. Part of the topology should include the distribution of users and their wireless clients.

Once the topology is known, a resource manager 1940 can evaluate the dynamic network utilization and demands and determine what the new best distribution of resources should be. Some embodiments take into account TCP load. Others take into account application specific knowledge, such as tracked application state. This can be very useful for streaming applications, where the video stream can be anticipated from its exchanges. Other embodiments use past statistical history. Other embodiments use specific resource requests. Some embodiments take into account minimizing service disruption, or at least weigh the cost of service disruption to existing clients as it also evaluates service disruption to new loads that cannot be adequately served by the existing configuration. Once the resource manager 1940 has determined what changes it wishes to make, it conveys them to an active resource assignment storage 1950, which remembers what was requested. If the resource changes are nondisruptive, such as a local antenna pattern change, those requests are conveyed directly to the head ends of the strips and the other APs to execute. If the changes are across some distance, however, then more work will be done. An inter-antenna set handoff manager 1920 is responsible for determining how to execute the reconfiguration across that distance.

The distance problem is important. For example, is may be desirable to move an AP, in the view of the clients. That may put some of them out of range. In some cases, this is an acceptable risk, and the handoff manager 1920 will decide to do nothing about that and execute the move. In some cases, multiple clients will get stranded, and the block will then request clients to relocate. In some embodiments, this occurs by disassociating the client. In some embodiments, the clients' access point requests a load balancing or handoff protocol exchange (such as that in 802.11k/802.11r) to cause the clients to want to leave their current access point (and likely channel). To the extent that the topology shows good suggestions on where to go, these protocol requests can include those suggestions or demands, based on the protocol.

One of the techniques is to preserve the BSSID of the clients as the antenna set is changed. If the old and new antenna sets belong to the same medium access controller, this is trivial. However, if the old and new antenna sets belong to different MACs, the handoff must request the old MAC (and probably thus the old AP) to power down, and for the new one to power up. Some embodiments power up the new one first, subject to resource budgets such as power. Once the new one is up, the handoff manager hands over enough access point state to allow for seamless operation. This can include security tokens and counters, client state machines, application tracking state, and so on. In some embodiments, this state is streamed from the old access point to the new access point, until the access point confirms that it has the state established and is ready to listen on its radio and begin transmission. In some embodiments, both the old and new radios are powered, and the new radio is merely waiting on the new MAC to begin caring: this may be done at the MAC level or through tricks such as setting the BSSID mask to invalid or useless values so that the set does not respond. Once the handoff is ready, then the old and new APs agree to the handoff and execute it in as atomic a method as reasonable. In some embodiments, they agree to a specific cutover time. In other embodiments, one of them waits for a message from the other (over the air or over the back network). In some embodiments, the handoffs can only properly occur within a head unit; in others, it can occur between any two MACs and their APs. Note that the client will not see a handoff and will experience the AP magically jumping from one location to the other, even though in reality the transition happened between two APs. This is because a smaller set of BSSIDs is being assigned to a much larger set of APs, thus breaking the traditional one-AP-per-BSSID mapping. This is entirely within the standard, as such a transition appears as merely a physical relocation or a failover event. Care must be taken not to violate the expectations of the client without fair warning, such as transitioning radio capabilities that are not properly advertised and allowed to be changed during an association of a client. The handoff manager is responsible for taking that care, and if it decides it needs to violate that rule, to assign possible new BSSIDs to prevent client confusion. A channel change might not require a BSSID change, because access points routinely change channels in traditional systems.

Many of these embodiments have what may be simpler installations. In many cases, an installer can simply walk to the beginning of a long hall, say, and roll out the strips, perhaps merely resting them on top of ceiling tiles. Strips may also be installed in the visual space, and thus may be painted to match. Temporary installations require merely rolling back up the strips when done. For plug in or lightbulb embodiments, merely screw in enough of these that there is sufficient density for the room. The density may remove the need to perform a "site survey" or think too deeply about the ramifications of interference or density. So long as enough items are installed, the system may be able to solve for a good resource activation. For strips that do not include the transceiver, it may be possible to even upgrade the radios from one standard to a different one, with different hardware, by merely replacing the head end and leaving the strip in place.

Figure 20:
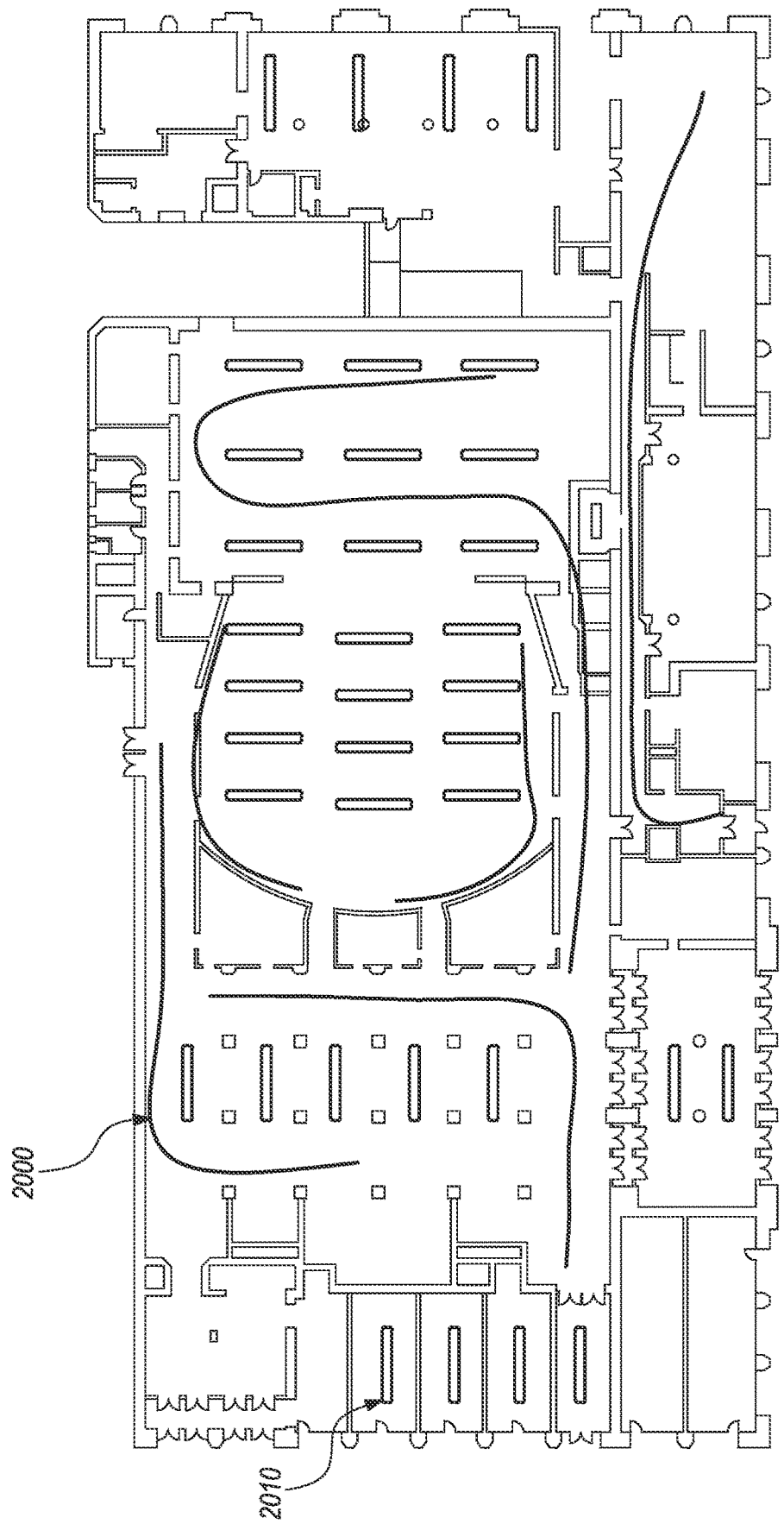
FIG. 20 illustrates a method of installing multiple embodiments of the invention.

FIG. 20 shows an example deployment with both strips and bulbs, on a floorplan, thus illustrating potential advantages of the disclosed invention. The long strings 2000 are strips or strings that have been mounted. The rectangles 2010 are lightbulb embodiments (in this case large tube lights). The strips are mounted with head ends powered by PoE (not shown in the figure), based on convenient drop locations. The bulbs run back through the power main to a powerline network converter which bridges it to the Ethernet backbone (also not shown). In a closet (not shown) is the resource manager, which orchestrates the entire system together.

As described in detail above, some embodiments use strips (or wires or sheets or other distance or area filling materials) populated throughout with multiple switchable antennas connected to multiple radios on the strip and connected by a backplane. In some embodiments, various antennas may have different patterns and locations at multiple distances along the strip, thus allowing that disclosed system to choose one or more antennas with those different patterns at different locations along the strip to assemble, based on switching decisions, a total pattern of potentially nearly arbitrary shape. The strip is populated with many different antennas, at many different patterns, and to assemble one or more of them into a cohesive pattern.

Figure 21:
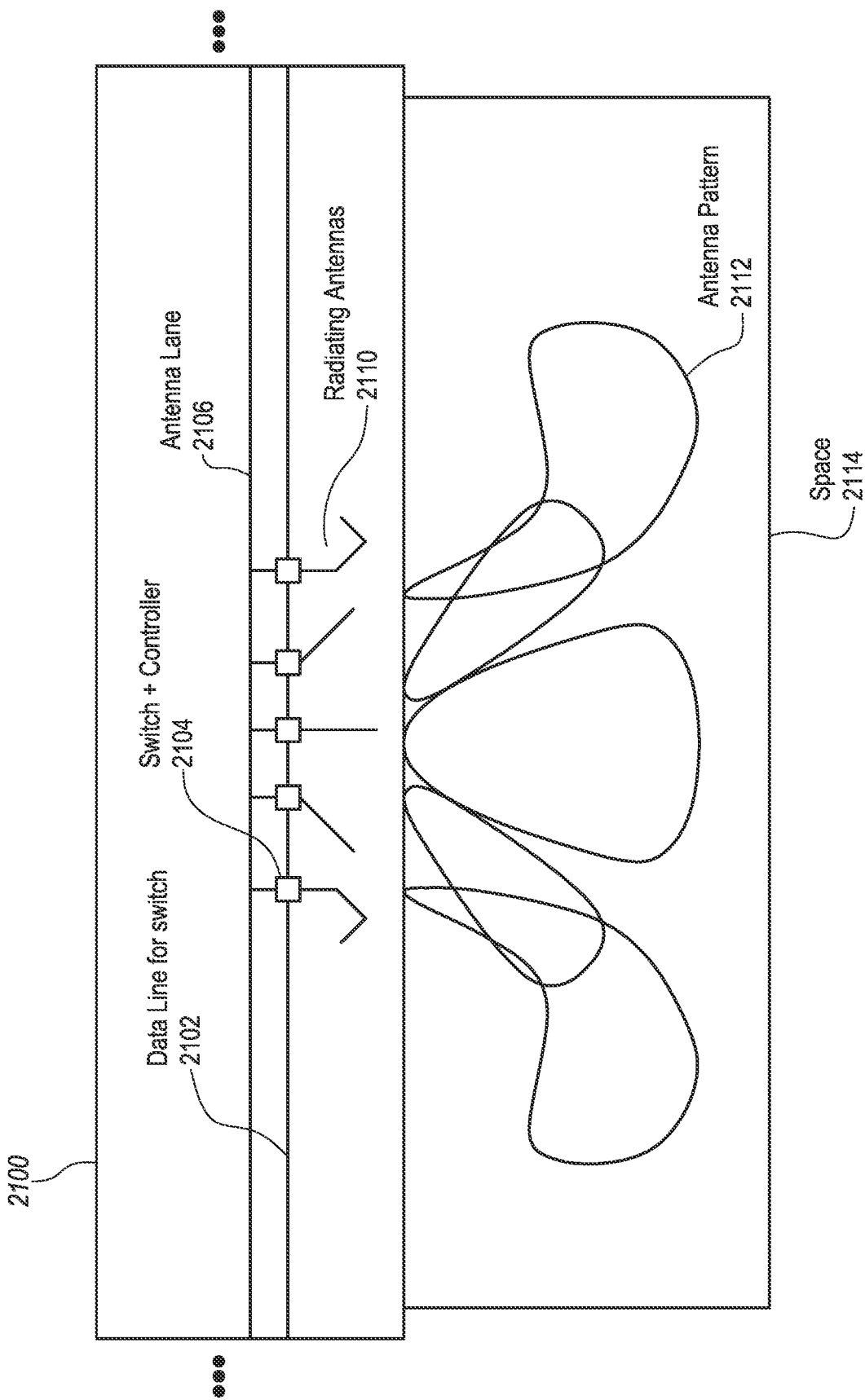
FIG. 21 illustrates an example deployment of a flexible wireless networking system.

FIG. 21 illustrates an example deployment of a flexible wireless networking system as described above, including multiple radiating antennas 2110 coupled to antenna lane 2106 through respective switch/controller pairs 2104 and showing the spatial antenna lobe patterns 2112 (for coverage) out into space 2114 from the strip 2100. The radiating antenna shapes are shown for illustrative purposes. In other embodiments, different antenna shapes may be created to produce different radiation patterns (such as by micropattern printing), and as described above, a combination of two- or three-dimensional radiating material shapes can be used. Also, the orientation of the strip 2100 to the space 2114 to be radiated into is variable. For example, the diagram shows edge-on radiation for simplicity of illustration, and edge-on patterns are of interest. However, other embodiments may implement face-on radiation or anything in between. Note that while FIG. 21 shows all of the switches as switch/controller pairs 2104 on a data line 2102, as one embodiment, other embodiments may include parallel switch lines that are dedicated to each switch and controlled separately as on/off signals. The system has a choice between any or all of these patterns, and software (or hardware) can change the switch states to assemble the individual patterns into a larger pattern. The choice of the patterns may depend on the environment and the operational or performance goals.

Figure 22:
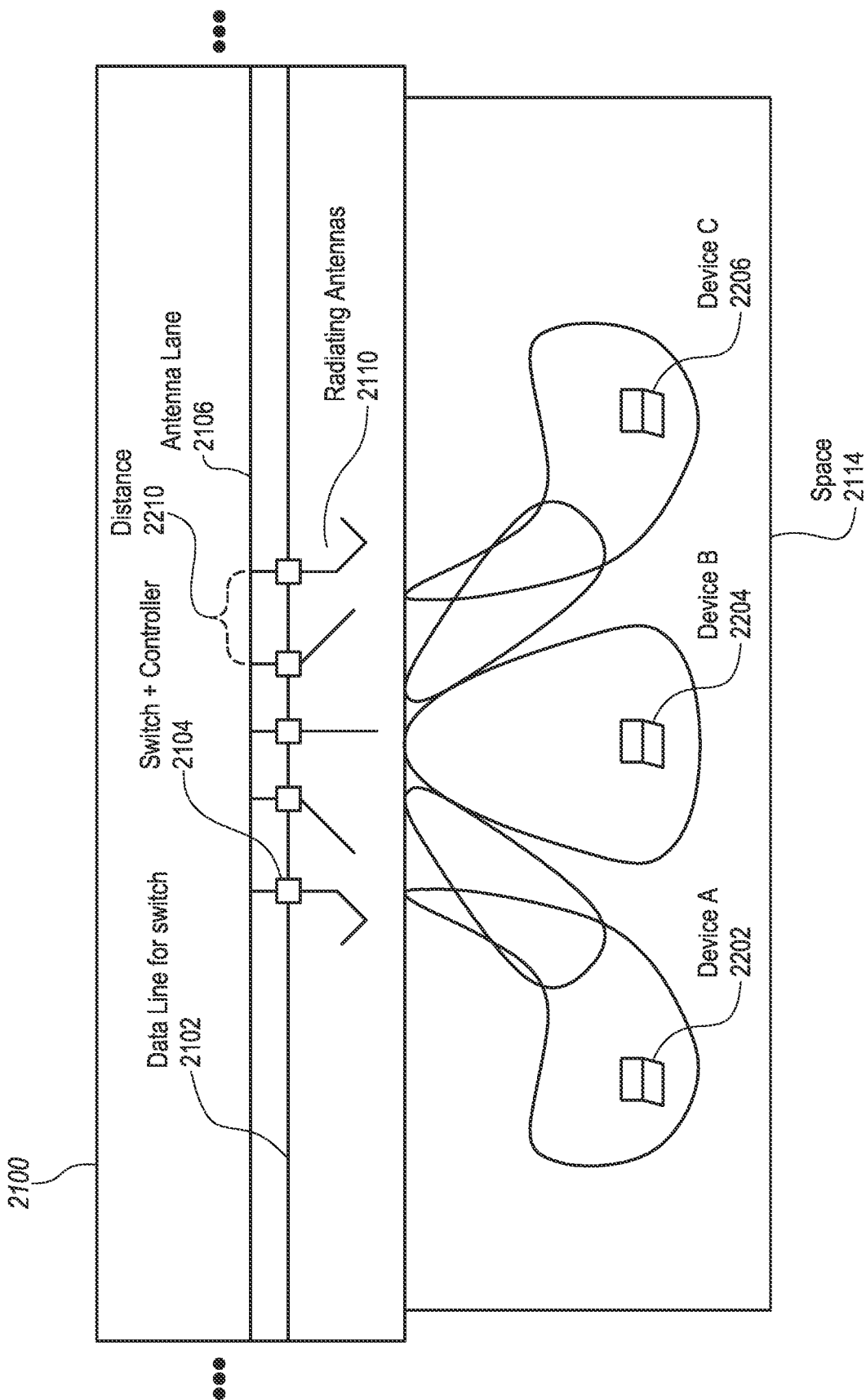
FIG. 22 illustrates a scenario in which three wireless client devices are in range of the strip shown in FIG. 21.

In FIG. 22 there are three wireless client devices in range of the strip 2100. Note that the distances between pairs of antennas, such as distance 2210 between the fourth and fifth antennas, may be any arbitrary distances ranging from mere inches to many yards and can be different between different pairs of adjacent antennas on the strip 2100. In the illustrated example, if Device A 2202 is the device the system cares about getting maximal SNR from, it ought to include the leftmost antenna in its choice. If it cares about Devices B 2204 and C 2206 as well, it should include the middle and rightmost antennas. However, if it wants to exclude the signals from Devices B 2204 and C 2206, it should exclude the middle and rightmost antennas instead.

Note that this choice is quite different from the antenna choice of a traditional discrete access point model. The current state of the traditional model usually assumes that each antenna feeds generally into its own distinct RF transmit and receive chain, which then is processed using linear decoders as appropriate for MIMO transmission. Where there are multiple switched antenna choices for a single RF chain, they are aggregated into antenna arrays, which are collocated in the access point and are usually spaced or angled to take advantage of some specific directionality or intentional interference pattern created by the fixed radiators. In those cases, the antenna locations and angles are assumed to be rigidly fixed and constrained within the small confines of collocation. Arrays based on beam directionality, for example, only work because the fixed assembly is populated with enough overlapping directional antennas to ensure the overall coverage is maintainable. This assumption percolates down to the processes and software they use for making such selections. In the flexible wireless networking systems described herein, the antenna choices are not collocated in to fixed arrays. The choice in FIG. 21 is not generally one of beamforming. For example, the individual antennas 2110 are potentially many yards apart, with the distance and orientation not necessarily known in advance and infinitely variable based on the shape of the installation (such as folds to move around pipes, bend at corners of walls, and so on). The choice the system makes is one of locating, moving, and shaping the cell across broad areas of space. Thus, it is not limited to beamforming or similar collocation operations.

Note that the choice made in FIG. 22 might not ultimately be about any specific clients, but about the projection of the antenna patterns into sizable areas of space and what the consequences are. The deployment goal of the strips is usually to fill an area, e.g., a building, with myriad radiation options, cheaply and easily. As there will be multiple radios, there will be multiple collision domains as the multiple radios compete for upstream and downstream access. If two radios are on the same channel, then their downstream and their clients' upstream transmissions can interfere with each other. Interference always happens on the receiver and is a function of the receiving radio's ability to reject the irrelevant competing simultaneous transmissions as noise. That in turn depends on a variety of factors, such as the respective transmission powers of the signals, the encoding used, the nature of the training preambles and headers employed by the protocols. If the radios are on different channels, but adjacent, then there are also issues with spillover, as transmitters do leak power outside their designated channel band, with well-understood rollover functions that can produce interference, often between to clients next to each other on those different channels, assigned there for range or load-balancing purposes.

In some cases, multiple radios may have access to multiple antenna choices each. For simplicity of analysis, one may imagine an antenna strip made of a very simple antenna pattern that repeats per radio. An example of these antenna patches is illustrated in FIG. 23A, FIG. 23B. Specifically, FIG. 23A illustrates a mixture of radiation shapes and directionalities producing a radiation pattern 2310 shown in FIG. 23B that has a shape of a flower. Each element 2305 in the pattern of the antenna patch shown in FIG. 23A produces one of the overlapping shapes of the overall flower pattern 2310 shown in FIG. 23B, and though the switches and lines are not illustrated for clarity, each patch can be independently added to or removed from the overall pattern. The patches are not necessarily a fixed array, and the elements of the patches can be at greater than collocation distances from each other within the patch. One may imagine, further, that the strip 2300 carries its repeating pattern of radios with patches on the ceiling on both the upper and lower halves of a horizontal rectangular space (say, a building) to be covered.

Figure 24:
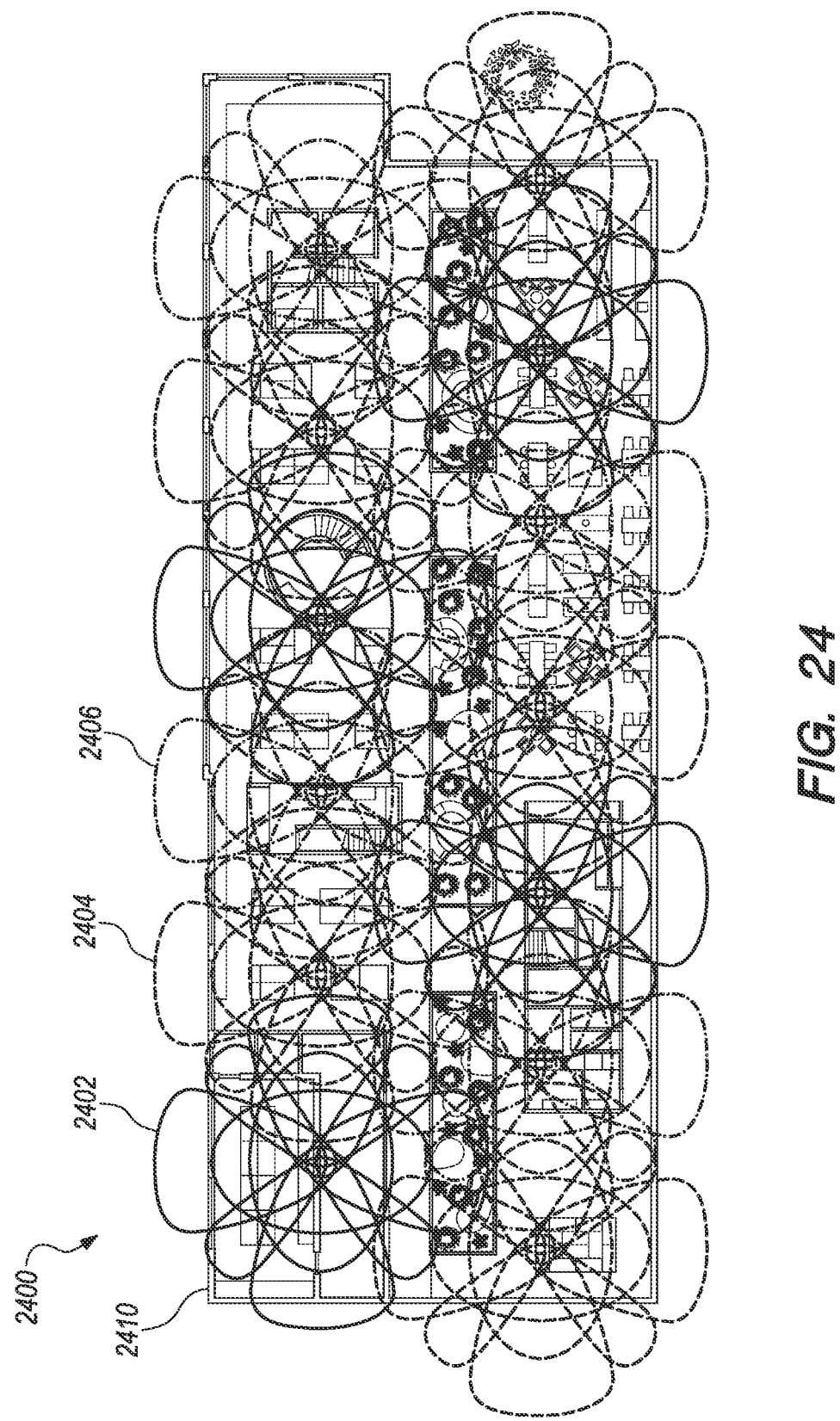
FIG. 24 illustrates an example antenna radiation pattern for an entire building in light of channel reuse.

FIG. 24 illustrates an example flexible wireless networking deployment in which, because of channel reuse, enabling the deployment for the entire building (shown in terms of floorplan 2410) for coverage, results in the illustrated pattern 2400. In the illustrated example, each channel is designated by a different line type: solid (e.g., as in pattern 2402) for channel A, dashed (e.g., as in pattern 2404) for channel B, and dotted (e.g., as in pattern 2406) for channel C. Unfortunately, even in this illustration, which is sparser than is likely in real life, when everything is turned on, the overlap within the overall pattern 2400 is severe. Strings with larger antenna patterns (such as those having multiple remote antenna locations), or with more dense radios, will produce an even greater overlap. In some deployments, this overlap is a clear advantage. However, in many multichannel deployments, it may be advantageous to avoid such a large degree of overlap.

Figure 25:
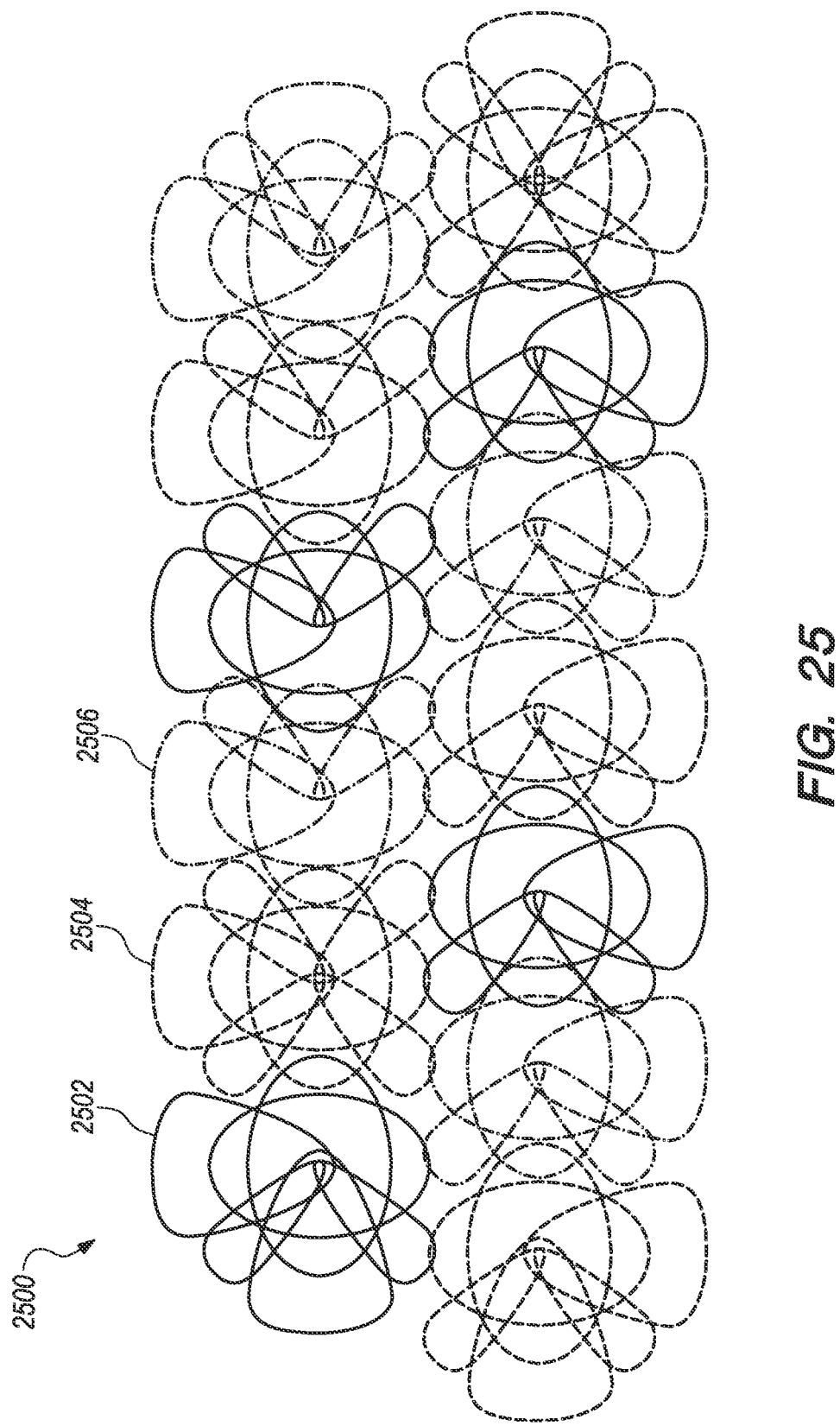
FIG. 25 illustrates an example result of pruning on the antenna radiation pattern shown in FIG. 24.

FIG. 25 illustrates how one can reduce the overlap in the overall pattern 2500. For example, a portion 2502 of pattern 2402 for channel A, a portion 2504 of pattern 2404 for channel B, and a portion 2506 of pattern 2406 for channel C are retained while other portions of these patterns have been removed. (Note that in FIG. 25, the background floorplan 2410 has been removed for clarity.) There are advantages of having done this. For example, both cochannel and adjacent channel downstream interference are minimized by ensuring that the coverage pattern does not over-extend. In addition, the sharpness of the cells prevents clients from hanging on to more distant cells by causing the beacons or other downstream traffic from the cell to not extend further out in space. This makes a client far more likely to change channels and thus prevents a client from causing co-channel interference with a third cell. As a result, coverage becomes more predictable. Furthermore, if signal leakage is a concern for other reasons, such as accidentally sensing more noise from machinery such as microwaves that were otherwise in the coverage pattern, then the offending patches can be turned off.

Figure 26A:
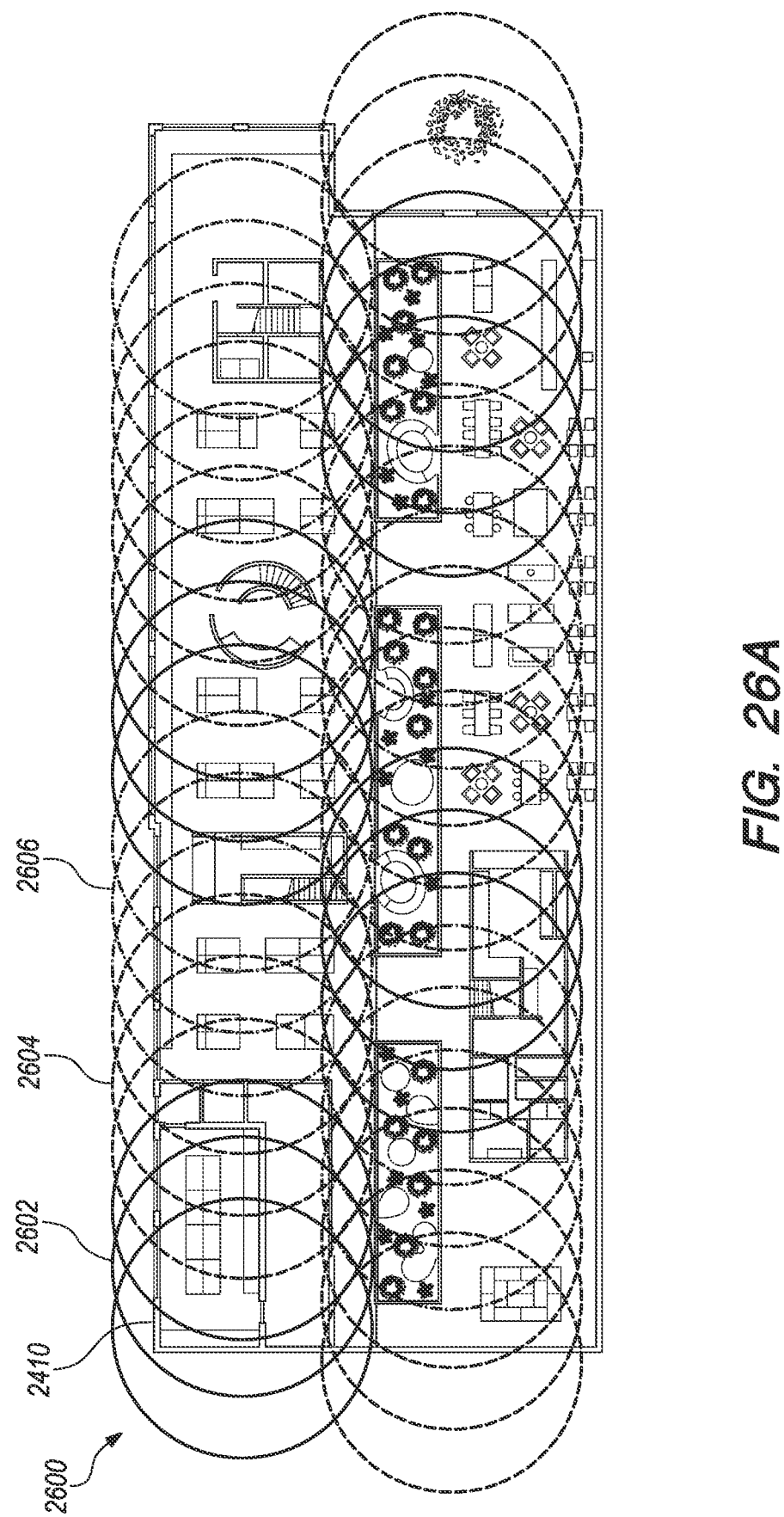
FIG. 26A, FIG. 26B illustrate an example result of pruning on an antenna radiation pattern comprising overlapping circles.
Figure 26B:
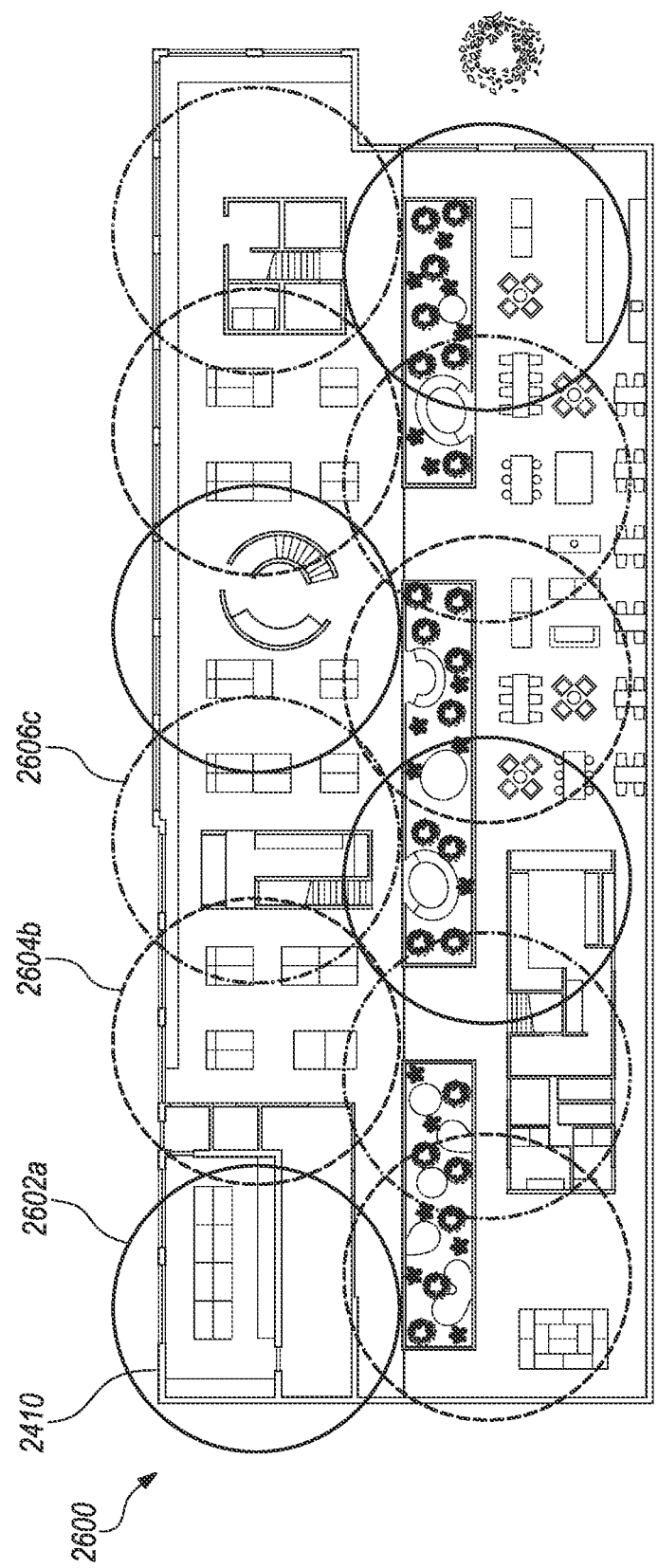

Note that the coverage pattern itself is arbitrary. For example, FIG. 26A, FIG. 26B illustrate a similar analysis using a more simplistic, and unrealistic, pattern of overlapping circles. In this example, a portion 2602a of a pattern 2602 for channel A shown in FIG. 26A, a portion 2604b of pattern 2604 for channel B shown in FIG. 26A, and a portion 2606c of pattern 2606 for channel C shown in FIG. 26A are retained in FIG. 26B while other portions of these patterns have been removed from the overall pattern 2600, and so on As noted above, even the example patterns shown in FIG. 24, FIG. 25 are simplistic compared to reality. The extreme density and pattern choices made available by the flexible wireless networking systems described above can, in the densest forms, create many times more opportunities for detection, resolution, and optimization that are not present in systems that implement a traditional discrete access point model. In traditional deployments, the systems lack the degrees of freedom to produce a meaningful change in the deployment. Because of costs and complexity of individual base station installations, the number of base stations is severely limited, and are thus placed in tension, being as far apart as possible to reduce wasted resources, and as close enough as possible to ensure smooth coverage. The only two configuration options for most base stations are determining the power levels to avoid overdoing the coverage and exacerbating interference or determining whether to turn an entirely pointless base station off entirely. The software algorithms used to perform these determinations in traditional deployments are very limited because of the lack of available useful information and degrees of freedom to do anything about it. But with the degree of freedom provided by the flexible wireless networking systems described herein and the multiple antenna patterns they contain comes methods to use those degrees of freedom to precisely allocate antennas and radio resources to maximize coverage, disclosed herein.

Figure 27:
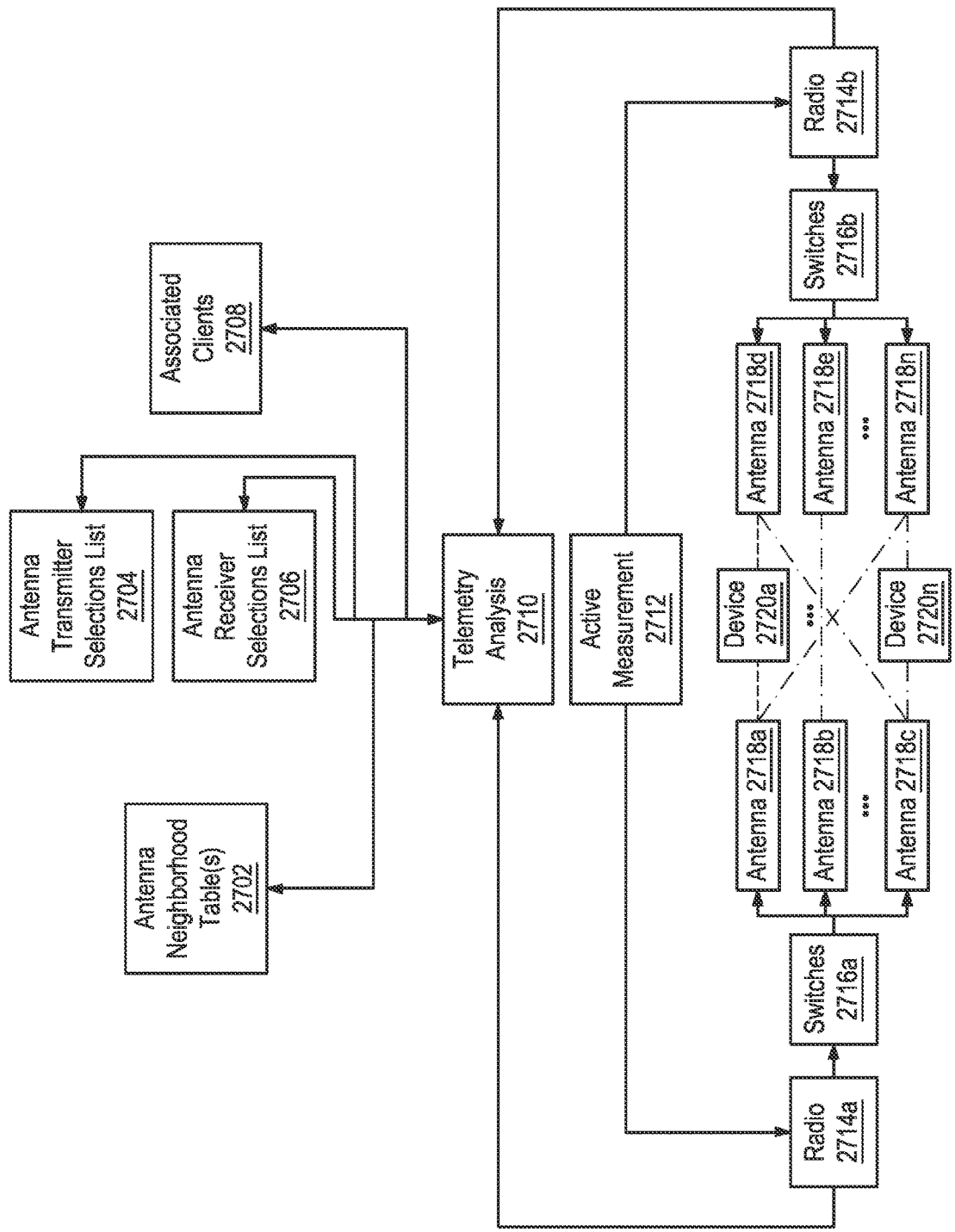
FIG. 27 illustrates an example embodiment of a system and method for software optimization of flexible wireless networking system.

FIG. 27 shows one embodiment of a system and method for software optimization of flexible wireless networking system. In the illustrated embodiment, the system includes one or more radios 2714 (two are shown), with one or more switches 2716 to control one or more antennas 2718, which transmit and receive into space where there are potentially multiple wireless client devices 2720. The different antennas 2718 between the radios 2714 may or may not be within range to communicate to each other and may or may not be in range to communicate with various ones of the wireless client devices 2720.

In a typical operation, the multiple radios 2714 may operate on the same or different channels, up to the number of channels available before reuse is forced. However, the radios 2714 can change to the same channel to ensure communication. Furthermore, in protocols such as Wi-Fi, the wireless client devices 2720 themselves periodically send requests (such as probe requests) on different channels than their operating channel, to ensure that they understand the availability of services on the different channels at the current moment as the move about the environment. In some embodiments, one goal is to sharpen the cell edges and reduce the number of service options a wireless client device is exposed to at any given location in space to one strong one, which may lead to better and more predictable performance.

One approach for gathering information to perform arbitrary optimizations or configurations is to maintain a list or table of each antenna's neighborhood, shown in FIG. 27 as antenna neighborhood table(s) 2702. These neighborhood tables different from the prior art in at least two important ways. First, in discrete access point (pre) environments, neighborhood tables are often learned not per antenna but per access point itself. MIMO environments require simultaneous antenna transmission in any event, and the typical neighborhood exchange (such as from 802.11k) is mostly agnostic to the particular antenna choices, which is considered more of a PHY-layer function beneath the purpose of MAC-layer knowledge building. The exchange of reports does not include ways to identify or separate which antenna did what under a given MAC address. Second, approaches for detecting even those neighborhoods in the traditional model were never designed to scale anywhere close to the potential explosion of antenna degrees of freedom possible in the flexible wireless networking systems described herein. As noted above, traditional deployments use at most antenna arrays, which are fixed collocated assemblies and are not flexible (both in configuration and literal bendability of some embodiments) across the spatial domain.

In some embodiments, an antenna neighborhood table 2702 contains information indicating whether and how two antennas share the radio environment, including direct and indirect reach of each other, and what the sharing effects may be. There are many methods for populating this.

Some embodiments use telemetry analysis, shown in FIG. 27 as telemetry analysis 2710, to populate neighborhood tables. Passive telemetry is information derived from the typical operation of the network, without making active efforts to gather specific information. One type of passive telemetry stream is that of an operational antenna receiving information known to have been sent by another antenna. Specifically, the system maintains a list of all the antennas that are selected to transmit, shown in FIG. 27 as antenna transmitter selections list 2704, and what their unique identifying information is. In some embodiments, this unique information may be a transmitter address, such as an Ethernet MAC address. In other embodiments, it may be a PHY-level indicator, such as a BSS coloring identifier, which when coupled with the spatial color ID map (maintained or accessed by the system) can be used to determine by one receiver which specific transmitter radio was used when a specific color ID is received. In some embodiments, the unique information may include a spatial stream identifier as well. In some embodiments, the information recorded may be the transmissions from a system radio received by another system radio. In other embodiments, the information recorded may be the traffic destined for a system radio by a third device as detected by a second system radio, or by traffic destined to a different radio entirely by a device also known to be in a connection state with a system radio. The system may also maintain a list of all the antennas that are selected to receive, shown in FIG. 27 as antenna receiver selections list 2706, along with their unique identifying information. Associated clients table 2708 is described below in reference to FIG. 36.

To detect system-to-system overlap, some embodiments use antenna neighborhood tables 2702 to match promiscuous receipt of transmissions from individual receivers to the senders, and may record specific signal information such as signal strength, SNR, data rate, number of spatial streams, or even the channel matrix or summarized data from it. For Wi-Fi, one embodiment collects the telemetry stream from every radio of every frame sent by any other radio in the system, as determined by the transmitting MAC address. On this data, telemetry analysis can occur. In some embodiments, some or all of the data representing the receiver configuration and the transmitter configuration are recorded for each detected transmission. This is important, because the transmitter configuration and receiver configuration can both change in real time. In MIMO systems, the transmitter can adjust the weight it assigns to each transmit chain, and the receiver always adjusts the receive weight to optimize the transmission SNR for each stream. In non-beamforming environments, the transmission weights are usually static (sparing per-packet power control), while the receive weights are merely optimizations, thus revealing information about the changing channel. But in beamforming environments, the transmitter can steer away from the system receiver towards the intended client, in which case a lower signal strength in reception might not be a good indicator of reduced overlap. Thus, the use of beamforming ought to be noted. Beamforming use on the system side can be determined by interrogating the radio. On the non-system transmitters, it may be possible to infer the use of beamforming by observing beamforming administrative traffic, such as channel sounding.

Figure 28:
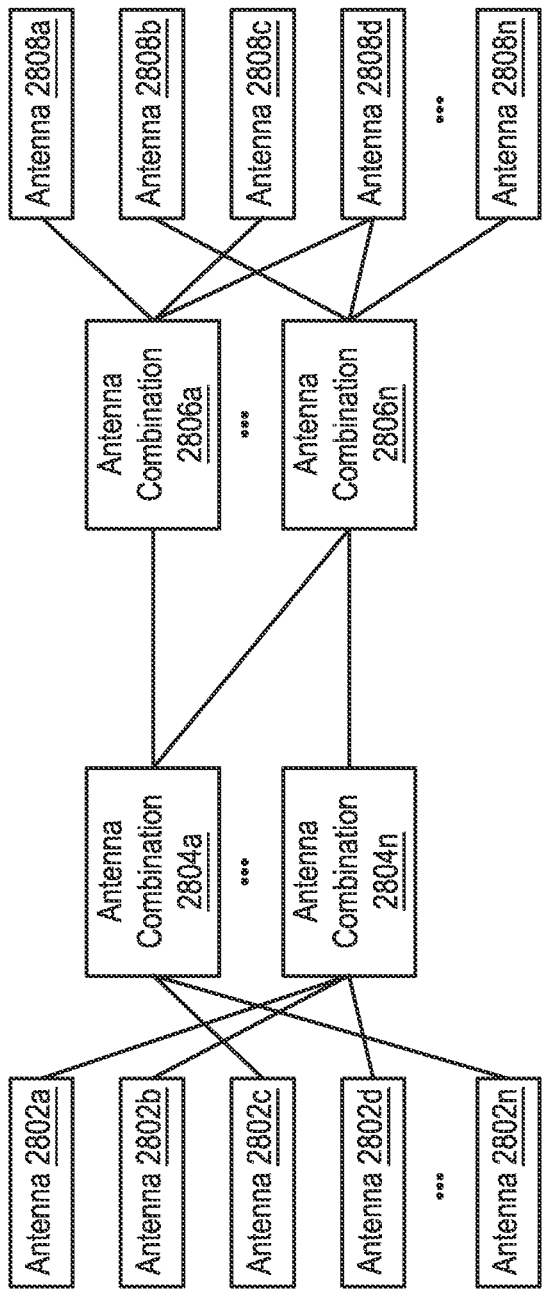
FIG. 28 illustrates an example embodiment in which multiple antennas are used for transmission and reception.

Because multiple antennas may be used for the transmission and reception by design, the information received may apply to antenna combinations and not to individual antennas. FIG. 28 illustrates an example of this effect. In the illustrated example, a transmission comes from multiple antenna combinations 2804, each of which includes multiple antennas 2802, and is received by multiple antenna combinations 2806, each of which includes multiple antennas 2808. These combinations can potentially overlap. For example, they will do so in embodiments that dynamically adjust the combinations during an analysis event. In some embodiments, this may be avoided by preventing changes during analysis events and enforcing a static mapping with nonoverlapping sets of antenna combinations. However, in those cases, there may not be enough information to understand the individual antennas' contributions to the combinations.

With overlapping sets of antennas, one possible challenge is to determine the likely contributions of each antenna to the commonality. However, because there is commonality, it is possible to use the common receipt of a transmission, or separate receipts of similar transmissions, to determine the mutual information. Some embodiments allow one antenna to be shared between two radios, using a multilane strip to connect two radio chains to that antenna. In some embodiments, doing so may be likely to combine all of those antennas into one shared antenna configuration, with real differences to the channel response of that set based on which radio is accessing it. For embodiments that do not allow such multi-radio connection (either by hardware or software), overlapping sets of antennas may be produced instead by the system deciding to switch set assignments during the analysis period.

FIG. 29A and FIG. 29B illustrate two similar transmissions, having the same transmitter, same channel weightings, same location, same encoding and data rate, and same power, that are picked up sequentially. Specifically, the first transmission is picked up by one configuration of antennas 2900 having two overlapping antenna sets 2902 and 2904, as shown in FIG. 29A, and the second transmission is picked up by a different configuration of those same antennas 2900 having sets 2906 and 2908 with different overlaps, as shown in FIG. 29B. In this example, signal strength may be used as the determining factor for the degree to which an antenna "hears" a client. The SNR, channel weightings, loss rates, error rates, or other factors may be used as the determining factor in other embodiments. FIG. 29A shows antennas 1-5 in set 2902 and 4-8 in set 2904, while FIG. 29B shows antennas 1-6 in set 2906 and 5-8 in set 2908. In this example, reception in the first case has signal strength S1, and in the second has signal strength S2. Since the two transmissions are similar, if S1 and S2 differ, it may be assumed that the difference is due to the loss of antenna 4 and gain of antenna 6 in one and the loss of 6 and gain of 4 in the other. This produces evidence of the value of antenna 4 and the value of antenna 6.

If it is assumed that only antennas 1-6 and only the first (leftmost) set in each case is used, the only difference is that antenna 6 was unused before (in set 2902) and used later (in set 2906). If S2>S1, then that gives information that antenna 6 leads to, for that particular client location, an S2−S1 gain in the antenna combination. Here, the data is clear. One might assume that the coverage pattern of antenna 6 overlaps better with the transmitter. This particular piece of information corresponds to a proposition P({1 . . . 5}+{6}→S1+(S2−S1) T), that adding antenna 6 to the set {1 . . . 5} increased the gain of the antenna set by S2−S1 for transmitter T. Notice that is a computer-expressible proposition. The example illustrated in FIG. 29A and FIG. 29B produces a proposition P({1 . . . 5}+{6}→S1,1+(S1,2−S1, 1)|T) and P({4 . . . 8}−{4}→S2,1−(S2,2−S2,1)|T) with S1,1 and S1,2 being the signal strength for the first set for the first and second transmission, respectively. Such propositions are mathematically solvable, or approximately so, in the presence of conflicting information. Some embodiments may use these types of representations to produce a satisfiability problem. Other embodiments may use them to produce an optimization problem, with an attendant utility metric. Still other embodiments may use different propositional structures, which are set around the particular problem or problems trying to be inferred, such as whether the configuration provides adequate coverage, or whether the configuration has adequate use of resources.

Signal strength may not be the only telemetry that can be accessed, nor the only proposition that can be constructed, and minimizing overlap may not be the only desired optimization. In some embodiments, the signal strength telemetry is used to provide a different overlap balance. For example, some embodiments maximize coverage overlap, while others maximize overlap subject to limiting constraints (such as available power or network resources). Some embodiments collect data rate telemetry. Some do this for the purposes of optimizing around data rate availability, thereby maximizing the data rate available to deployments. For example, data rate may be related to signal strength, but may also be related to channel width availability and spatial dimension availability, both properties of the environment and the interferers therein. The optimizations can be conjoint, or approximate, or balanced, in various embodiments. In most deployments, more telemetry is better, and so the neighborhood tables are operated as a data lake, the contents of which are available for arbitrary analysis. In some embodiments, the neighborhood tables are subject to statistical analysis. Longer-time-period analysis may be performed. These different periods of analysis may be used to guide the configuration.

There are multiple ways of correlating the transmissions of a client between different receiving system radios. One such method is to use tightly time correlated events. One example embodiment uses the probe requests from a client bounded in time. A client that performs a channel scan usually does so in a tight loop to avoid disrupting its own service, where it scans as many channels as it can, transmitting probe request frames to discover what is available. Such probe request frames are usually transmitted at the same power level, subject to regulatory channel limits. Thus, the example embodiment may use the different probe requests from the same scan (identical when on the same channel, but close in time when not) to perform the reception.

Another source of information for correlating the transmissions of a client between different receiving system radios is 802.11k neighbor reports, which may be used in conjunction with the system antenna state. For example, when the network asks the client for a neighbor report, it asks for the client's scanning database, which is provided by cooperating clients. This provides information about what the client is able to hear. This information is the inverse of information obtained when trying to listen for the client's transmissions at the same time. Here, instead, the client tells the network about all of the other transmitting system radios it has heard of. However, for simple transmissions, this inverted information is likely to be similar. For example, beacons are usually sent with simple spatial stream configurations and are less likely to have the signal strength vary by location in the environment, thus the signal strength is more likely to correlate to the pattern's response than to the environment's multipath. Therefore, some embodiments use the neighbor responses to populate the antenna neighborhood tables. This can be useful when the antenna sets vary and the neighbor reports are sufficiently fresh or time-bound to reveal differences in quality from the client's perspective when the network undergoes a change, or when the client has moved into a different place in the antenna radiation patterns.

Some embodiments use active telemetry for correlating the transmissions of a client between different receiving system radios. Active telemetry involves consciously adjusting the behavior of the network to gather this information, being aware that this sort of testing could in some cases produce minor or major service disruptions. One such method is for some radios to merely hop onto the same channel for a short period of time to peek at the receptions. This can easily be done in over-deployed networks where many of the radios are already gathering promiscuous telemetry. In those cases, the effort may involve a non-disruptive change of the surrounding promiscuous radios to listen to and correlate simultaneous reception, as above, using the identical frames if desired.

Another method for correlating the transmissions of a client between different receiving system radios involves actively provoking intermediate stations, such as clients. A client that is associated with a BSS (e.g., in an associated clients table) may obviously be pinged by its BSS. But neighboring radios can also ping the client. Depending on the protocol, clients usually respond to transmissions from any and all devices on the lowest levels of the protocol stack, even if they will ignore the transmission at a higher one. For example, in Wi-Fi, any device that receives an RTS ("request to send") addressed to it will respond with a CTS ("clear to send"). The RTS does not have a BSSID. And even if it ignored RTSs not from the base station, one can forge the RTS's source address and use a unique duration field length that is implausible in practice. The responding device subtracts the time already taken and sends that in the CTS, so one can, for example, calculate the RTS duration to send such that the CTS will come back with a nonsense number such as "1", which is far too short for real transmission. In some embodiments, radios that wish to determine the shape of their antennas may ping off of other clients, such as in that manner. In one embodiment that may be useful for service radios that do not retain their promiscuous mode while in operation as a base station, for those that filter their traffic, the injecting radio can choose to forge the frame on behalf of the filtered base station radio such that the client's response meets the filter criteria. For example, if the base station radio is filtered Wi-Fi that only takes management and data frames, the injecting radio can inject a mandatory-response frame (such as an Action frame), and the receiving radio will get the response and can issue it forward for correlation.

Whether the client is forced to transmit or is chatty enough for the network to opportunistically use its own transmissions, in some embodiments the testing radios may choose which antennas (and sets of antennas, if that information is desired) to target, scanning possibly rapidly through the antennas and combinations of interest and pinging off a variety of clients. In some embodiments, an active measurement system, such as Active Measurement 2712 shown in FIG. 27, may coordinate multiple radios, thus arranging for specific comparisons to be made between antennas. For example, the active measurement system may issue commands to the effect of, "Radio 1, you try your antenna 1. Radio 2, you try your antenna 2. Let me know what you hear so I can tell which is better." Some embodiments may use a straightforward search. Other embodiments may use an exponential search limited to likely nearer or nearest neighbors. Still other embodiments may search the already gathered information to determine holes or inconsistencies (such as by ranking the propositions recorded above by inconsistency from solution and retesting those that are most inconsistent.) This searching can occur in the background during an operational network, and the different methods can be mixed. On busy networks, the telemetry may be sufficient without pinging, but pinging may always be available.

Some embodiments infer the location of the clients while performing this process. Some embodiments do this to augment the data with additional quality information. For example, the data from a client whose location can be fixed can then be compared to data from a client nearby physically, as the physical location of clients tend to correlate with the channel responses in most environments, even if the channel responses themselves vary quickly as one moves. Some embodiments may use antenna patterns more suited to location to first derive the location of the device, before moving on to test with the more exotic patterns. More omnidirectional antenna patterns may allow some location finding algorithms to perform better triangulation. Some embodiments may switch to a different protocol, such as Bluetooth, to perform the location ranging. For example, if the location-determining radios are in known locations relative to the service radios (such as if the Bluetooth radio is on a different antenna collocated with the Wi-Fi antenna), then the derived location may be of high quality for direct use.

Overall, some embodiments piece together obtained information to produce a learning phase. The learning phase may be applied network-wide or may be applied piecemeal by dividing the network and working on one portion at a time. In some embodiments, the learning phase involves taking the region in question, setting various radios onto the channels in question (such as based on which channel has the highest number of clients to test off of or which will produce the least disruption of service radios, or as a part of a scanning sequence) and then quickly performing the tests to identify the neighborhoods. Some embodiments may only use the non-service radios to do these tests, while other embodiments may also hand off the clients onto a different radio, bringing it out for service, to allow testing of the non-service radio. Some embodiments may instead issue a command to occupy the airtime needed (such as by issuing a long RTS frame or announcing a quiet period) to perform the search.

Some embodiments may explicitly use "winking", where the term "winking" refers to an operation in which a radio with multiple antennas in one radio chain explicitly adds or subtracts to its set on an experimental basis to gather that data, such as by adding or subtracting one antenna at a time to determine the effect of each such change. If the radio in use is servicing and performs this winking process during transmit, it may continue to send real traffic to the client, or it may send dummy traffic (such as a QoS null frame or other message) while it performs this test. Similarly, during receipt, a radio may perform winking by first eliciting a useless response (such as by sending an Action frame for information it already has or is of low value), and then ensuring that it winks at the appropriate time. In some embodiments, winking occurs occasionally making minor adjustments (adding or subtracting one antenna, for example) to see if it makes a difference. In some embodiments, the winking becomes more aggressive and actively searches different systems. Winking does not require provoking client traffic and can be optimistic. In some embodiments, winking is performed probabilistically, using a tunable probability threshold, to introduce slight but meaningful and long-term nondisruptive (or bounded lightly disruptive) comparison measurement opportunities.

Tight timing coordination between the radio and the telemetry system may not be required. In some embodiments, the antenna switches are changed somewhat loosely with what the air activities are of the radio. The data may nevertheless be tightly correlated in analysis because the radios in almost all cases produce extremely good time counters for reception or transmission recording, which can then be correlated with tight counters (such as CPU cycle counters on a GPIO CPU) controlling the switches.

In some embodiments, the neighborhood may be limited to system resources. In some embodiments, the system's clients may also be maintained in the neighborhood tables, thus establishing a more global topology. In some embodiments, this may be extended to non-associated devices that can also be monitored.

The maintenance of the neighborhood may vary in different embodiments, based on the goals. As mentioned above, the information received may represent a proposition about the topology of the network. The proposition itself can be binary or weighted. For example, a signal strength change can be used to generate a weight. There are a number of known algorithms for producing a (usually approximate) satisfaction of the logical propositions. In some embodiments, however, the neighborhood propositions are taken in a Bayesian fashion in which each proposition adds a bit of information about the ultimate questions, such as whether antenna 1 and 2 overlap by a certain measure. Since that information is often gleaned indirectly, such as via intermediate stations such as a particular transmitter T as described above, these embodiments use each piece of information to produce a queryable Bayesian network, the production methods of which are known to the art. Some embodiments in which precise Bayesian inference is not required may use simpler machine learning (ML) models to understand the relationships and produce an oracle for querying potential changes.

Figure 30:
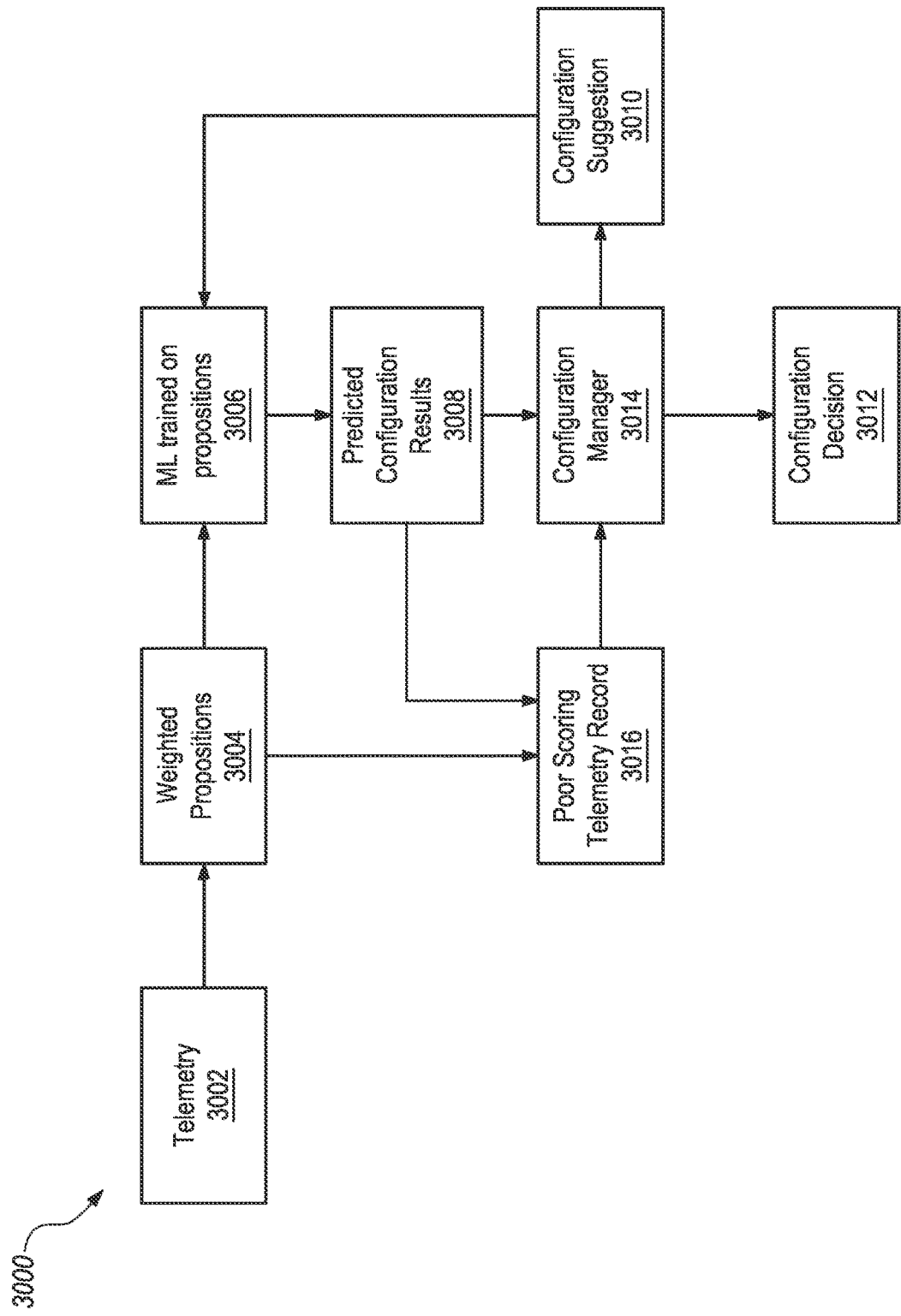
FIG. 30 illustrates an example embodiment of a method for dynamically configuring a flexible wireless networking system using machine learning.
Figure 37:
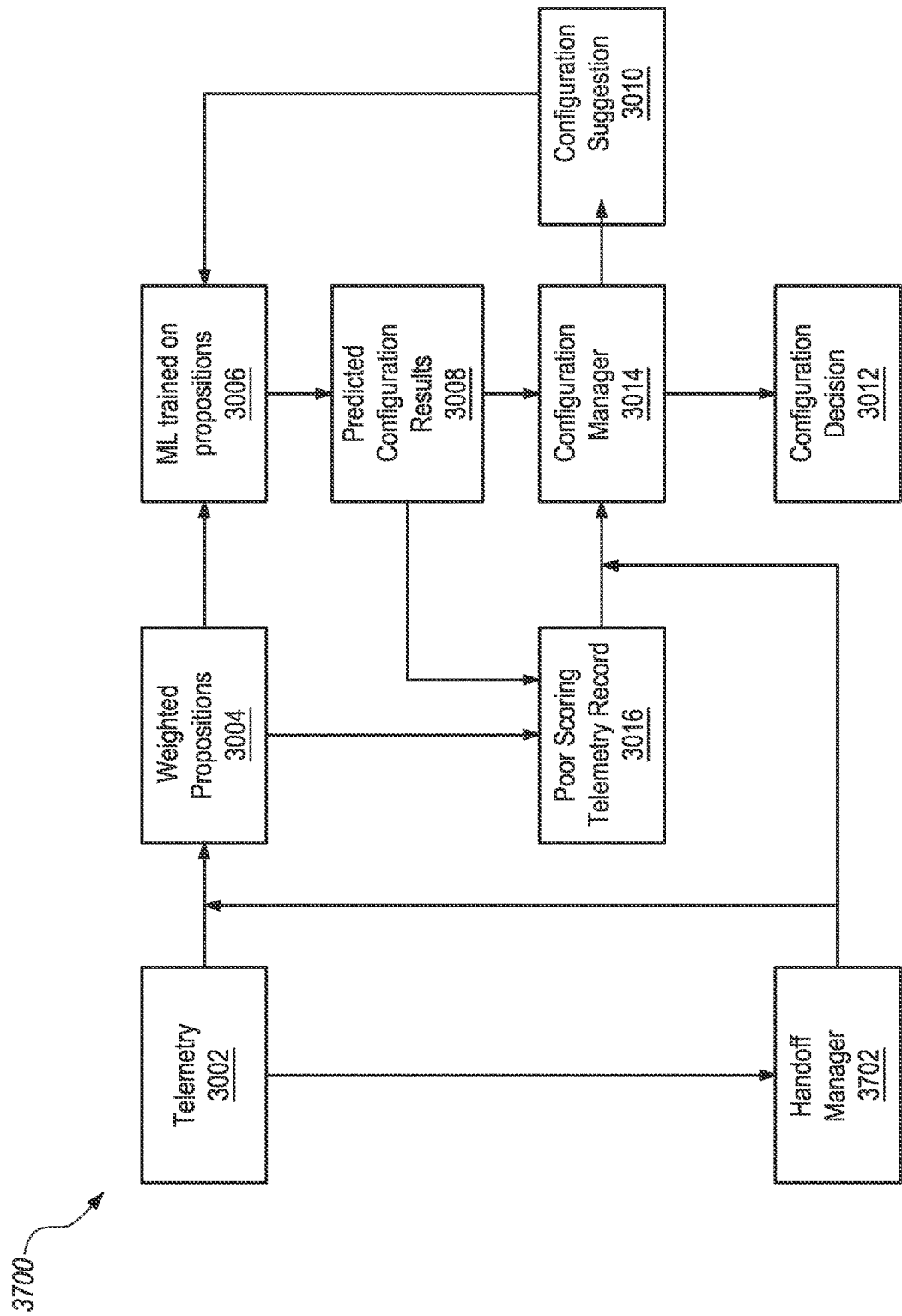
FIG. 37 illustrates an example embodiment in which a handoff manager is integrated into a configuration manager.

FIG. 30 illustrates a method 3000 for dynamically configuring a flexible wireless networking system using machine learning, in accordance with some embodiments. In particular embodiments, one or more of the operations shown in FIG. 30 may be performed by a resource manager, such as resource manager 1940 illustrated in FIG. 19. In the illustrated embodiment, the telemetry process 3002 produces the weighted propositions 3004, which are added as inputs to the ML model 3006. In some embodiments, the ML model 3006 observes each new individual proposition presented along with a measure of the quality of the network in the region affected by this proposition, for example, using backpropagation to learn that a consequence of the particular proposition is not good. After sufficient training, ML model 3006 can be presented with hypothetical propositions, such as in the form of partial or complete configurations and can produce a predicted quality of a result of each configuration, shown in FIG. 30 as predicted configuration results 3008. A configuration manager 3014 may then direct the decision between different proposals based at least on the predicted configuration results 3008, such as by outputting a configuration decision 3012 and/or adding one or more configuration suggestions 3010 as inputs to ML model 3006. In some embodiments, the proposals themselves are made by retaining a record of the worst functioning parts of the network, and the weighted propositions 3004 related to it, shown as poor scoring telemetry record 3016. In some embodiments, poor scoring telemetry record 3016 may also include predicted configuration results 3008 for the propositions with for which the predicted results are poor. The configuration manager 3014 may use this record 3016 to identify parts of the configuration in need of change, and may, in some embodiments constrain the search space of proposals to the areas in most need of help, or to the antennas with the most power to influence quality. In some embodiments, machine learning may be employed directly on the antennas' identities, with the quality influence as the backpropagated predicted value, to derive a learned response of the significance and/or importance of the antennas with respect to different configurations. A configuration manager 3014 can then directly query for each antenna to learn its significance and use that information to compose a satisfactory set of antennas. For example, the inclusion or exclusion of particular ones of the antennas in a proposed configuration may affect the predicted performance of the proposed configuration, in a positive or negative manner, by a negligible amount or by a significant amount. In some embodiments, the machine learning model may be trained on the configuration sets themselves as the inputs and may maintain a longer-term record of what has worked and what has not. In this type of architecture, ML models mapped on configurations or parts thereof to quality may require a search to discover which configurations are reasonable or preferable. In some embodiments, a generative adversarial network may be employed to produce configuration possibilities. In some embodiments, the ML model 3006, which may be trained on propositions, is used to produce the discriminator (as shown in FIG. 37), and a generator is coupled in. In various embodiments, the generator may produce results from noise inputs, from past configurations, or from proposed configurations.

Some embodiments may use the antenna neighborhood tables to automatically prune or shape the resulting coverage area. This automated pruning may perform the same functions as manual pruning but requires no human intervention. There are a few different dimensions that can operate simultaneously to influence the pruning. The first is cell location. For example, it may be desirable to be kept cells compact in some configurations, as previously mentioned. This may be true for a few reasons, including for providing predictable coverage and for avoidance of interference. However, the flexibility of the wireless networking systems described herein may allow the system to assemble an antenna set out of patches at various possible distances from each other. This can have both advantages and disadvantages for the assembly of a cell. One advantage of increasing the number of antennas switched together onto the same antenna set is that more antennas can lead to different gain, impedance, and directionality. Adding more antennas could increase the coverage by merging patterns together. For example, adding distant antennas can create multiple opportunities for reception at those distances. Furthermore, in some embodiments, the patterns may be arranged with parasitic elements such that extremely high gain antennas, operating in principle the same way a Yagi antenna does, can be assembled on the fly using switches to choose those antennas near the parasitic elements or reflecting elements. In some embodiments, non-radio elements may be switched on and off of ground to influence their reflectivity. On the other hand, every antenna may have a different channel response. Antennas within precise distances of each other (typically short distances since precision is difficult with length) can end up forming an antenna array potentially inadvertently, thus causing the combination of two antennas to result in an antenna with different directionality and possibly unpleasant fading patterns than either of its parents. Thus, in some embodiments, antennas may be arranged locally to avoid this situation. In some embodiments, each antenna is given higher directionality, thus ensuring that areas are less likely to be equally in range of both antennas and inadvertent interference fading can be avoided. In some embodiments, the interference patterns are known, and additional antenna segments may be created that offset the interference. For example, if two antenna patches interfere horizontally to produce an interference pattern, an additional antenna can be placed with its phase between the two, to the extreme of using more segments to produce an interference pattern 180 degrees out of phase. In some embodiments, interfering and noninterfering patterns both exist, and the choice can be taken between the two. In some embodiments, the interfering potential of different antennas may be added to the propositional logic of the neighborhood tables. For example, in some embodiments, they may be absolute assertions (e.g., to skip a combination or drag along additional antennas to offset the interference). In other embodiments, the interference may be recorded and taken into account in the weightings.

Figure 31:
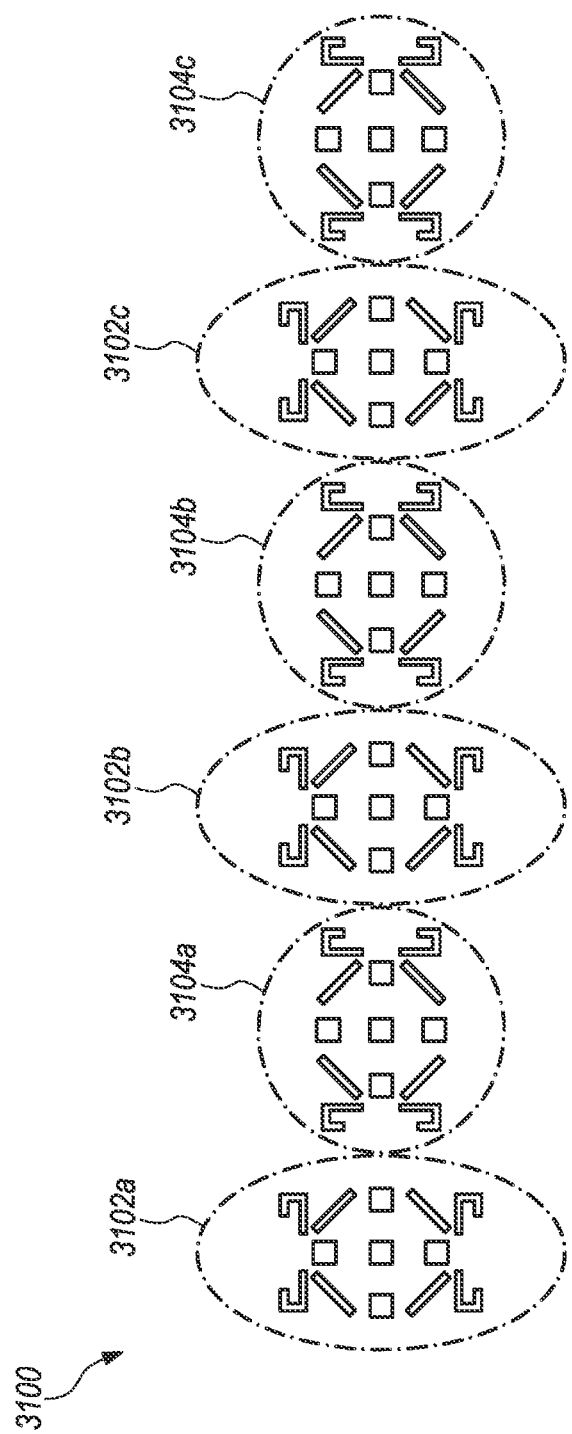
FIG. 31 illustrates an example embodiment in which the antennas are divided into specific repeating patterns.

Beyond the interference, when antennas are at distance, they will have different primary signal delays. In some embodiments, the signal delays from any antenna set are required to be within some tolerance, which is often based on the receive radio's ability to reform the delay pattern into an aggregated high-power whole (such as number of taps). In some embodiments, the antennas on the strip are divided a priori into specific repeating patterns, from which only the antennas in the repeating area can be combined into one or more sets. One example of such a regionalization is illustrated in FIG. 31. In the illustrated example, cohesive local antenna regions allow for the configuration manager to take local properties into account. Although some embodiments can individually aggregate each of the solid antenna patterns into one or more antennas, the embodiment illustrated FIG. 31 specifically limits the choices to any one of the dashed encircled sets 3102 defined for the collection of antennas 3100. Thus, if any antenna within the first set (3102a) is used in the set, only elements from set 3102a can be used, and the rest are forbidden. This constraint may be enforced by software or hardware limitations. An advantage of doing so may be that the interference and directionality properties of the encircled antenna sets 3102 may be well understood during manufacturing or design, but the properties between segments in different encircled antenna sets 3102 may not be well understood. For example, the installation instructions may request that the strip not be folded in the middle of an encircled area (or even that the strip has a more rigid backing to discourage folding there), but that the strip can be folded more freely between the encircled areas. In some embodiments, the rigidity of locality might not be explicitly enforced, but may be introduced as weights or preferences that can be overruled depending on the optimization or satisfaction utility metric.

Figure 32:
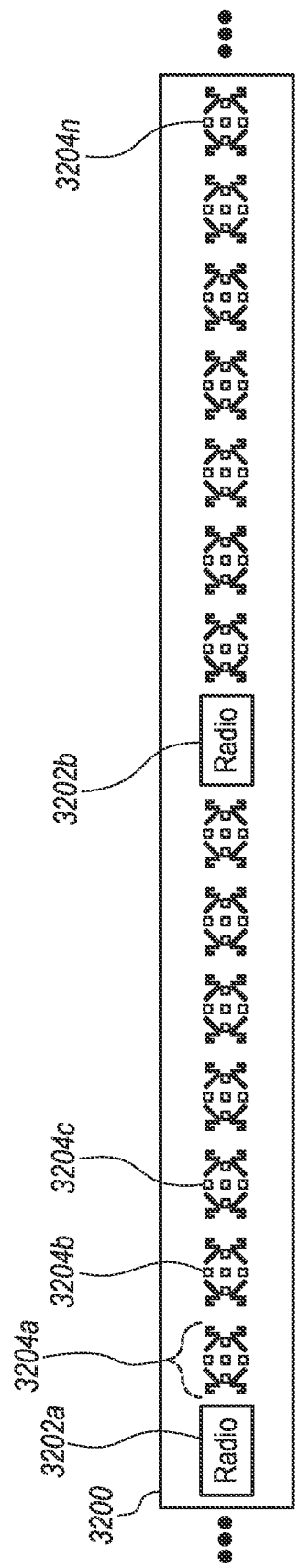
FIG. 32 illustrates an example embodiment of a strip with repeating patterns running down the length of the strip, including between two radios.

In some embodiments, the cells are kept small so that they can be relocated at some length down the strip, in one move. For example, FIG. 32 illustrates a strip 3200 with repeating patterns 3204a-3204n running down the length of strip 3200, including between radios 3202a and 3202b. In these embodiments, the system chooses which localized set to place into service, thus providing a very high degree of flexibility in where radio resources are deployed over the air without requiring each possible location to have a radio. FIG. 33A, FIG. 33B, FIG. 33C show some different possibilities of selection at distance for strip 3200. For example, FIG. 33A illustrates a scenario in which the third one of the repeating patterns (shown as 3204c) is selected for radio 3202a and the fourteenth one of the repeating patterns (shown as 3204n) is selected for radio 3202b. FIG. 33B illustrates a scenario in which the first one of the repeating patterns (shown as 3204a) is selected for radio 3202a and the eighth one of the repeating patterns (shown as 3204h) is selected for radio 3202b. FIG. 33C illustrates a scenario in which the first one of the repeating patterns (shown as 3204a) is selected for radio 3202a and the fourteenth one of the repeating patterns (shown as 3204n) is selected for radio 3202b.

This particular pattern choice may be similar to the combination of the examples shown in FIG. 26A, FIG. 26B, where each circle in the latter figures represents the flower shape in the former. That provides a possibility for joint optimization in which the goal is to find the best locally constrained "flower" radiator set to use while also paring down that set to perform the optimization. Some embodiments may perform the optimization in two steps, rather than as a joint optimization, first selecting the optimal cohesive radiator sets, then paring down the set. Some embodiments may perform backtracking to reselect different first radiator sets if the paring becomes too infeasible. Some embodiments may perform a proper joint optimization, with the local cohesiveness constraints being added to a satisfiability or optimization engine.

In some cases, changes within an operating network may be advantageous. For example, it may be advantageous to perform seamless roaming within the network using merely physical layer resources. Seamless roaming refers the goal of providing minimal client disruption as a wireless client device moves within a network. In a traditional deployment, the antenna radiation patterns of the base stations cannot move. Therefore, as a wireless client device moves away from its base station, it sees the availability of the radio resources of the base station decrease until it reaches a point at which the client feels compelled to seek out an alternative (or perhaps is directed to do so by the network). At that point, the client engages in procedures to hand off to a new base station. Both the searching function of the client, e.g., a scan, and the mechanics of the handoff take valuable time and require management traffic overhead. Much has been done in wireless networking in general to limit those impacts, but they still exist. Furthermore, in networks with a large group of clients, the clients may make decisions based on more than signal strength, such as on responsiveness of overloaded base stations or available airtime. As such, they can cause unpredictable emergent behavior in the client pool, such as inadvertent herding, where clients make similar simultaneous decisions to flee to lightly used base stations, thus overloading them and causing flapping or thrashing, or paradoxical self-reinforcing bursts of management traffic.

Figure 34A:
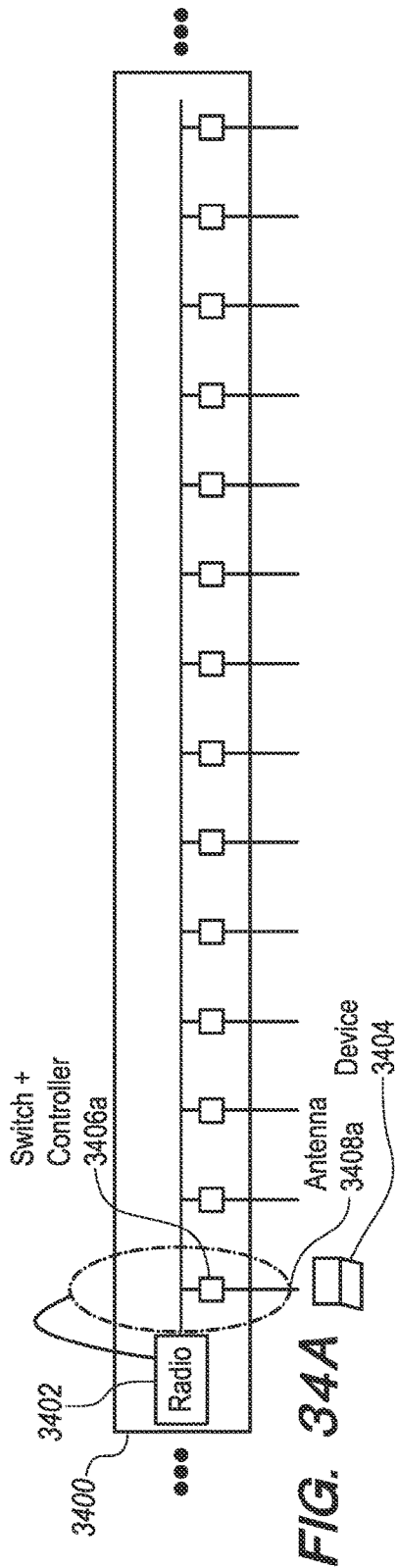
FIG. 34A, FIG. 34B, FIG. 34C illustrate an example embodiment including individual switchable antennas along a strip attached to a single radio as a wireless client device moves in relation to and along the strip.
Figure 34B:
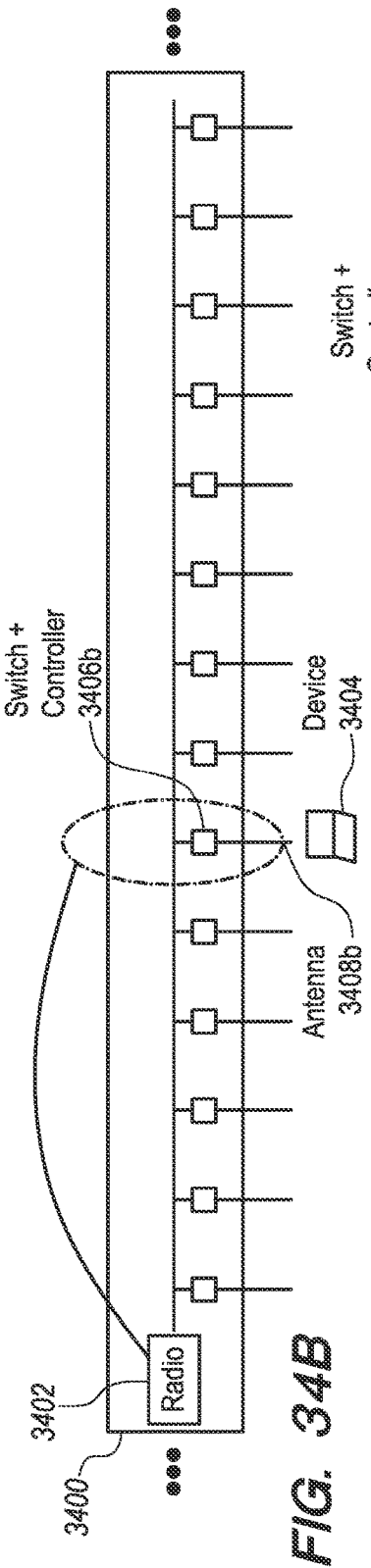
Figure 34C:
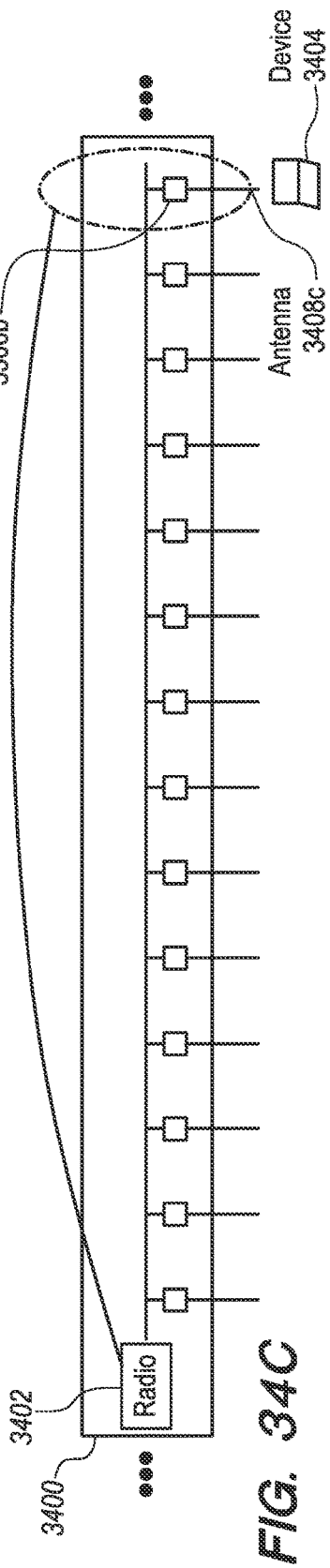

However, the flexible wireless networking systems described herein may provide the physical resources to seamlessly move a radio's resources along with a wireless client device. FIG. 34A, FIG. 34B, FIG. 34C illustrate an example embodiment including individual switchable antennas 3408 along a strip 3400, attached to the same radio 3402 as the client device 3404 moves in relation to and along the strip 3400. In this example, only one radio 3402 is turned on at a time. As the client device 3404 moves along the strip, the switches in various switch/controller pairs 3406 are changed to ensure that the closest antenna 3408 to the client device 3404 is the only one serving the client device 3404. For example, FIG. 34A illustrates a point in time at which the client device 3404 is served by antenna 3408a, FIG. 34B illustrates a later point in time at which the client device 3404 is served by antenna 3408b, and FIG. 34C illustrates a still later point in time at which the client device 3404 is served by antenna 3408c. In this particular case, the client device 3404 will never experience a handoff along that part of the strip 3400. Instead, the client device 3404 will see the network follow it around. At further distances from the radio 3402, the signal strength may droop a bit: in those cases, power amplifiers can be employed to boost the signal if desired.

In some embodiments, and under certain circumstances, multiple antennas may be switched on at once. In fact, in some embodiments, all of the antennas may be switched on at once. Doing so may produce a "leaky cable" effect, which may increase the delay spread of the antenna or alter the MIMO channel characteristics and can potentially overtax the rake receiver or similar signal processors in the radios. However, limiting the antennas to a somewhat constrained delay loss pattern, or to directional or spatially diverse antenna sets, may be reasonable.

FIG. 35A, FIG. 35B, FIG. 35C illustrate a handoff scenario using limited radiator sets, in accordance with some embodiments. Again, to avoid clutter, the switch fabric has been removed and only the radiators are shown. This configuration combines the handoff problem with the constraints of using coherent radiator sets to avoid delay spread or ensure coverage. In this example, FIG. 35A illustrates a point in time at which a client device 3504 is served by an antenna made up of a set of antenna elements on strip 3500 shown as 3506a, FIG. 35B illustrates a later point in time at which the client device 3504 is served by an antenna made up of a set of antenna elements on strip 3500 shown as 3506f, and FIG. 35C illustrates a still later point in time at which the client device 3504 is served by an antenna made up of a set of antenna elements on strip 3500 shown as 3506n.

In some cases, the optimization or satisfaction solution methods described above may be used to handle the changing of the client locations. In embodiments that perform real-time analyses, this works well. Some embodiments go further and react to client indications of motion or impending handoff to cause a reconfiguration. In various embodiments, there may a variety of ways to determine when and whether a wireless client device should be handed off from one or more currently active antennas over which signals are transmitted or received on behalf of the wireless client device in a first coverage area to at least one alternate antenna which may have a second coverage area. For example, in systems with far more antenna resources spatially than radios, there may not be enough passive radios to detect better coverage for individual clients. In those cases, some embodiments use location tracking to determine when a client may be approaching the edge of a cell and may adjust its client tables in response. Other approaches may involve looking for probe requests at adjacent radios coming in at higher signal strength than that of the service radio, or higher than expected, looking for action requests for handoff advice, or looking for dropping data rates or dropping signal quality as signs that the client is moving towards its end of coverage and will need reconfiguration. In many of these embodiments, the system develops information quickly enough to meet the needs of mobile clients. However, some embodiments may not perform such optimization in real time or may not be tuned to develop such information in real time to allow such fast reconfiguration. For those embodiments, a multilayer approach with a faster handoff manager function integrated with the slower optimization may be used to address the problem.

Figure 36:
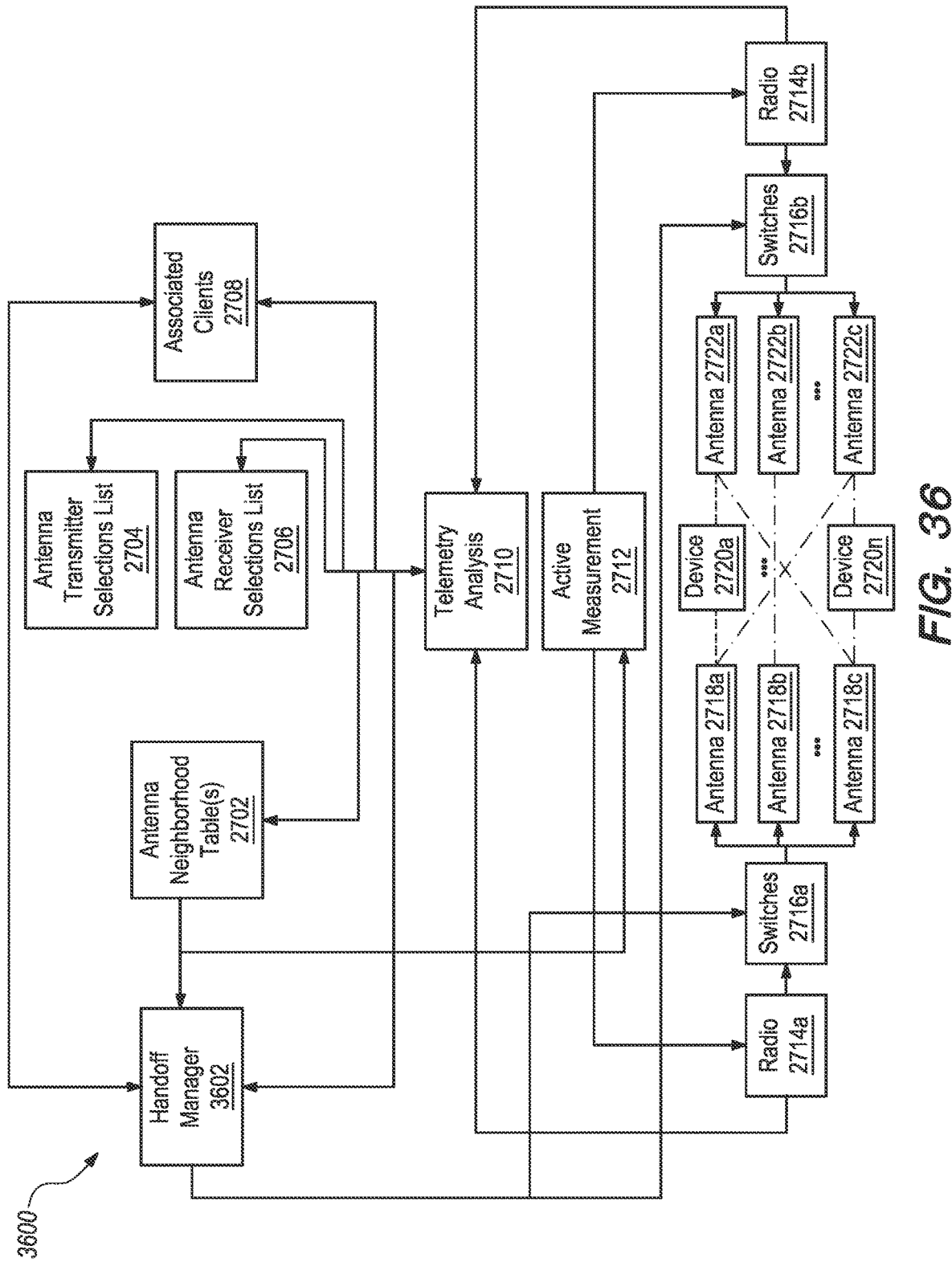
FIG. 36 illustrates an example embodiment of a system and method for software optimization of flexible wireless networking system including a handoff manager.

FIG. 36 illustrates one embodiment of a system and method for software optimization of flexible wireless networking system including a handoff manager 3602. In some embodiments, handoff manager 3602 may be similar to handoff manager 1920 illustrated in FIG. 19 and described above. Other elements shown in FIG. 36 may be similar to those shown in FIG. 27 and described above. In the illustrated embodiment, handoff manager 3602 is used to make short term antenna configuration changes to handle the movement of a wireless client device while leveraging the antenna neighborhood tables 2702. The handoff manager 3602 checks the associated clients table 2708 and uses that information to query or filter the telemetry data to ensure that it is aware of when clients may be in need of handoff adjustment. For example, telemetry data indicative of increased error rates for the client, of decreased signal strength on the associated radio, or of increased signal strength or polling by the client on other radios may all be of value in reanalysis. In some embodiments, the handoff manager 3602 also performs short-term active telemetry analysis (shown at 2710) using active measurement system 2712, causing changes to antenna switches 2716 or scans to quickly determine the availability of improved configurations of resources, as mentioned above. In some embodiments, the active measurement system 2712 may be shared between the longer-term neighborhood discovery and the shorter-term handoff discovery. Note that neighborhood discovery may be primarily focused on developing a spatial awareness of the interplay of the antenna patterns between antennas, and just so happens to be able to use client information to develop that, while handoff discovery may be primarily focused on discovering the optimum client associations to each antenna. In some embodiments, they may to be able to share similar operations and data, and in fact the handoff data set may be embedded within the neighborhood tables. In other embodiments, they may share much in common but, based on tuning parameters and installation or configuration choices, the handoff manager 3602 may need to fill in some of the blanks to achieve the shorter time horizon and minimum reactivity requirements that the overall neighborhood discovery process may not be tuned for.

FIG. 37 illustrates an embodiment of a method 3700 in which a handoff manager 3702 is integrated into a configuration manager 3014. In some embodiments, handoff manager 3702 may be similar to handoff manager 1920 illustrated in FIG. 19 and described above. Other elements shown in FIG. 37 are similar to those shown in FIG. 30 and described above. In particular embodiments, one or more of the operations shown in FIG. 37 may be performed by a resource manager, such as resource manager 1940 illustrated in FIG. 19. The illustrated embodiment includes a combined configuration generator and discriminator 3704. However, more generic arrangements such as those disclosed above can be used instead, with the handoff manager 3702 being able to access the configuration manager 3014 and the telemetry process 3002. The handoff manager 3702, as before, processes the telemetry from 3002 (including possible active measurement) to determine the active needs of mobile client devices. The handoff manager 3702 adjusts the weighted propositions 3004, such as when a handoff seems to be in order, to show the movement of the client device or the inference of its motion on the spatial radio environment. For example, a location tracking system that determines a client device that is within the field of coverage but is losing signal quality everywhere can update the propositions relating to that client device, or even introduce anew one suggesting that other antennas tested with transmitters in a similar location to the client device now might perform better. The handoff manager 3702 may then request the configuration manager 3014 to produce anew configuration decision 3012 and/or one or more configuration suggestions 3010. In some embodiments, the configuration change area may be constrained to prevent changes at a distance (the butterfly effect). Such constraints may include dampening or penalty weights for changes at a distance, propositions with constraints (which may be temporary or apply to handoff-requested reconfigurations only but allow global reconfiguration when needed), or constraints that limit the configuration to a smaller area and merge the smaller area back into the whole configuration set.

In some embodiments, the handoff manager might not force a new computation of the reconfiguration but may choose a new configuration from preconfigured sets to determine a more optimal mapping. In these embodiments, the configuration generator may not be activated for the handoff or reconfiguration. Instead, the discriminator may be presented with a few choices that take into account the need for service for the moving client or clients and may choose a new configuration from among those choices. Some embodiments may provide limits or constraints on the reconfiguration to prevent ripples at a distance. In some embodiments, the precomputed choices may be at a coherent local antenna set level. In such embodiments, the handoff manager may drive the system to choose between the coherent sets but may leave the choice of each antenna in the set to the broader neighborhood optimization. The effect of all of these options may be to allow fast choices between already constructed feasible options that properly take into account interference and coverage, or whatever the optimization criteria may be, but then independently ensure better handoff behavior. The slower optimization process can continually update the more feasible sets. In some cases, the more feasible sets represent a high-water mark of roughly interchangeable choices, out of which the second optimization can occur to maximize utility for the mobile clients as they move. In some embodiments, a further limitation may be provided to attempt to preserve MIMO channel configuration. For example, in the scenario illustrated in FIG. 35A, FIG. 35B, FIG. 35C, the individual sets of antenna elements may be substantially identical in antenna pattern shape, and whatever configuration was used at first may have already been discovered to produce adequate MIMO mappings. In other words, the service radio may have multiple radio chains, and each chain may already be mapped to one or more of the individual radiating elements such that the pattern is filled with different radiators going to different chains in a many-to-one fashion, such that the network is known to be functional. In that case, it may be desirable, when moving to a different antenna set, that the new set retains similar antenna radiator to chain mappings so that the MIMO channel performance may be similar. The similarity of MIMO channel responses may be itself derived from a metric function, such as a function producing a difference metric between two channel or sounding matrices. Such measurements of MIMO responses may themselves been taken during a prior active training phase, or they may be sourced from the decoding of known state (such as what occurs during preamble or training processing in reception). Some embodiments may give preference to handoff reconfigurations that preserve such mappings. Some embodiments may enforce strict pattern mapping, as shown in FIG. 38A, FIG. 38B, FIG. 38C, where the gray pattern for one chain and the black pattern for another chain within various set of antenna elements 3806 are preserved across the different sets. For example, FIG. 38A illustrates a point in time at which client device 3504 is served by an antenna made up of the gray elements in the set of antenna elements on strip 3500 shown as 3806a, FIG. 38B illustrates a later point in time at which the client device 3504 is served by an antenna made up of the gray elements in the set of antenna elements shown as 3806f, and FIG. 38C illustrates a still later point in time at which the client device 3504 is served by an antenna made up of the gray elements in the set of antenna elements shown as 3806n. This pattern preservation may be strict in some embodiments, or it may be based off of weightings and preferences, which then could be overridden as needs require.

In some embodiments, when the client reaches the end of the antenna availability for the service radio it is associated to, a radio-to-radio handoff may be required. In some embodiments, both handoff-related reconfigurations and more general reconfigurations, in a system with multiple radio options with less than the full amount in service, may use a soft radio-to-radio handoff. In some embodiments, the handoff may be performed by reconfiguring the new radio with the same identifier as the old one, and ensuring that sufficient state is sent from the old radio to the new one to allow a cutover of service, where the old radio stops serving the client and the new radio starts. In some embodiments, a soft radio-to-radio handoff process may include a list of its clients' security and association states, as well as any necessary networking or forwarding information. Some minimum embodiments might not carry more than the network configuration state of the service, e.g., what networks are offered, and so on, and might not carry the client state, but may instead send an out-of-service message to cause the attached clients to recreate their associations. Some specific embodiments for Wi-Fi may require the new radio to take on the BSSID and service information of the old radio at the cutoff point, but the new radio may have none of the client information. In one such embodiment, this may be all that happens. As a new client sends a message to the access point, such as a power save poll, an uplink frame, etc., the new radio may see that the client is not associated and send a Deauthentication or Disassociation message to the client, causing the client to rebuild its state. Another such embodiment may send broadcast or unicast Deauthentication or Disassociation messages to the clients to cause them to proactively rebuild their connections. These messages may be sent from the old radio, the new radio, or both. One possible reason to retain the same BSSID and channel may be to encourage the client to come back to the service it was on. A change of BSSID in such a reconfiguration may cause some clients to be willing to do a hard disconnect and scan deeply before reentering the network.

In some embodiments, a further refinement of the antenna printing process may be used to generate directionality on the strip without sacrificing flexibility. FIG. 39A, FIG. 39B illustrate the use of a specific three-dimensional antenna shape 3910 on a strip 3900 for producing directionality for a radiation pattern 3905. In some embodiments, the three-dimensional shape may be produced using heat deformation of the plastic underlayment, such as heat molding of the plastic strip. In some embodiments, the plastic may be deformed before printing, and the conductive layers may be added on top. In some embodiments, the conductive layers may be stretchable (such as a flexible elastic conductive polymer, including metal-doped polymers and carbon conductive polymers). In some embodiments, the antenna backhaul traces may be flexible, but the antennas may be affixed (e.g., preprinted or die cut) or printed onto the strip after molding. In some embodiments, the three-dimensional projection of the radiation pattern 3905 shown in FIG. 39A may not be molded into the strip but may be glued or affixed to the strip 3900. The particular shape may be permanently pressed, or if the strip 3900 is sufficiently elastic, the shape may be squeezed into the strip 3900 at a later time, up to and including during deployment. For example, a solid object with the desired shape may be pressed into the antenna section as support for an elastic surface. In some embodiments, the antennas might not be printed on the molded or elastic area but may be surface-affixed at one or more points to the substrate. In some embodiments, the antenna leads themselves may be flexible wires, such as coaxial cables or nonradiative cables. In some embodiments, the cables may be set along the elastic areas to allow for sufficient give without binding or breaking by not being glued or affixed their entire length, but rather at strategic points. In one such embodiment, the radiators and leads may be affixed to a rubber sheet, which may be later deformed to reorient the radiators. In some embodiments, the flexible nonelastic radiators and leads may be sandwiched between two elastic surfaces to ensure that the antennas do not bend away from the surface and get snagged or produce a rip. The sandwich itself may be filled with a neutral liquid medium, such as oil, to lubricate the flexible material.

In some embodiments, the antenna leads themselves operate as an antenna. In one such embodiment, a long antenna lead may be sandwiched between ground planes, with holes etched into the ground plane or planes at one or more locations in order to force that part of the lead to be radiative. In this way, one can construct a PCB or multilayer flat equivalent of a leaky coaxial cable.

Figure 40:
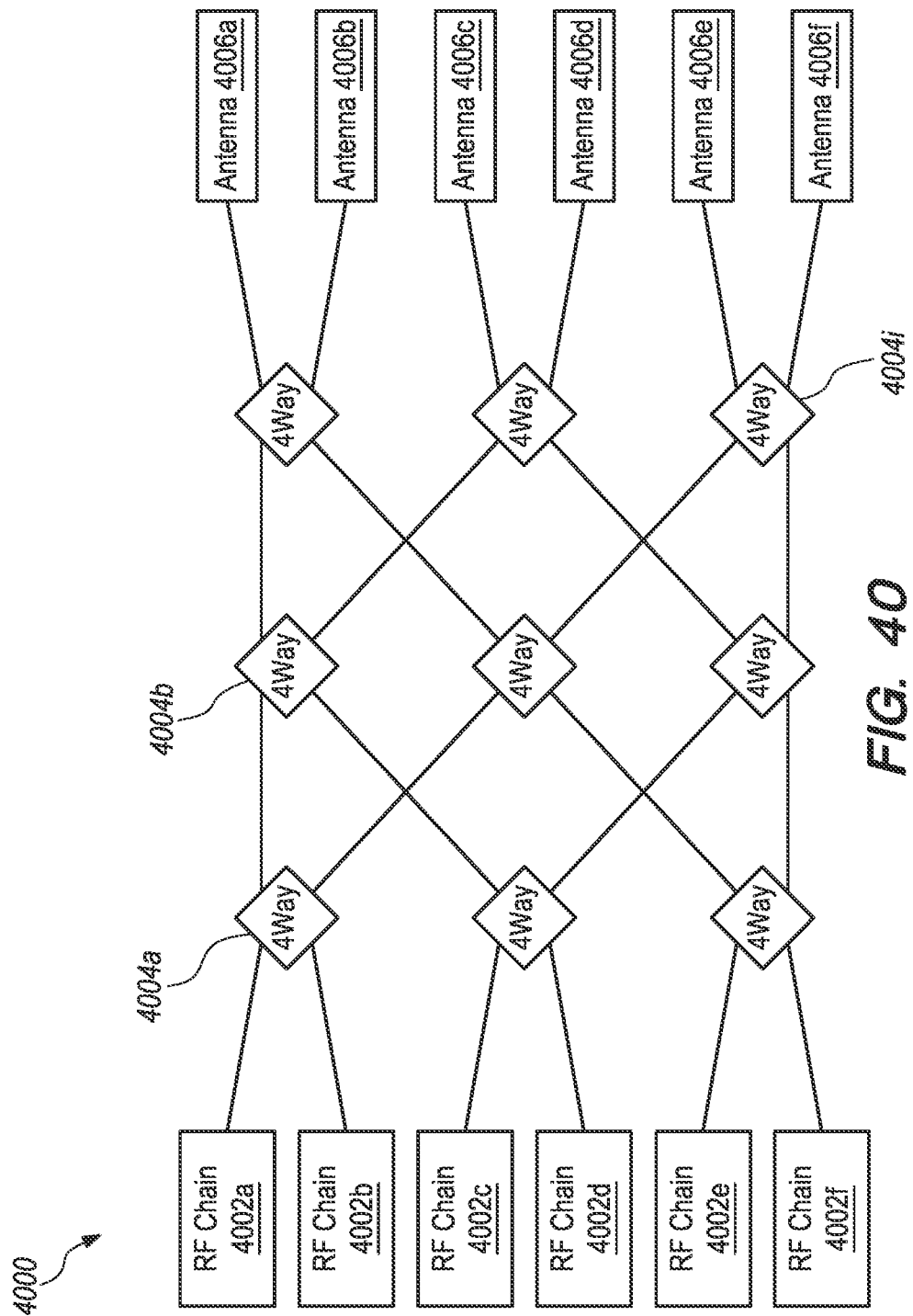
FIG. 40 illustrates an example embodiment of a four-way switch fabric in which no radio can be disconnected from an antenna.
Figure 41:
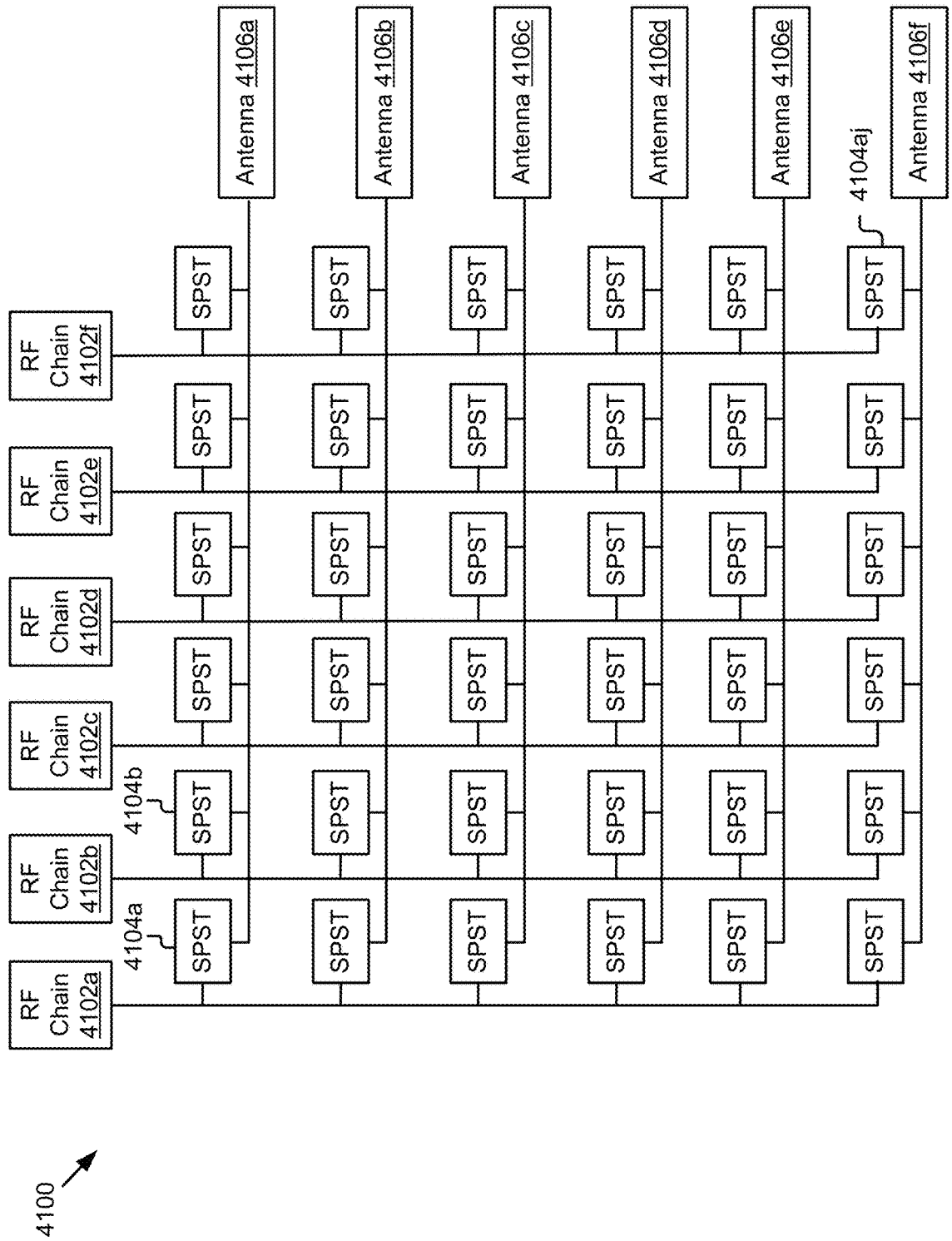
FIG. 41 illustrates an example embodiment of a full matrix switch of single-pole-single-throw switches in which any combination of an RF chain and an antenna can be joined.

The switching networks between the RF chains and the antennas can be arbitrary. For example, FIG. 40 illustrates an example embodiment of a four-way switch fabric 4000 in which no radio can be disconnected from an antenna. In the illustrated example, the switch fabric includes multiple four-way switches 4004 connecting various RF chains 4002 to antennas 4006. FIG. 41 illustrates a full matrix switch 4100 of single-pole-single-throw switches 4104 in which any combination of an RF chain 4102 and an antenna 4106 can be joined, leading to a fully consolidated everything-to-everything map.

These switching networks may be employed by some embodiments in order for multiple chains to have choices. In various embodiments, blocking, partially blocking, or non-blocking hierarchical switching, including a Clos networks of switch banks, may be used to establish one-to-one mapping properties. In some embodiments, the switch banks may be multiway rather than matrix arrangements, and therefore may only produce permutations. In some embodiments, those permutation networks may be combined with mixing pools, e.g., where three or more leads meet, to allow the network to perform many-to-many mappings by partially merging permutations. These networks may be designed to be sparser than a full matrix switch, such as based on design criteria that expect most mappings to be to coherent subsets of the available antenna configurations. Note that the RF chains need not be on the same synchronized radio. For example, in the FIG. 40, FIG. 41, the first three RF chains could be on one radio and the second three RF chains could be on another radio, thus providing a way for both radios to potentially share or allocate shared antenna resources. Each of these embodiments may have different efficiency (such as the number of switches needed to perform particular tasks) and blocking parameters.

Some embodiments include radios of different radio types. These radios may wish to share the same antenna resources. For example, a 2.4 GHz antenna may be useful for both Bluetooth and Wi-Fi. A multiband antenna may have two or more radiator arms to produce a good response at 2.4 GHz and 3.5 GHz, or at 5 GHz and 6 GHz. In these embodiments, the different radios may or may not be colliding. Two radios are colliding if one cannot transmit while the other receives, while both connected to the same antenna. Therefore, the antenna configuration processes described above may be made to take into account the possible collision rules to produce a configuration across multiple radio types, such as between 3.5 GHz CBRS and Wi-Fi. Some embodiments represent these constraints as propositions into a satisfaction engine or as weighted rules in an optimization engine. Some embodiments may use a postprocessing step in the discriminator to forcibly weight down the value of configurations that lead to collisions. In some embodiments, the collisions may be expressed as probabilities of collisions given the expected transmit power of the two colliding radios. Some embodiments may additionally incorporate unique configuration properties of the antenna and the switching paths to the shared antenna, such as additional filters or switch properties. In some embodiments, joint radiating antennas explicitly set aside for, at least in part, the avoidance of collision by allowing two otherwise colliding radios to share are created, such as by ensuring that appropriate cutoff filters (low pass, high pass, notch, etc.) are placed along the switching fabric or at the radiator itself or at the radio chain input/output port to ensure reasonable simultaneous receive and transmit. In some embodiments, the radios are themselves coordinated to ensure pure transmit or receive only bursting, which thus would allow simultaneous operation on different bands by avoiding the out-of-band rolloff of a transmit from interfering with the receive. For example, two Wi-Fi radios with similar bursting requirements in an aggregated transmission may be scheduled by requesting the PHY or the MAC queue to pause while queues are developed at sufficient depths to ensure likely bursting behavior. These may be used for multicast/broadcast traffic, or for a mix of unicast traffic on one radio and multicast on another such that the transmitters are both off before any receive is required by the protocol. In some embodiments, the PHYs or queues may be simultaneously unfrozen to allow the PHY aggregation to take place. In some embodiments, the amount of forgiveness on simultaneous transmit and receive may be further adjusted based on the likely collision chances. For example, a 5 GHz and 6 GHz Wi-Fi radio transmitting might be allowed to proceed uncoordinated if placed on channels far from each other. However, if they are placed on adjacent channels within their rolloff interference distance, the configuration manager may require coordination. In some embodiments, the different radios or the driving CPUs may possess a shared real time clock, such as a shared clock or GPIO pulse line and a previously tightly synced timestamp. In one example embodiment, the first CPU may send to the other a proposed timestamp to be adopted after the next pulse, and then both may sync to that proposed timestamp on the receipt of the next pulse. In some embodiments, predictable interrupt latency may also be taken into account. In some embodiments, the coherence domains may be set based on the collision properties of the antennas and attendant radios, such that two radios are forbidden (or discouraged as discussed previously) from sharing a coherent set.

Note that, for convenience, throughout this disclosure the switches are described as being on/off. However, switches with intermediate settings are available, such as switches designed to operate in the linear region of FETs, or as trees of binary switches with each leg having a different loss. When using variable or adjustable switches, the telemetry collected may need to include the setting for each switch. In some embodiments that actively adjust the switches for a learning phase, the switches may always be set to a known value, or to the highest value. However, it may be possible to add the fixed loss corresponding to the particular partial antenna switch setting to the received signal strength to provide an estimate of the value at full strength, with the primary potential issue being the inability to receive signals below the receive threshold that could otherwise have been received had the switch been at its full setting. Overall, these embodiments may provide highly inexpensive methods for producing directional and diverse patterns on an otherwise flat strip.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 42:
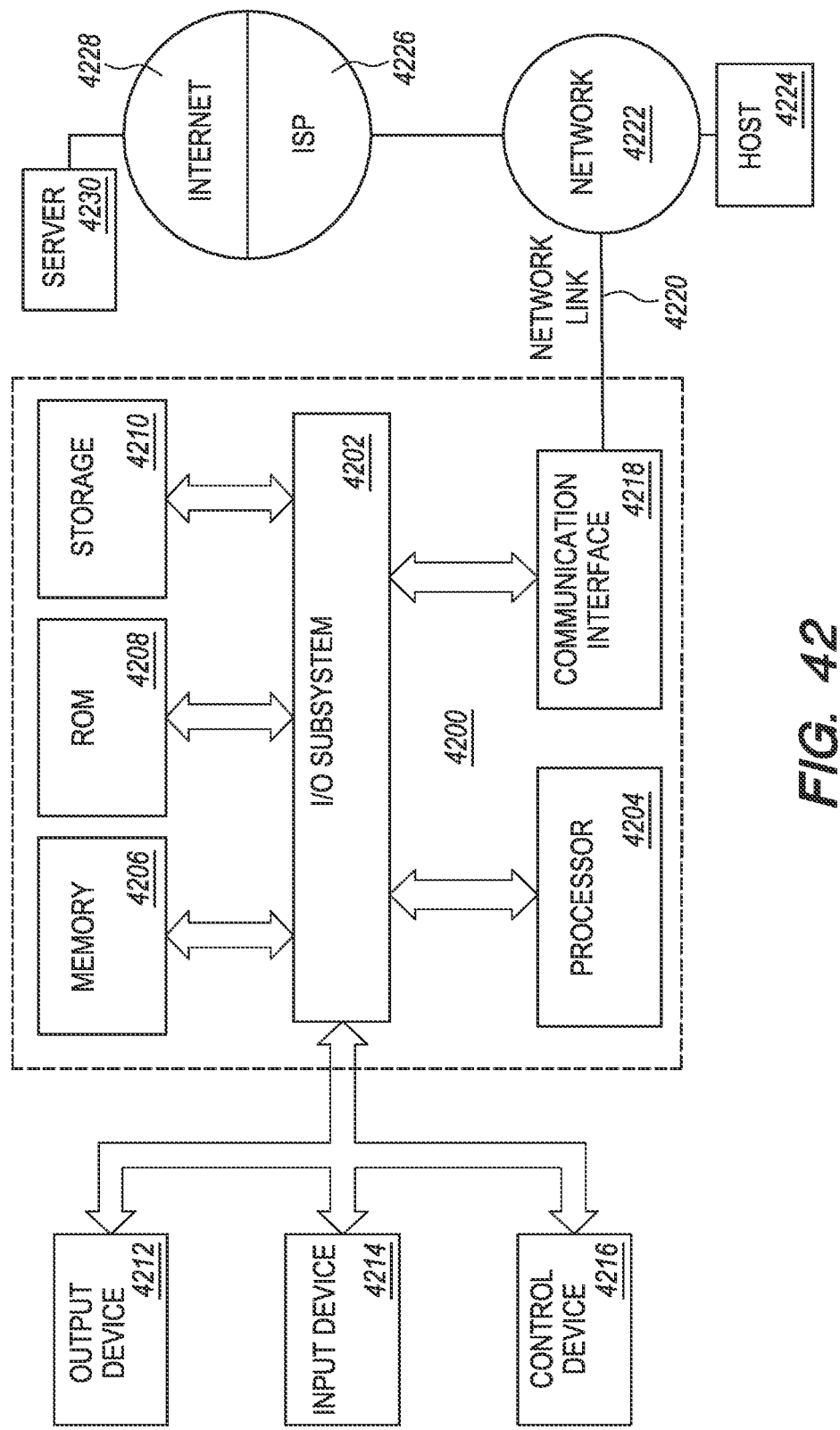
FIG. 42 illustrates a computer system with which one embodiment could be implemented.

FIG. 42 is a block diagram that illustrates an example computer system with which an embodiment may be implemented. In the example of FIG. 42, a computer system 4200 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 4200 includes an input/output (I/O) subsystem 4202 which may include a bus and/or other communication mechanism(s) for communicating information and/or instructions between the components of the computer system 4200 over electronic signal paths. The I/O subsystem 4202 may include an I/O controller, a memory controller and at least one I/O port. The electronic signal paths are represented schematically in the drawings, for example as lines, unidirectional arrows, or bidirectional arrows.

At least one hardware processor 4204 is coupled to I/O subsystem 4202 for processing information and instructions. Hardware processor 4204 may include, for example, a general-purpose microprocessor or microcontroller and/or a special-purpose microprocessor such as an embedded system or a graphics processing unit (GPU) or a digital signal processor or ARM processor. Processor 4204 may comprise an integrated arithmetic logic unit (ALU) or may be coupled to a separate ALU.

Computer system 4200 includes one or more units of memory 4206, such as a main memory, which is coupled to I/O subsystem 4202 for electronically digitally storing data and instructions to be executed by processor 4204. Memory 4206 may include volatile memory such as various forms of random-access memory (RAM) or other dynamic storage device. Memory 4206 also may be used for storing temporary variables or other intermediate information during execution of instructions to be executed by processor 4204. Such instructions, when stored in non-transitory computer-readable storage media accessible to processor 4204, can render computer system 4200 into a special-purpose machine that is customized to perform the operations specified in the instructions.

Computer system 4200 further includes non-volatile memory such as read only memory (ROM) 4208 or other static storage device coupled to I/O subsystem 4202 for storing information and instructions for processor 4204. The ROM 4208 may include various forms of programmable ROM (PROM) such as erasable PROM (EPROM) or electrically erasable PROM (EEPROM). A unit of persistent storage 4210 may include various forms of non-volatile RAM (NVRAM), such as FLASH memory, or solid-state storage, magnetic disk or optical disk such as CD-ROM or DVD-ROM and may be coupled to I/O subsystem 4202 for storing information and instructions. Storage 4210 is an example of a non-transitory computer-readable medium that may be used to store instructions and data which when executed by the processor 4204 cause performing computer-implemented methods to execute the techniques herein.

The instructions in memory 4206, ROM 4208 or storage 4210 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 4200 may be coupled via I/O subsystem 4202 to at least one output device 4212. In one embodiment, output device 4212 is a digital computer display. Examples of a display that may be used in various embodiments include a touch screen display or a light-emitting diode (LED) display or a liquid crystal display (LCD) or an e-paper display. Computer system 4200 may include other type(s) of output devices 4212, alternatively or in addition to a display device. Examples of other output devices 4212 include printers, ticket printers, plotters, projectors, sound cards or video cards, speakers, buzzers or piezoelectric devices or other audible devices, lamps or LED or LCD indicators, haptic devices, actuators or servos.

At least one input device 4214 is coupled to I/O subsystem 4202 for communicating signals, data, command selections or gestures to processor 4204. Examples of input devices 4214 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 4216, which may perform cursor control or other automated control functions such as navigation in a graphical interface on a display screen, alternatively or in addition to input functions. Control device 4216 may be a touchpad, a mouse, a trackball, or cursor direction keys for communicating direction information and command selections to processor 4204 and for controlling cursor movement on display 4212. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 4214 may include a combination of multiple different input devices, such as a video camera and a depth sensor.

In another embodiment, computer system 4200 may comprise an internet of things (IoT) device in which one or more of the output device 4212, input device 4214, and control device 4216 are omitted. Or, in such an embodiment, the input device 4214 may comprise one or more cameras, motion detectors, thermometers, microphones, seismic detectors, other sensors or detectors, measurement devices or encoders and the output device 4212 may comprise a special-purpose display such as a single-line LED or LCD display, one or more indicators, a display panel, a meter, a valve, a solenoid, an actuator or a servo.

When computer system 4200 is a mobile computing device, input device 4214 may comprise a global positioning system (GPS) receiver coupled to a GPS module that is capable of triangulating to a plurality of GPS satellites, determining and generating geo-location or position data such as latitude-longitude values for a geophysical location of the computer system 4200. Output device 4212 may include hardware, software, firmware and interfaces for generating position reporting packets, notifications, pulse or heartbeat signals, or other recurring data transmissions that specify a position of the computer system 4200, alone or in combination with other application-specific data, directed toward host 4224 or server 4230.

Computer system 4200 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 4200 in response to processor 4204 executing at least one sequence of at least one instruction contained in main memory 4206. Such instructions may be read into main memory 4206 from another storage medium, such as storage 4210. Execution of the sequences of instructions contained in main memory 4206 causes processor 4204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 4210. Volatile media includes dynamic memory, such as memory 4206. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 4202. Transmission media can also take the form of acoustic or light waves, such as those generated during radio-wave and infra-red data communications.

Various forms of media may be involved in carrying at least one sequence of at least one instruction to processor 4204 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 4200 can receive the data on the communication link and convert the data to a format that can be read by computer system 4200. For instance, a receiver such as a radio frequency antenna or an infrared detector can receive the data carried in a wireless or optical signal and appropriate circuitry can provide the data to I/O subsystem 4202 such as place the data on a bus. I/O subsystem 4202 carries the data to memory 4206, from which processor 4204 retrieves and executes the instructions. The instructions received by memory 4206 may optionally be stored on storage 4210 either before or after execution by processor 4204.

Computer system 4200 also includes a communication interface 4218 coupled to bus 4202. Communication interface 4218 provides a two-way data communication coupling to network link(s) 4220 that are directly or indirectly connected to at least one communication networks, such as a network 4222 or a public or private cloud on the Internet. For example, communication interface 4218 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 4222 broadly represents a local area network (LAN), wide-area network (WAN), campus network, internetwork or any combination thereof. Communication interface 4218 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 4218 sends and receives electrical, electromagnetic or optical signals over signal paths that carry digital data streams representing various types of information.

Network link 4220 typically provides electrical, electromagnetic, or optical data communication directly or through at least one network to other data devices, using, for example, satellite, cellular, Wi-Fi, or BLUETOOTH technology. For example, network link 4220 may provide a connection through a network 4222 to a host computer 4224.

Furthermore, network link 4220 may provide a connection through network 4222 or to other computing devices via internetworking devices and/or computers that are operated by an Internet Service Provider (ISP) 4226. ISP 4226 provides data communication services through a world-wide packet data communication network represented as internet 4228. A server computer 4230 may be coupled to internet 4228. Server 4230 broadly represents any computer, data center, virtual machine or virtual computing instance with or without a hypervisor, or computer executing a containerized program system such as DOCKER or KUBERNETES.

Server 4230 may represent an electronic digital service that is implemented using more than one computer or instance and that is accessed and used by transmitting web services requests, uniform resource locator (URL) strings with parameters in HTTP payloads, API calls, app services calls, or other service calls. Computer system 4200 and server 4230 may form elements of a distributed computing system that includes other computers, a processing cluster, server farm or other organization of computers that cooperate to perform tasks or execute applications or services. Server 4230 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 4230 may comprise a web application server that hosts a presentation layer, application layer and data storage layer such as a relational database system using structured query language (SQL) or no SQL, an object store, a graph database, a flat file system or other data storage.

Computer system 4200 can send messages and receive data and instructions, including program code, through the network(s), network link 4220 and communication interface 4218. In the Internet example, a server 4230 might transmit a requested code for an application program through Internet 4228, ISP 4226, local network 4222 and communication interface 4218. The received code may be executed by processor 4204 as it is received, and/or stored in storage 4210, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 4204. While each processor 4204 or core of the processor executes a single task at a time, computer system 4200 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Throughout this disclosure, the term "Wi-Fi" is used to refer to a specific type of wireless networking, based around the IEEE 802.11 standard. However, the techniques taught within apply broadly to wireless networking, and the use of "Wi-Fi" is not to be taken as a limitation specifically to IEEE 802.11 unless specifically stated or implied by the context. Furthermore, antenna shapes are illustrated for the purposes of connectivity and distinction (such as antennas being drawn at different orientations to represent different antenna patterns). These illustrations are conceptual in nature as to the shape of the antenna elements, including ground planes. Identifying specific antenna shapes, applying impedance matching techniques, ground plane construction, and the like will produce differing shapes in actual construction based on manufacturing choices such as that of material, thickness, conductor weight, and so on, and are all well understood in the art without any speculation or experimentation required.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Throughout this disclosure, multiple embodiments are listed that are either separate or derived from other embodiments in this disclosure. Furthermore, throughout this disclosure, multiple specific embodiments are listed that may be extensions of more general embodiments. It is to be understood that the combinations and subprocesses of these embodiments are also taught by this disclosure, as the combinations and subprocesses are able to be anticipated by those skilled in the art upon and only upon reading this disclosure. Furthermore, uses of the plural or the singular do not restrict the number of the item being mentioned: unless explicitly called out as not being so or being logically inconsistent, mentions of singular items are to be construed to also be plural and vice versa.

Furthermore, throughout this disclosure, multiple alternative embodiments are listed. Each embodiment differs in tradeoffs or effects and as such is a best embodiment for that set of tradeoffs and effects. The choice of alternative to use depends on the tradeoffs or effects desired by an implementer skilled in the art, and such choice is obvious and straightforward within the art and requires no further invention or discovery. Conditional language such as "could", "can", and "may" are intended to refer to and are to be construed as referring to options (manufacture, configuration, or based on availability) within embodiments of the invention and do not state that additional invention is required. For example, the statement that "the invention can react to a given input" means that one configuration of one assembly of an embodiment of the present invention does indeed react to that input. This is done for linguistic economy only and does not suggest uncertainty or incompleteness as it relates to the invention being taught or otherwise. This disclosure does not speculate as to the future state of the art; it states a current invention. Examples are provided as explicit embodiments of the invention, as well as to elucidate the teaching.

This disclosure lists sufficient details to enable those skilled in the art to construct a system around or a technology using the novel methods of the contained inventions, without further discovery or invention.

What is claimed is:

1. A computer-implemented method of dynamically configuring a wireless networking system, comprising:
   obtaining, for each of a plurality of antennas in the wireless networking system, topology information indicating whether and how a signal of each of the plurality antennas is in reach of one or more other antennas in the plurality of antennas, the wireless networking system including two or more Wi-Fi transceivers coupled to each other in a parallel configuration when coupled to a single networking line and a single power line arranged along a linear row, each of which the two or more Wi-Fi transceivers is selectively coupled to one or more of the plurality of antennas by respective switches;
   determining, dependent on the obtained topology information, a desired configuration change for the wireless networking system, the desired configuration change including a change in which and how many of the plurality of antennas are coupled to the two or more Wi-Fi transceivers or a change in which or how many of the two or more Wi-Fi transceivers are active; and
   initiating the desired configuration change.

2. The method of claim 1, wherein initiating the desired configuration change comprises one or more of: initiating an activation of a switch to couple one of the plurality of antennas to one of the two or more Wi-Fi transceivers; and initiating a deactivation of a switch to decouple one of the plurality of antennas from one of the two or more Wi-Fi transceivers.

3. The method of claim 1, wherein initiating the desired configuration change comprises one or more of: initiating an activation of one of the two or more Wi-Fi transceivers; and initiating a deactivation of one of the two or more Wi-Fi transceivers.

4. The method of claim 1, further comprising populating, for each of the plurality of antennas, a respective neighborhood table with the obtained topology information.

5. The method of claim 1, wherein obtaining the topology information comprises using passive telemetry or active telemetry to obtain, during operation of the wireless networking system, the topology information or neighbor information from which the topology information is derived.

6. The method of claim 5, wherein the obtained neighbor information includes a respective signal strength associated with a transmission in the wireless networking system.

7. The method of claim 1, wherein the obtained topology information applies to a combination of antennas from which a transmission is received or a combination of receiving antennas.

8. The method of claim 1, wherein obtaining the topology information comprises correlating transmissions of a transmitting wireless client device between two or more receiving wireless client devices.

9. The method of claim 1, wherein determining the desired configuration change is further dependent on a respective coverage pattern for wireless transmission and reception for one or more of the plurality of antennas.

10. The method of claim 1, wherein determining the desired configuration change comprises determining a set of antennas that, when activated, create a coverage pattern over a collective coverage area that includes at least a desired coverage area.

11. The method of claim 10, further comprising automatically pruning or shaping the collective coverage area dependent on a cell location, a known interference pattern, or a known amount of directionality for an antenna.

12. The method of claim 1, wherein determining the desired configuration change is further dependent on at least one of optimality, network needs, operator requests, wireless conditions, and client demand.

13. The method of claim 1, wherein: the antennas coupled to each Wi-Fi transmitter represent a repeated collection of antenna elements each of which contributes to a default coverage pattern for the repeated collection of antenna elements; and determining the desired configuration change comprises determining a configuration change that results in a change to the default coverage pattern for the antennas coupled to the one of the two or more Wi-Fi transceivers.

14. The method of claim 1, wherein: the wireless networking system comprises at least one of the single networking line and the single power line; and a combined power and networking distribution; and the single networking line and the single power line or the combined power and networking distribution are arranged along the linear row and are coupled to each of the two or more Wi-Fi transceivers.

15. The method of claim 1, wherein determining the desired configuration change comprises using a machine learning model that has been trained to produce a discriminator for evaluating proposed configurations for the wireless networking system.

16. The method of claim 15, further comprising: generating, by the machine learning model, one or more proposed configurations for the wireless networking system;
   predicting a respective result of each of the proposed configurations; and selecting, based on the predicting, one of the proposed configurations, the selected proposed configuration including the desired configuration change.

17. The method of claim 15, further comprising determining, by the machine learning model, a learned response indicating a significance of each of the plurality of antennas.

18. The method of claim 15, wherein the machine learning model is trained using weighted configuration propositions produced by a telemetry process and a respective quality measure associated with a region of the wireless networking system affected by each weighted configuration proposition.

19. The method of claim 1, wherein: the method further comprises determining that a wireless client device should be handed off from one or more currently active antennas over which signals are transmitted or received on behalf of the wireless client device in a first coverage area; determining the desired configuration change and initiating the desired configuration change are performed in response to determining that the wireless client device should be handed off from the one or more currently active antennas; and initiating the desired configuration change comprises deactivating at least one of the one or more currently active antennas and activating at least one alternate antenna having a second coverage area.

20. The method of claim 19, wherein determining that the wireless client device should be handed off from the one or more currently active antennas comprises determining that the wireless client device is approaching an edge of the first coverage area.

21. The method of claim 19, wherein: the method further comprises obtaining, using passive telemetry or active telemetry and during operation of the wireless networking system, a measure of a signal quality, error rate, or data rate associated with the wireless client device and a first Wi-Fi transceiver or a measure of a signal quality, error rate, or data rate associated with the wireless client device and a second Wi-Fi transceiver; and determining that the wireless client device should be handed off from the one or more currently active antennas is dependent on the signal quality, error rate, or data rate associated with the wireless client device and the first Wi-Fi transceiver, or the signal quality, error rate, or data rate associated with the wireless client device and the second Wi-Fi transceiver.

22. The method of claim 19, wherein: determining the desired configuration change comprises: modifying a configuration proposition or a configuration proposition weighting; and initiating production of a new configuration for the wireless networking system dependent on the modified configuration proposition or configuration proposition weighting; and the method further comprises generating the new configuration for the wireless networking system dependent on the modified configuration proposition or configuration proposition weighting and one or more applicable configuration change constraints.

23. The method of claim 22, wherein the one or more applicable configuration change constraints include: a constraint on a distance between the first coverage area and the second coverage area; a requirement that the at least one alternate antenna is in a same coherent antenna set as the one or more currently active antennas; or a requirement that the at least one alternate antenna represents a same subset of elements in a first instance of a repeated collection of antenna elements as a subset of elements in a second instance of the repeated collection of antenna elements represented by the one or more currently active antennas.

24. One or more computer-readable non-transitory storage media storing one or more sequences of instructions which, when executed using one or more processors, cause the one or more processors to: obtain, for each of a plurality of antennas in a wireless networking system, topology information indicating whether and how a signal of each of the antennas is in reach of one or more other antennas in the plurality of antennas, the wireless networking system including two or more Wi-Fi transceivers coupled to each other in a parallel configuration when coupled to a single networking line and a single power line arranged along a linear row, each of the two or more Wi-Fi transceivers is operable to be selectively coupled to one or more of the plurality of antennas by respective switches; determine, dependent on the obtained topology information, a desired configuration change for the wireless networking system, the desired configuration change including a change in which and how many of the plurality of antennas are coupled to the two or more Wi-Fi transceivers or a change in which or how many of the two or more Wi-Fi transceivers are active; and initiating the desired configuration change.

25. The media of claim 24, wherein: the antennas coupled to each Wi-Fi transmitter represent a repeated collection of antenna elements each of which contributes to a default coverage pattern for the collection of repeated antenna elements; and to determine the desired configuration change, the instructions cause the one or more processors to determine a configuration change that results in a change to the default coverage pattern for the antennas coupled to the one of the two or more Wi-Fi transceivers.

26. The media of claim 24, wherein to determine the desired configuration change, the instructions cause the one or more processors to use a machine learning model that has been trained to produce a discriminator for evaluating proposed configurations for the wireless networking system.

27. The media of claim 26, wherein the instructions further cause the one or more processors to: generate, by the machine learning model, one or more proposed configurations for the wireless networking system; predict a respective result of each of the proposed configurations; and select, based on the predicting, one of the proposed configurations, the selected proposed configuration including the desired configuration change.

28. The media of claim 24, wherein: the instructions further cause the one or more processors to determine that a wireless client device should be handed off from one or more currently active antennas over which signals are transmitted or received on behalf of the wireless client device in a first coverage area; determining the desired configuration change and the initiating the desired configuration change are performed in response to determining that the wireless client device should be handed off from the one or more currently active antennas; and to perform initiating the desired configuration change, the instructions cause the one or more processors to deactivate at least one of the one or more currently active antennas and activate at least one alternate antenna having a second coverage area.

29. The media of claim 28, wherein: to determine the desired configuration change, the instructions cause the one or more processors to: modify a configuration proposition or a configuration proposition weighting; and initiate production of a new configuration for the wireless networking system dependent on the modified configuration proposition or configuration proposition weighting; and the instructions further cause the one or more processors to generate the new configuration for the wireless networking system dependent on the modified configuration proposition or configuration proposition weighting and one or more applicable configuration change constraints.

* * * * *